(12) United States Patent
Plum et al.

(10) Patent No.: US 7,818,729 B1
(45) Date of Patent: Oct. 19, 2010

(54) AUTOMATED SAFE SECURE TECHNIQUES FOR ELIMINATING UNDEFINED BEHAVIOR IN COMPUTER SOFTWARE

(75) Inventors: Thomas S. Plum, Kamuela, HI (US); David M. Keaton, Boulder, CO (US)

(73) Assignee: Thomas Plum, Kamuela, HI (US)

( * ) Notice: Subject to any disclaimer, the term of this patent is extended or adjusted under 35 U.S.C. 154(b) by 1068 days.

(21) Appl. No.: 11/426,104

(22) Filed: Jun. 23, 2006

Related U.S. Application Data

(63) Continuation-in-part of application No. 11/264,376, filed on Nov. 2, 2005, which is a continuation-in-part of application No. 11/123,217, filed on May 6, 2005, which is a continuation-in-part of application No. 10/964,830, filed on Oct. 15, 2004, now Pat. No. 7,584,461, which is a continuation of application No. 10/941,023, filed on Sep. 15, 2004, now abandoned.

(60) Provisional application No. 60/502,620, filed on Sep. 15, 2003, provisional application No. 60/511,649, filed on Oct. 17, 2003, provisional application No. 60/693,429, filed on Jun. 24, 2005.

(51) Int. Cl.
G06F 9/45 (2006.01)
G06F 9/445 (2006.01)

(52) U.S. Cl. .................. 717/140; 717/145; 717/150

(58) Field of Classification Search ......... 717/139–146, 717/148–151
See application file for complete search history.

(56) References Cited

U.S. PATENT DOCUMENTS

| | | | |
|---|---|---|---|
| 5,261,095 A * | 11/1993 | Crawford et al. ............ 717/149 |
| 5,583,988 A | 12/1996 | Crank et al. | |
| 5,640,564 A | 6/1997 | Hamilton et al. | |
| 5,790,854 A * | 8/1998 | Spielman et al. ............ 717/150 |
| 5,978,585 A * | 11/1999 | Crelier ........................ 717/145 |
| 6,041,180 A * | 3/2000 | Perks et al. .................. 717/151 |
| 6,134,707 A * | 10/2000 | Herrmann et al. ........... 717/139 |
| 6,149,318 A | 11/2000 | Chase et al. | |
| 6,154,876 A | 11/2000 | Haley et al. | |
| 6,282,702 B1 * | 8/2001 | Ungar ........................ 717/148 |
| 6,282,703 B1 | 8/2001 | Meth et al. | |
| 6,452,990 B1 | 9/2002 | Leis et al. | |
| 6,542,990 B1 | 4/2003 | Tremblay et al. | |
| 6,634,023 B1 | 10/2003 | Komatsu et al. | |
| 6,647,301 B1 | 11/2003 | Sederlund et al. | |
| 6,662,354 B1 * | 12/2003 | Krablin et al. .............. 717/140 |
| 6,802,056 B1 | 10/2004 | Chaiken et al. | |

(Continued)

OTHER PUBLICATIONS

Varma et al, "NextGen extrema porting structured by automation", ACM SAC, pp. 1511-1517, 2005.*

(Continued)

*Primary Examiner*—Anil Khatri
(74) *Attorney, Agent, or Firm*—Nixon & Vanderhye P.C.

(57) ABSTRACT

Automated (e.g., compiler implemented) techniques provide safe secure software development including techniques for testing and verifying software for determining and/or certifying that the software had certain characteristics and/or complies with certain properties. In another illustrative implementation, methods are provided whereby the consumer can verify, to any desired level of certainty, that software as delivered truly has the specified properties, and that the compiler used to produce that software can be trusted to provide those assurances.

19 Claims, 14 Drawing Sheets

U.S. PATENT DOCUMENTS

| | | | | |
|---|---|---|---|---|
| 6,834,382 | B2 * | 12/2004 | Marso et al. | 717/143 |
| 7,000,213 | B2 * | 2/2006 | Banerjee et al. | 716/18 |
| 7,013,458 | B2 * | 3/2006 | Bloch et al. | 717/143 |
| 7,062,761 | B2 * | 6/2006 | Slavin et al. | 717/151 |
| 7,086,041 | B2 * | 8/2006 | Plesko et al. | 717/141 |
| 7,146,606 | B2 * | 12/2006 | Mitchell et al. | 717/141 |
| 7,155,602 | B2 | 12/2006 | Poznanovic | |
| 7,191,433 | B2 * | 3/2007 | Narad et al. | 717/140 |
| 7,305,666 | B2 * | 12/2007 | Burger et al. | 717/140 |
| 7,337,438 | B1 * | 2/2008 | Dobbins et al. | 717/141 |
| 7,487,507 | B1 * | 2/2009 | Lun et al. | 718/108 |
| 7,509,398 | B2 * | 3/2009 | Acharya et al. | 709/219 |
| 7,568,189 | B2 * | 7/2009 | Suba et al. | 717/145 |
| 7,712,089 | B2 * | 5/2010 | Opem et al. | 717/140 |

OTHER PUBLICATIONS

Stone et al, "Performance of checksums and CRC's over real data", IEEE/ACM Trans. on Networking, vol. 6, No. 5, pp. 529-543, 1998.*

Cierniak et al, "Practicing JUDO; Java under dynamic optimizations", ACM PLDI, 13-26, 2000.*

Tang et al, "Perceiving ordinal data haptically under workload", ACM ICMI, pp. 317-324, 2005.*

Dor et al., CCSV: Towards a Realistic Tool for Statically Detecting All Buffer Overflows in C; pp. 155-167, PLDI '03, SanDiego, CA (Jun. 9-11, 2003).

Ghiya et al., "On the Importance of Points-To Analysis and Other Memory Disambiguation Methods for C Programs," pp. 47-58, PLDI 2001, Snowbird, Utah (Jun. 1, 2001).

Sumant Kowshik, et al., "Ensuring Code Safety Without Runtime Checks for Real Time Control Systems." International Conference on Compilers, Architecture and Synthesis for Embedded Systems (CASES),10 pages (Aug. 8, 2002).

Dinakar Dhurjati et al., Memory Safety Without Runtime Checks or Garbage Collection, LCTES'03, Jun. 11-13, 2003, San Diego, California, USA.

Dinakar Dhurjati, "Memory Safety Without Runtime Checks or Garbage Collection for Embedded Applications," ACM Transactions on Embedded Computing Systems, vol. 4, No. 1, Feb. 2005, pp. 73-111.

Dinakar Dhurjati et al., "Enforcing Alias Analysis for Weakly Typed Languages," 23 pages, Technical Report #UIUCDCS-R-2005-2657, Computer Science Dept., University of Illinois (Nov. 2005).

Dinakar Dhurjati et al., "SAFECode: Enforcing Alias Analysis for Weakly Typed Languages," PLDI'06 Jun. 10-16, 2006, Ottawa, Ontario, Canada.

Dinakar Dhurjati et al., "Backwards-Compatible Array Bounds Checking for C with Very Low Overhead," ICSE'06, May 20-29, 2006, Shanghai, China.

John Criswell et al., "A Virtual Instruction Set Interface for Operating System Kernels," 8 pages, Workshop on the Interaction between Operating Systems and Computer Architecture (WIOSCA '06) (Jun. 19, 2006).

Dinakar Dhurjati et al., "Efficiently Detecting All Dangling Pointer Uses in Production Servers," 10 pages, International Conference on Dependable Systems and Networks (DSN) (2006).

John Criswell et al., "Secure Virtual Architecture: A Safe Execution Environment for Commodity Operating Systems," SOSP'07, Oct. 14-17, 2007, Stevenson, Washington, USA.

John Criswell et al., "Memory Safety for Low-Level Software/Hardware Interactions," 18 pages (Aug. 12, 2009).

John Criswell, "A virtual Instruction Set Interface for Operating System Kernels," powerpoint presentation (Jun. 18, 2006).

Dinakar Dhurjati, "Memory Safety Without Runtime Checks or Garbage Collection," powerpoint presentation, LCTES03 (Jun. 12, 2003).

Sumant Kowshik, "Ensuring Code Safety Without Run-time Checks for Real-time Control Systems," powerpoint presentation, CASES02 (Aug. 11, 2002).

"Centerline Announces QualityCenter Automated Testing Tools," Dr. Dobb'sPortal, http://www.ddj.com/cpp/184403081 (Oct. 1, 1995).

Fergus Henderson, "Accurate Garbage Collection in an Uncooperative Environment," ISMM '02, (Jun. 20-21, 2002), Berlin, Germany.

David Berlind, Ex-Cybersecurity czar Clarke issues gloomy report card—TechUpdate—ZDNet, http://techupdate.zdnet.com/Clarke_issues_gloomy_report_card_.html, "Orlando, Fla,—Richard Clarke has more bad news for IT execs" (Oct. 2003).

Hans-J Boehm, "A Garbage Collector for C and C++", .(http://www.hpl.hp.com/personal/Hans_Boehm/gc/) (2004).

Mark Mitchell et al., "Itanium C++ ABI" (http://www.codesourcery.com/cxx-abi/abi.html) (2003).

Todd M. Austin, "Efficient Detection of All Pointer and Array Access Errors," SIGPLAN 94-6/94 Orlando, Florida, USA (1994).

CERT/CC. See http://www.cert.org/stats/cert_stats.html for current statistics (1988-2005).

CERT/CC.US-CERT's Technical Cyber Security Alerts. http://www.us-cert.gov/cas/techalerts/index.html (2004-2005).

Dor, N., Rodeh, M., and Sagiv. M. "CSSV: Towards a Realistic Tool for Statically Detecting All Buffer Overflows in C," PLDI'03, San Diego, California, pp. 155-167 (Jun. 9-11, 2003).

Gupta, R., "Optimizing Array Bound Checks Using Flow Analysis," ACM Letters on Programming Languages and Systems, vol. 2, Nos. 1-4, pp. 135-150 (Mar.-Dec. 1993).

ISO/IEC WDTR 24731, Information Technology-Programming languages, their environments and system software interfaces-Specification for Secure C Library Functions (Dec. 19, 2004) [ISO/IEC JTC1 SC22 WG14 N1093, "Programming languages, their environments and system software interfaces—Specification for Secure C Library Functions," www.open-std.org/jtc1/sc22/wg14/www/docs/n1093.pdf (2004)].

Lovell, M., "Safe! Repel Attacks on Your Code with the Visual Studio 2005 Safe C and C++ Libraries," MSDN Magazine (May 2005).

Plum Hall, Inc., "The SSCC website," http://www.plumhall.com/ssce.html (2005).

Seacord, Robert, Secure Coding in C and C++ (2005).

Ruwase, O. and Lam, M., "A Practical Dynamic Buffer Overflow Detector," Proceedings of the Network and Distributed System Security (NDSS) Symposium, pp. 159-169 (Feb. 2004).

Standard Performance Evaluation Corporation (SPEC), SPEC CPU2000: Component CPU Integer (CINT2000 http://www.spec.org) (2000).

INCITS/ISO/IEC 9899-1999, Programming Languages—C, Second Edition (1999).

INCITS/ISO/IEC 14882-2003, Programming Languages—C++, Second Edition (2003).

International Search Report, PCT/US04/34422 (Mar. 30, 2006).

International Search Report, PCT/US04/30029 (Aug. 24, 2006).

Rinard, Martin et al., "Enhancing Server Availability and Security Through Failure-Oblivious Computing," 14 pages, presented at USENIX OSDI Dec. 6-8, 2004.

Dhurjati, Dinakar et al., "Backwards-Compatible Array Bounds Checking for C with Very Low Overheat," ICSE '06, May 20-28, 2006, Shanghai, China, pp. 1-10.

* cited by examiner

Fig. 1   Example Safe Secure Software Development System

41  Safe Secure Pointer Attribute Hierarchy

| Attribute | Implies these other Attributes |
|---|---|
| Unk | Ni |
| Nul | Ni |
| Qi | T |
| Nth | T |
| Ntl | T |
| End | Ni, Nnul, Ntl |
| I | Nnul, Ntl, Nth |
| Nullterm | I |
| Lo | I |
| Hi | I |

Figure 7

51 Safe Secure Pointer Attribute Predicates

|  | unk | nul | ni | nnul | qi | nth | ntl | end | i | lo | hi |
|---|---|---|---|---|---|---|---|---|---|---|---|
| ==End | end | end* | end* | end | end | end* | end | end | end | end* | end* |
| ==Lo | lo | lo* | lo* | lo | lo | lo | lo | lo* | lo | lo | lo* |
| ==Hi | hi | hi* | hi* | hi | hi | hi | hi | hi* | hi | hi* | hi |
| ==0 | nul | nul | nul | nul* | nul | nul* | nul* | nul* | nul* | nul* | nul* |
| !=0 | nnul ni | nnul ni* | nnul ni | nnul | i | nth | ntl | end | i | lo | hi |
| >=Lo | ntl | nul | ni ntl | ntl | qi ntl | i | ntl | end | i | lo | hi |
| <Lo | unk | nul | ni | nnul | ni* | ni | ni* | ni* | ni* | ni* | ni* |
| <=Hi | nth | nul | ni nth | nth | qi nth | nth | i | nth ni * | i | lo | hi |
| >Hi | unk | nul | ni | nnul | ni* | ni* | ni* | end | ni* | ni* | ni* |
| ++ | unk | nnul ni | ni | unk | unk | unk | ntl | ni | ntl | ntl | end |
| -- | unk | nnul ni | ni | unk | unk | nth | unk | hi | nth | ni | nth |
| counted+ |  |  |  |  |  |  |  |  | i | i |  |
| counted- |  |  |  |  |  |  |  |  | i |  | i |

Notes:
The asterisk suffixed to some state outcomes indicates a "can't happen" condition; analysis will accept the state outcome and disregard any prior attribute.

The predicate "!=0" also represents "false outcome of = =0" and any equivalent representation.

The predicate "= =0" also represents "false outcome of !=0" and any equivalent representation.

The predicate ">=Lo" also represents "false outcome of >Lo" and any equivalent representation.

The predicate "<=Hi" also represents "<End" and "false outcome of >Hi" and "false outcome of >=End" and any equivalent representation.

Assignment of an address to a pointer, or calculation of an address expression, sets the pointer attribute according to the bounds information available to the SSSA 35 at that point in the program.

Figure 8

71 Safe Secure Interface Inference Table

| |
|---|
| If inside the called function:<br><br>    a pointer parameter is passed as an argument to another function (such as strlen) which requires a null-terminated argument target, then the NULLTERM Requirement is inferred.<br><br>    a subscript loop begins at zero (or a pointer loop begins at the parameter's value) and continues until the character target is a null character, then the NULLTERM Requirement is inferred.<br><br>    a pointer loop begins at the value of a pointer parameter and increments until the pointer reaches another pointer parameter's value, and elements of an array are accessed by indirection, then the second pointer parameter's Requirement is inferred to be the Hi or End of the array (a loop terminating before indexing the n-th element indicates an End value, whereas terminating upon reaching, and indexing, the n-th value indicates a Hi value).<br><br>    a subscript loop begins at zero and continues until the subscript reaches an integer parameter's value, and elements of an array are indexed by the subscript, then the integer parameter's Requirement is inferred to be the Bound of the array (a loop terminating before indexing the n-th element indicates a Bound value, whereas terminating upon reaching, and indexing, the n-th value indicates a value of Bound minus one).<br><br>    a pointer loop begins at the value of a pointer parameter and decrements until the pointer reaches another pointer parameter's value, and elements of an array are accessed by indirection, then the second pointer parameter's Requirement is inferred to be the Lo of the array and the first pointer's Requirement is inferred to be the Hi or End of the array, depending upon whether decrementing takes place before or after the first indirection.<br><br>    one or more pointer and/or integer parameters are passed as arguments to another function, and that function's calling sequence imposes Requirements upon those arguments, then the same Requirements are inferred for those parameters. |

Figure 10

AUTOMATED SAFE SECURE TECHNIQUES FOR ELIMINATING UNDEFINED BEHAVIOR IN COMPUTER SOFTWARE

CROSS-REFERENCES TO RELATED APPLICATIONS

This application is a continuation-in-part of copending application Ser. No. 11/264,376 filed Nov. 2, 2005, which application is a continuation-in-part of application Ser. No. 11/123,217 filed May 6, 2005 which application is a continuation-in-part of application Ser. No. 10/964,830 filed Oct. 15, 2004, which application is continuation/substitution for application Ser. No. 10/941,023 filed Sep. 15, 2004, which claims the benefit of Provisional Application No. 60/502,620, filed Sep. 15, 2003 and Provisional Application No. 60/511,649, filed Oct. 17, 2003; and claims the benefit of Provisional Application No. 60/693,429, filed Jun. 24, 2005. The entire contents of these applications are incorporated by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2004-2006, Plum Hall, Inc.

FIELD

The technology herein relates to techniques for testing and verifying software for determining and/or certifying that the software had certain characteristics and/or complies with certain properties. More particularly, the technology herein relates to the design and construction of compilers which implement control flow analysis, data flow analysis, optimizations (including the type-based aliasing requirements), definite-assignment analysis, and the ANSI/ISO standards for the subject languages. The technology herein also relates to safe secure software compiling techniques, and more particularly to a "blueprint" for methods, techniques and systems that can be used to create a particular exemplary implementation for use with the C and C++ programming languages which satisfies specified criteria for safety and security. The technology herein also provides methods whereby the consumer of such software can verify, to any desired level of certainty, that software as delivered truly has the specified properties, and that the compiler used to produce that software can be trusted to provide those assurances.

BACKGROUND AND SUMMARY

Most computer users have experienced times when their computer seemingly has "lost its mind" and starts behaving in seemingly unexplainable ways. For example, sometimes we command the computer to do something—but instead of doing what we ask, the computer "stops responding" and needs to be "rebooted" (e.g., turned off and back on again). This process can waste significant time while the computer restarts. Work product is sometimes lost—frustrating users to no end.

Productivity and efficiency are significant problems, but there are contexts in which undesired or unexpected software behavior can have even more significant impact. Imagine for example a situation in which an emergency call from a police officer or someone in the military does not get through due to a software failure. Consider a situation in which a hospital life support device ceases to operate properly because of a software defect. Suppose an aircraft or spacecraft automatic pilot or computer-based navigation system ceases to operate properly because of a problem with the way the software was written. Imagine the result if an electrical power grid fails due to a software failure.

Ultimately, most such problems are caused by programming errors (sometimes called "bugs"). As computer programs become increasingly complex, it is more difficult for the people writing the computer code to take into account every possible condition that the computer program may encounter. Unfortunately, a computer program will "break" if the code encounters an undefined condition it does not "know" how to handle.

Another range of problems relates to attackers taking advantage of undefined computer program behavior to do harm. Several of the undefined behaviors of C and C++ have received much attention in the popular press as well as technical journals, because their effects have inflicted billions of dollars of damage in the USA and worldwide. In particular, the "buffer overflow" (also known as "buffer overrun") and "null pointer indirection" behaviors have created vulnerabilities in widely-used software from many different vendors. This problem of buffer overflows is no longer an obscure technical topic. This is the vulnerability through which most worms and viruses attack. The worldwide total costs due to malicious hacker attacks during 2002 have been estimated to be between 40 and 50 billion USD; costs for 2003 were estimated between 120 and 150 billion USD. See e.g., David Berlind, "Ex-cybersecurity czar Clarke issues gloomy report card" (ZDNet TechUpdate Oct. 22, 2003).

Much work has been done in the past to make software more robust and reliable. However, further improvements are possible and desirable. The technology herein provides new and useful techniques that can be used individually and/or in combination to test and/or certify that software—including but not limited to software written in the "C" family of programming languages—is safe, secure and/or substantially defect-free. While the techniques discloses herein can advantageously be incorporated into purely automatic, machine-operated scenarios (i.e., one piece of software can be used to test other software) to provide a comprehensive testing and certification solution, these techniques can also be used together or separately in less automated contexts (e.g., in conjunction with analysis and review by humans) to provide testing and/or verification capabilities. Such techniques can be used to test and certify any kind of software, including but not limited to compilers, that perform any kind of functionality imaginable. The software being tested could be intended to run on any type of computing device including for example personal computers, embedded controllers, mainframe computers, networking contexts, servers or any other type of computing device. The techniques herein are generally applicable to a wide range of problems and solutions, and should by no means be limited to the particular scenarios described below.

For example and in greater detail, an international standard has been developed for the programming language C, which is designated ISO/IEC 9899:2002(E) ("the ISO C99 standard", i.e., "the C standard"). Similarly, an international standard has been developed for the programming language C++, which is designated ISO/IEC 14882:2003(E) ("the ISO C++ standard", i.e., "the C++ standard"). The previous international standard for the programming language C was designated ISO/IEC 9899:1990(E) ("the ISO C90 standard"). Each of these standards defines certain situations using the category of "undefined behavior". The C Standard contains the following definition: "3.4.3 undefined behavior: behavior, upon use of a nonportable or erroneous program construct or of erroneous data, for which this International Standard imposes no requirements. NOTE Possible undefined behavior ranges from ignoring the situation completely with unpredictable results, to behaving during translation or program execution in a documented manner characteristic of the environment (with or without the issuance of a diagnostic message), to terminating a translation or execution (with the issuance of a diagnostic message)." The C++ Standard contains a similar definition: "1.3.12 undefined behavior: behavior, such as might arise upon use of an erroneous program construct or erroneous data, for which this International Standard imposes no requirements. Undefined behavior may also be expected when this International Standard omits the description of any explicit definition of behavior. [Note: permissible undefined behavior ranges from ignoring the situation completely with unpredictable results, to behaving during translation or program execution in a documented manner characteristic of the environment (with or without the issuance of a diagnostic message), to terminating a translation or execution (with the issuance of a diagnostic message). Many erroneous program constructs do not engender undefined behavior; they are required to be diagnosed.]"

Some undefined behaviors can be eliminated by using techniques already known in the current art. The next sections will describe some exemplary such techniques.

Design-Time Choices [dt]

Several undefined behaviors can be addressed by design choices; these undefined behaviors are marked with "dt" in column one of the table below. In general, the guiding principle behind these design choices is that non-portable behavior is generally not as bad as undefined (unsafe) behavior. For example; byte-ordering affects the numeric value of results, but so long as address bounds are not exceeded, byte-ordered integer values produce something well-defined on each hardware platform.

a. The representation of a null pointer can be all-bits-zero.

b. The representation of pointers can be binary two's-complement with non-signaling wraparound.

c. Every possible binary value can be interpreted as a valid data element. Every data value can be fetched safely; in that sense, there are no "trap representations". A "trap" can result if fetch or store of an invalid pointer is attempted, but not upon calculation or comparison of addresses. Therefore, uninitialized memory can be fetched safely. An incompletely-read buffer after a read error (such as in Standard C subclauses 7.19.7.2, 7.19.7.7, 7.24.3.2, etc) still contains data bytes which will not cause traps upon fetch. If any hardware datatype does contain "trap representations" at the assembler-code level, then the implementation can catch any such trap (invisibly to the C/C++ code) and replace the value in the register with a value that conforms to Safe Secure design-time choices (such as a "quiet NaN" for floating-point values).

d. A request to the allocation functions malloc and calloc to allocate zero bytes can cause the allocation of the smallest non-zero allocation.

e. If the number-of-elements argument is zero, string and wide-string and sorting and searching functions can do-nothing gracefully.

f. The sorting and searching functions can be limited to no more than an implementation-defined maximum number of iterations.

g. The algorithms for converting between wide characters and (narrow) characters can produce deterministic results for all inputs, in either direction. Therefore, when a stream was written wide-oriented and read byte-oriented, the behavior can be implementation-defined and not undefined, and similarly for a stream written byte-oriented and read wide-oriented.

h. The wcstok function can be implemented so that, if it is invoked with a null pointer, then the pointer argument need not be equal to the pointer argument of the previous, but can require only that the "saved" pointer must designate some non-const array of characters, null-terminated.

i. The wcstok and strtok functions can be implemented so that, if the first invocation passes a null pointer, the function can ignore it and return a null pointer; alternatively, the function can invoke a "Code-Generation Choice" (see below).

j. The compiler can be configured for each accompanying set of Standard C++ Library functions, so that several undefined behaviors can be eliminated by design-time choices.

k. The compiler can issue a fatal diagnostic for all visible attempts to modify a string literal. When a string literal has become the target of a pointer, the methods shown in this Application will ensure that the pointer will not be used to modify storage outside the bounds of the string literal's array. In-bound modifications made to that array will exhibit well-defined behavior according to the underlying machine model: if the array has been allocated in a ROM or write-protected segment, the attempt to write will either cause a Code-Generation Choice or a no-op.

l. [reserved—no L]

m. The allocation functions can always return one minimum-sized storage allocation in response to the request to allocate zero bytes. The Requirement of any subsequent fetch-or-store through that pointer must be met, regarding both range and type.

n. Each static variable can be accompanied by an initialization-guard flag. Upon entry to the construction or destruction of a block-scope, file-scope, or dynamically-loaded object with static storage duration, the flag is set. This flag is cleared when construction or destruction is complete.

o. The implementation can analyze the code of each C++ special function (constructor and destructor) to determine whether any undefined behavior would result from re-entering that function before a prior invocation has returned. If so, the generated code for that function shall test the initialization-guard flag to prevent such re-entry.

p. The implementation can provide a dummy function to be invoked any time the user program erroneously calls a pure virtual C++ function, which will invoke a Code-Generation Choice In non-Debug mode, a no-op can be performed.

q. The implementation can provide an API which will incorporate the functionality of the C atexit function, along with extra information to allow the execution of destructors for static objects in the reverse order of construction, even including dynamic libraries.

In this Application, by way of non-limiting example only, the undefined behaviors of C and C++ are itemized in several tables. In each table, the first column is headed "SSM#" and represents the "Safe-Secure Method Name"; for example, in the following table, each entry in column one specifies "dt" for the "Design-time choices [dt]" subsection of this Application. The second column is headed either "C-Std #" for "C Standard Number" or "C++-Std #" for "C++ Standard Number", i.e., the subclause number of the ISO/IEC standard for C or C++. The third column is headed "Description" and describes the specific undefined behavior.

The methods shown in this section can be used to eliminate the following undefined behaviors:

| SSM# | C-Std# | Description |
|------|--------|-------------|
| dt | c7.19.2 | A byte input/output function is applied to a wide-oriented stream, or a wide character input/output function is applied to a byte-oriented stream |
| dt | c7.13.2.1 | After a longjmp, there is an attempt to access the value of an object of automatic storage class with non-volatile-qualified type, . . . |
| dt | c7.13.2.1 | . . . local to the function containing the invocation of the corresponding setjmp macro, that was changed between the setjmp invocation and longjmp call |
| dt | c6.5.16.1 | An object containing no pointers is assigned to an inexactly overlapping object or to an exactly overlapping object with incompatible type |
| dt | c6.5.16.1 | An object containing pointers is assigned to an inexactly overlapping object or to an exactly overlapping object with incompatible type |
| dt | c7.14.1.1 | A signal occurs other than as the result of calling the abort or raise function, and the signal handler refers to an object with static storage duration other than by assigning a value to an object declared as volatile sig_atomic_t, or . . . |
| dt | c7.14.1.1 | . . . calls any function in the standard library other than the abort function, the _Exit function, or the signal function (for the same signal number) |
| dt | c6.2.6.1 | A trap representation is produced by a side effect that modifies any part of the object using an lvalue expression that does not have character type |
| dt | c6.2.6.1 | A trap representation is read by an lvalue expression that does not have character type |
| dt | c6.3.1.4 | Conversion to or from an integer type produces a value outside the range that can be represented |
| dt | c6.3.1.5 | Demotion of one real floating type to another produces a value outside the range that can be represented |
| dt | c6.4.5 | The program attempts to modify a string literal |
| dt | c6.5 | Between two sequence points, an object is modified more than once, or is modified and the prior value is read other than to determine the value to be stored |
| dt | c6.5.6 | The result of subtracting two pointers is not representable in an object of type ptrdiff_t |
| dt | c6.5.7 | An expression having signed promoted type is left-shifted and either the value of the expression is negative or the result of shifting would be not be representable in the promoted type |
| dt | c6.5.7 | An expression is shifted by a negative number or by an amount greater than or equal to the width of the promoted expression |
| dt | c6.5acc | An object has its stored value accessed other than by an lvalue of an allowable type |
| dt | c6.7.3 | An attempt is made to modify an object defined with a const-qualified type through use of an lvalue with non-const-qualified type |
| dt | c6.7.3 | An attempt is made to refer to an object defined with a volatile-qualified type through use of an lvalue with non-volatile-qualified type |
| dt | c6.7.8 | The value of an unnamed member of a structure or union is used |
| dt | c6.9.1 | The } that terminates a function is reached, and the value of the function call is used by the caller |
| dt | c7.11.1.1 | The program modifies the string pointed to by the value returned by the setlocale function |
| dt | c7.11.2.1 | The program modifies the structure pointed to by the value returned by the localeconv function |
| dt | c7.13.2.1 | The longjmp function is invoked to restore a nonexistent environment |
| dt | c7.14.1.1 | A signal handler returns when the signal corresponded to a computational exception |
| dt | c7.14.1.1 | A signal is generated by an asynchronous signal handler |
| dt | c7.14.1.1 | A signal occurs as the result of calling the abort or raise function, and the signal handler calls the raise function |
| dt | c7.14.1.1 | The value of errno is referred to after a signal occurred other than as the result of calling the abort or raise function and the corresponding signal handler obtained a SIG_ERR return from a call to the signal function |
| dt | c7.19.5.2 | The stream for the fflush function points to an input stream or to an update stream in which the most recent operation was input |

-continued

| SSM# | C-Std# | Description |
|---|---|---|
| dt | c7.19.6.1, c7.19.6.2, c7.24.2.1, c7.24.2.2 | A % conversion specifier is encountered by one of the formatted input/output functions, but the complete conversion specification is not exactly %% |
| dt | c7.19.6.2, c7.24.2.2 | A c, s, or [ conversion specifier with an l qualifier is encountered by one of the formatted input functions, but the input is not a valid multibyte character sequence that begins in the initial shift state |
| dt | c7.19.7.2, c7.19.7.7, c7.24.3.2. | The contents of the array supplied in a call to the fgets, gets, or fgetws function are used after a read error occurred |
| dt | c7.19.8.1 | A partial element read by a call to the fread function is used |
| | c7.19.8.1, c7.19.8.2 | The file position indicator for a stream is used after an error occurred during a call to the fread or fwrite function |
| dt | c7.20.3 | A non-null pointer returned by a call to the calloc, malloc, or realloc function with a zero requested size is used to access an object |
| dt | c7.20.3.3 | The value of the object allocated by the malloc function is used |
| dt | c7.20.3.4 | The value of any bytes in a new object allocated by the realloc function beyond the size of the old object are used |
| dt | c7.20.4.5, c7.21.6.2 | The string set up by the getenv or strerror function is modified by the program |
| dt | c7.20.5 | The comparison function called by a searching or sorting utility function alters the contents of the array being searched or sorted, or returns ordering values inconsistently |
| dt | c7.20.5.1 | The array being searched by the bsearch function does not have its elements in proper order |

| SSM# | C++-Std# | Description |
|---|---|---|
| dt | 2.13.4 para 2 | Attempting to modify a string literal |
| dt | 3.6.1 para 4 | std::exit is called to end a program during the destruction of an object with static storage duration. |
| dt | 3.7.3.1 para 2 | Dereferencing a pointer returned as a request for zero size |
| dt | 4.8 para 1 | Floating-point conversion, source value out-of-range of target |
| dt | 4.9 para 1 | Floating-point to integer conversion, source value out-of-range of target |
| dt | 5.3.4 para 6 | In a direct-new-declarator the expression evaluates to a negative value |
| dt | 6.7 para 4 | Control re-enters initialization recursively. |
| dt | 14.6.4.2 para 1 | Function lookup would have been ill-formed, or better match, if all translation units were considered. |
| dt | 17.4.3.6 para 2 | A replacement function that does not implement Required behavior |
| dt | 17.4.3.6 para 2 | A handler function that does not implement Required behavior |
| dt | 17.4.3.6 para 2 | A template argument does not implement Requirements |
| dt | 17.4.3.6 para 2 | Replacement function, handler function, or dtor throws an exception (unless specifically allowed) |
| dt | 18.1 para 5 | Taking offsetof of a non-POD type |
| dt | 26.2 para 3 | Result of function is not mathematically defined, or not in range of representable values |
| dt | 27.4.2.7 para 1 | ios__base object is destroyed before basic__ios::init initializes the members |
| dt | 27.4.4 para 2 | error value P(O(−1)) is used as arg to . . . member that accepts traits::pos__type |
| dt | 27.4.4.1 para 2 | basic__ios object is destroyed before init initializes the members |
| dt | 27.7.1.3 para 14 | the sp arg to seekpos has not been obtained by previous successful call to a positioning function |

Text Streams and Character Representations [code]

An exemplary implementation can use a specific choice among the Unix/POSIX/Linux encoding of text files (with LF line terminators), the Macintosh encoding of text files (with CR line terminators), or the Microsoft Windows encoding of text files (with CR/LF line terminators). All mbstate_t conversions can produce implementation-defined results, even after changing the LC_CTYPE category.

An implementation can make truncated-result behavior well-defined in strxform, strftime, wcsxform, or wcsftime.

The multibyte functions can behave gracefully when given a sequence not in the initial shift state, or when given any mbstate_t object.

The wide-character classifying and conversion functions can be well-defined for any wint_t input and for any LC_CTYPE setting.

The Standard C++ Library can be designed to provide a valid result for operator* at end-of-stream.

The methods shown in this section can be used to eliminate the following undefined behaviors:

| SSM# | C-Std# | Description |
| --- | --- | --- |
| code | c7.19.2 | Use is made of any portion of a file beyond the most recent wide character written to a wide-oriented stream |
| code | c7.19.6.1, c7.19.6.2, c7.23.3.5, c7.24.2.1, c7.24.2.2, c7.24.5.1 | The format in a call to one of the formatted input/output functions or to the strftime or wcsftime function is not a valid multibyte character sequence that begins and ends in its initial shift state |
| code | 24.5.3 para 2 | The result of operator* on end-of-stream |

Secure Library [slib]

The secure (or "Bounds-checking") library enhancements being standardized by ISO/IEC JTC 1 SC22/WG14 will eliminate many opportunities for undefined behavior (see www.open-std.org/jtcl/sc22/wg14/www/docs/n1093.pdf). Furthermore, if a formatted I/O function produces more than INT_MAX chars of output, then it can return INT_MAX.

The methods shown in this section can be used to eliminate the following undefined behaviors:

| SSM# | C-Std# | Description |
| --- | --- | --- |
| slib | c7.19.6.1, c7.19.6.3, c7.19.6.8, c7.19.6.10 | The number of characters transmitted by a formatted output function is greater than INT_MAX |

Ss_unwind [longj]

The longjmp function (and any other functions which "unwind" the stack), can check whether execution of atexit-registered functions has started. If so, one of the following implementation-defined actions can be performed: cause a return from the function that invoked the unwind or longjmp function, invoke an "extreme exit" cleanup function; or invoke the abort function. Optionally, at the point of catching the ss_unwind, a system sanity check can be performed before continuing or re-starting. Another option for the implementation of an ss_unwind capability is provided by the new "Bounds-checking" library of C (see "Secure Library [slib]"), known as the "abort" version of the "constraint handler"; this handler causes either a breakpoint in a debugger or immediate execution of an abort. In C++, a similar constraint handler can optionally cause a breakpoint in a debugger, abort, or throw a specified exception. (These are the "SSCC-compatible constraint handlers.) The constraint handler can be invoked by code compiled as Debug mode or as Production mode. Therefore, each instance where distinctions are made between Debug and Production mode is revised to an implementation-specified choice among the following alternative behaviors: (1) invoke the current SSCC-compatible constraint handler; (2) invoke an implementation-specified "unwind" function (which has been generically referred to as "ss_unwind" herein; (3) execute an implementation-specified form of "Keep-On-Running" behavior such as Modwrap, Saturation, or ZeroBound. This implementation-specified choice among behaviors is referred to as an "unwind" or an "ss_unwind" or the "Code-Generation Choice" herein.

The methods shown in this section can be used to eliminate the following undefined behavior:

| SSM# | C-Std# | Description |
| --- | --- | --- |
| longj | c7.20.4.3 | During the call to a function registered with the atexit function, a call is made to the longjmp function that would terminate the call to the registered function |

| SSM# | C++-Std# | Description |
| --- | --- | --- |
| longj | 18.7 para 4 | If autos would be destroyed by thrown exception transferring to destination, longjmp to that destination has undefined behavior |

Special Behavior of Atexit Functions [atex]

The exit function can check whether execution of the exit function has previously started. If so, one of the following implementation-defined actions can be performed: invoke an "extreme exit" cleanup function; or invoke the abort function.

The methods shown in this section can be used to eliminate the following undefined behavior:

| SSM# | C-Std# | Description |
| --- | --- | --- |
| atex | c7.20.4.3 | The program executes more than one call to the exit function |

Arithmetic Exceptions [exc]

If at compile-time the right operand of division or remainder is zero, a fatal diagnostic message can be produced. In Debug mode, if at run-time the right operand of division or remainder is zero, an "unwind" (such as ss_unwind) can be invoked, and the implementation may throw an exception of an implementation-defined type. In non-Debug mode, if at run-time the right operand of division or remainder is zero, the result can be the maximum value of the result type, which for a floating-point type may be an infinity.

If at compile-time the left operand of division or remainder is the maximum negative value of its type and the right operand is −1, a fatal diagnostic message can be produced. In Debug mode, if at run-time the left operand of division or remainder is the maximum negative value of its type and the right operand is −1, an "unwind" (such as ss_unwind) can be invoked, and the implementation may throw an exception of an implementation-defined type. In non-Debug mode, if at run-time the left operand of division or remainder is the maximum negative value of its type and the right operand is −1, the result can be the maximum value of the result type.

If at compile-time the result of an integral arithmetic operation is too large for its type, a fatal diagnostic message can be produced. In Debug mode, if at run-time the result of an integral arithmetic operation is too large for its type, an "unwind" (such as ss_unwind) can be invoked, and the implementation may throw an exception of an implementation-defined type. In non-Debug mode, if at run-time the result of an integral arithmetic operation is too large for its type, the result can be the value of the twos-complement operation with wrap-around.

The methods shown in this section can be used to eliminate the following undefined behaviors:

| SSM# | C-Std# | Description |
|---|---|---|
| exc | c6.5.5 | The value of the second operand of the / or % operator is zero |
| exc | c6.5exc | An exceptional condition occurs during the evaluation of an expression |

Control of Dangling Pointers [dang]

One category of undefined behavior arises from accessing freed storage. Furthermore, each freed pointer must previously have been allocated.

These undefined behaviors can be eliminated by use of garbage collection, either conservative (see, e.g., Hans-J Boehm, "A Garbage Collector for C and C++", or accurate (see e.g., Fergus Henderson, "Accurate Garbage Collection in an Uncooperative Environment", ISMM'02, June 2002, Berlin, Germany, ACM 1581135394/02/0006, supplemented with the following special treatment of pointers to terminated stack frames. Directly assigning an address in the current function's stack frame to a longer-life pointer can be prohibited. Define a pointer-retainer function as a function which stores a pointer argument in heap or static storage. Passing a pointer to stack to a pointer-retainer function can be prohibited. (Whatever data resides in the stack can be copied to heap or to static, to avoid the prohibition.)

Memory that could contain pointers can be initialized to zeroes. Therefore, (as in Boehm conservative garbage-collection) malloc allocates space that might have pointers in it, so the space is zero-filled. There can be a new attribute to describe a state named e.g. "not_ptrs" for any storage which is guaranteed not to contain pointers, and a different version of malloc can be used for such storage (equivalent to GC_malloc_atomic in the Boehm library):

```
void * malloc not_ptrs(size t n);
```

If storage with the not_ptrs attribute is cast to pointer-to-anything, then a fatal diagnostic message can be produced. The not_ptrs attribute can be removed from any storage by assigning zero to the bytes of the storage; a byte-oriented alias is mandatory (char, or unsigned char, or a library function such as memset which modifies the bytes of memory).

An alternative method for prevention of dangling pointers is known (see e.g., Todd M. Austin et al., *Efficient Detection of All Pointer and Array Access Errors*, Proceedings of the ACM SIGPLAN '94 Conference on Programming Language Design and Implementation, June 1994), which is a feasible solution for an implementation which operates entirely in BSAFE mode (see below).

The methods shown in this section can be used to eliminate the following undefined behaviors:

| SSM# | C-Std# | Description |
|---|---|---|
| dang | c7.20.3.2, c7.20.3.4 | The pointer argument to the free or realloc function does not match a pointer earlier returned by calloc, malloc, or realloc, or the space has been deallocated by a call to free or realloc |
| dang | c7.20.3 | The value of a pointer that refers to space deallocated by a call to the free or realloc function is used |
| dang | c6.2.4 | An object is referred to outside of its lifetime |
| dang | c6.2.4 | The value of a pointer to an object whose lifetime has ended is used |

Inclusion of C 1999 Extensions [c99]

In C99 programs which are not C++ programs, some undefined behaviors can be eliminated by using techniques already known in the current art. The next paragraphs will describe some exemplary such techniques.

The compiler can produce a fatal diagnostic message for the following situations which can be detected at compile-time: a function with external linkage is declared with an inline function specifier, but is not also defined in the same translation unit; the CX_LIMITED_RANGE, FENV_AX2ESS, or FP_CONTRACT pragma is used in any context other than outside all external declarations or preceding all explicit declarations and statements inside a compound statement; an argument to a floating-point classification or comparison macro is not of real floating type; a complex argument is supplied for a generic parameter of a type-generic macro that has no corresponding complex function; the type of an argument to a type-generic macro is not compatible with the type of the corresponding parameter of the selected function; part of the program tests floating-point status flags, sets floating-point control modes, or runs under non-default mode settings, but was translated with the state for the FENV_AX2ESS pragma off.

The implementation of library functions can in Debug mode strictly validate argument values, and in non-Debug mode either strictly validate or adjust argument values to acceptable argument values.

The compiler can use Saturation semantics to produce well-defined results for the following situation: the value of the result of an integer arithmetic or conversion function cannot be represented.

The methods shown in this section can be used to eliminate the following undefined behaviors:

| SSM# | C-Std# | Description |
|---|---|---|
| c99 | c6.7.4 | A function with external linkage is declared with an inline function specifier, but is not also defined in the same translation unit |
| c99 | c7.3.4, c7.6.1, c7.12.2 | The CX_LIMITED_RANGE, FENV_AX2ESS, or FP_CONTRACT pragma is used in any context other than outside all external declarations or preceding all explicit declarations and statements inside a compound statement |

-continued

| SSM# | C-Std# | Description |
|---|---|---|
| c99 | c7.12.3, c7.12.14 | An argument to a floating-point classification or comparison macro is not of real floating type |
| c99 | c7.22 | A complex argument is supplied for a generic parameter of a type-generic macro that has no corresponding complex function |
| c99 | c7.22 | The type of an argument to a type-generic macro is not compatible with the type of the corresponding parameter of the selected function |
| c99 | c7.6.1 | Part of the program tests floating-point status flags, sets floating-point control modes, or runs under non-default mode settings, but was translated with the state for the FENV_AX2ESS pragma off |
| c99 | c7.6.2 | The exception-mask argument for one of the functions that provide access to the floating-point status flags has a nonzero value not obtained by bitwise OR of the floating-point exception macros |
| c99 | c7.6.2.4 | The fesetexceptflag function is used to set floating-point status flags that were not specified in the call to the fegetexceptflag function that provided the value of the corresponding fexcept_t object |
| c99 | c7.6.4.3, c7.6.4.4 | The argument to fesetenv or feupdateenv is neither an object set by a call to fegetenv or feholdexcept, nor is it an environment macro |
| c99 | c7.8.2.1, c7.8.2.2, c7.8.2.3, c7.8.2.4, c7.20.6.1, c7.20.6.2, c7.20.1 | The value of the result of an integer arithmetic or conversion function cannot be represented |

Conditionally-Defined Behaviors [cdef]

Many of the situations defined as undefined behavior could be more precisely delineated by permitting a reduced range of the alternatives (as has been described in various places in the current art). The compiler can implement a choice for each behavior: either produce a fatal diagnostic message, or produce a specified implementation-defined behavior, for each of the situations coded with "cdef" in column one of the following table.

The methods shown in this section will eliminate the following undefined behaviors:

| SSM# | C-Std# | Description |
|---|---|---|
| cdef | c5.1.1.2 | A nonempty source file does not end in a new-line character which is not immediately preceded by a backslash character or ends in a partial preprocessing token or comment |
| cdef | c6.6 | A constant expression in an initializer is not, or does not evaluate to, one of the following: an arithmetic constant expression, . . . |
| cdef | c6.6 | . . . a null pointer constant, an address constant, or an address constant for an object type plus or minus an integer constant expression |
| cdef | c6.6 | An arithmetic constant expression does not have arithmetic type; has operands that are not integer constants, floating constants, . . . |
| cdef | c6.6 | . . . enumeration constants, character constants, or sizeof expressions; or contains casts (outside operands to sizeof operators) other than conversions of arithmetic types to arithmetic types |
| cdef | c6.6 | An expression that is required to be an integer constant expression does not have an integer type; has operands that are not integer constants, enumeration constants, character constants, sizeof expressions whose results are integer constants, or . . . |
| cdef | c6.6 | . . . sizeof expressions whose results are integer constants, or immediately-cast floating constants; or contains casts (outside operands to sizeof operators) other than conversions of arithmetic types to integer types |
| cdef | c6.7.5.3 | In a context requiring two function types to be compatible, they do not have compatible return types, or . . . |
| cdef | c6.7.5.3 | . . . their parameters disagree in use of the ellipsis terminator or the number and type of parameter (after default argument promotion, when there is no parameter type list or when one type is specified by a function definition with an identifier list) |
| cdef | c5.1.1.2 | A nonempty source file does not end in a new-line character which is not immediately preceded by a backslash character . . . |
| cdef | c5.1.1.2 | A nonempty source file . . . or ends in a partial preprocessing token |
| cdef | c5.1.1.2 | Token concatenation produces a character sequence matching the syntax of a universal character name |
| cdef | c5.1.2.2.1 | A program in a hosted environment does not define a function named main using one of the specified forms |
| cdef | c5.2.1 | A character not in the basic source character set is encountered in a source file, except in an identifier, a character constant, a string literal, a header name, a comment, or a preprocessing token that is never converted to a token |

-continued

| SSM# | C-Std# | Description |
|---|---|---|
| cdef | c5.2.1.2 | An identifier, comment, string literal, character constant, or header name contains an invalid multibyte character or does not begin and end in the initial shift state |
| cdef | c6.10.1 | The token defined is generated during the expansion of a #if or #elif preprocessing directive, or the use of the defined unary operator does not match one of the two specified forms prior to macro replacement |
| cdef | c6.10.2 | The #include preprocessing directive that results after expansion does not match one of the two header name forms |
| cdef | c6.10.2 | The character sequence in an #include preprocessing directive does not start with a letter |
| cdef | c6.10.3 | There are sequences of preprocessing tokens within the list of macro arguments that would otherwise act as preprocessing directives |
| cdef | c6.10.3.2 | The result of the preprocessing operator # is not a valid character string literal |
| cdef | c6.10.3.3 | The result of the preprocessing operator ## is not a valid preprocessing token |
| cdef | c6.10.4 | The #line preprocessing directive that results after expansion does not match one of the two well-defined forms, or its digit sequence specifies zero or a number greater than 2147483647 |
| cdef | c6.10.6 | A #pragma STDC preprocessing directive does not match one of the well-defined forms |
| cdef | c6.10.8 | The name of a predefined macro, or the identifier defined, is the subject of a #define or #undef preprocessing directive |
| cdef | c6.2.2 | The same identifier has both internal and external linkage in the same translation unit |
| cdef | c6.2.6.2 | The arguments to certain operators are such that could produce a negative zero result, but the implementation does not support negative zeros |
| cdef | c6.3.2.1 | A non-array lvalue with an incomplete type is used in a context that requires the value of the designated object |
| cdef | c6.3.2.1 | An lvalue having array type is converted to a pointer to the initial element of the array, and the array object has register storage class |
| cdef | c6.3.2.2 | An attempt is made to use the value of a void expression, or an implicit or explicit conversion (except to void) is applied to a void expression |
| cdef | c6.3.2.3 | Conversion between two pointer types produces a result that is incorrectly aligned |
| cdef | c6.4 | An unmatched ' or character is encountered on a logical source line during tokenization |
| cdef | c6.4.1 | A reserved keyword token is used in translation phase 7 or 8 for some purpose other than as a keyword |
| cdef | c6.4.2.1 | A universal character name in an identifier does not designate a character whose encoding falls into one of the specified ranges |
| cdef | c6.4.2.1 | The initial character of an identifier is a universal character name designating a digit |
| cdef | c6.4.2.1 | Two identifiers differ only in nonsignificant characters |
| cdef | c6.4.2.2 | The identifier _func_ is explicitly declared |
| cdef | c6.4.7 | The characters ', \,, , c, c, or , c* occur in the sequence between the < and > delimiters, or the characters ', \, , c, c, or , c* occur in the sequence between the delimiters, in a header name preprocessing token |
| cdef | c6.5.4 | A pointer is converted to other than an integer or pointer type |
| cdef | c6.6 | The value of an object is accessed by an array-subscript [ ], member-access . or ->, address &, or indirection * operator or a pointer cast in creating an address constant |
| cdef | c6.7 | An identifier for an object is declared with no linkage and the type of the object is incomplete after its declarator, or after its init-declarator if it has an initializer |
| cdef | c6.7.1 | A function is declared at block scope with an explicit storage-class specifier other than extern |
| cdef | c6.7.2.1 | A structure or union is defined as containing no named members |
| cdef | c6.7.2.3 | When the complete type is needed, an incomplete structure or union type is not completed in the same scope by another declaration of the tag that defines the content |
| cdef | c6.7.3 | The specification of a function type includes any type qualifiers |
| cdef | c6.7.3 | Two qualified types that are required to be compatible do not have the identically qualified version of a compatible type |
| cdef | c6.7.5.1 | Two pointer types that are required to be compatible are not identically qualified, or are not pointers to compatible types |
| cdef | c6.7.5.2 | In a context requiring two array types to be compatible, they do not have compatible element types, or their size specifiers evaluate to unequal values |
| cdef | c6.7.5.2 | The size expression in an array declaration is not a constant expression and evaluates at program execution time to a nonpositive value |
| cdef | c6.7.5.3 | A storage-class specifier or type qualifier modifies the keyword void as a function parameter type list |
| cdef | c6.7.8 | The initializer for a scalar is neither a single expression nor a single expression enclosed in braces |
| cdef | c6.7.8 | The initializer for a structure or union object that has automatic storage duration is neither an initializer list nor a single expression that has compatible structure or union type |
| cdef | c6.7.8 | The initializer for an aggregate or union, other than an array initialized by a string literal, is not a brace-enclosed list of initializers for its elements or members |

-continued

| SSM# | C-Std# | Description |
|---|---|---|
| cdef | c6.9.1 | A function definition includes an identifier list, but the types of the parameters are not declared in a following declaration list |
| cdef | c6.9.1 | A function that accepts a variable number of arguments is defined without a parameter type list that ends with the ellipsis notation |
| cdef | c6.9.1 | An adjusted parameter type in a function definition is not an object type |
| cdef | c6.9.2 | An identifier for an object with internal linkage and an incomplete type is declared with a tentative definition |
| cdef | c7.1.2 | A header is included within an external declaration or definition |
| cdef | c7.2 | The argument to the assert macro does not have a scalar type |
| cdef | c7_17 | The member designator parameter of an offsetof macro is an invalid right operand of the . operator for the type parameter, or designates a bit-field |
| cdef | c7_18.4 | The argument in an instance of one of the integer-constant macros is not a decimal, octal, or hexadecimal constant, or it has a value that exceeds the limits for the corresponding type |

Dynamic Monitoring of Allocated Storage [dyna]

The methods described below will in some cases require a fatal diagnostic for situations in which the compiler and linker are given insufficient information to determine that fetch or store operations do not introduce undefined behavior. A recent article has published a method which can alternatively be applied to these most-difficult cases: "A Practical Dynamic Buffer Overflow Detector", by O. Ruwase and M. S. Lam, (http://suif.stanford.edu/papers/tunji04.pdf). In this alternative, unverifiable fetch-or-store operations can be checked by the cited methods, requiring that all potential fetched-or-stored objects be entered into the cited tables.

It would be desirable to eliminate further undefined behaviors in the execution of programs in the "intersection" of C and C++; that is, in C programs which use only the features described in the C++ standard, and of C++ programs which use only the features described in the C standard.

Furthermore, it would be desirable to eliminate undefined behaviors in the execution of programs in "full C++", i.e., of C++ programs which use features which are not described in the C standard.

Additionally, it would be desirable to eliminate further undefined behaviors in the execution of programs in "full C99", i.e., of C99 programs which use features which are not described in the C++ standard or in the 1990 C standard.

It would furthermore be desirable to automate (e.g., through compiler design) techniques to provide safe secure development of software, including but not limited to techniques for addressing undefined behavior in the full C and C++ programming languages.

Advantageous features provided by exemplary illustrative non-limiting implementations of the technology herein include:

A Safe Secure Compiler ("SSC") which produces Safe Secure Object Files or fatal diagnostic messages.

A Safe Secure Inputs Check-List ("SSICL") which records checksum information for the inputs to the execution of a Safe Secure Compiler.

A Safe Secure Bounds Data File ("SSBDF") which records Requirements and Guarantees for the defined and undefined symbols in one or more corresponding object files, as well as checksum information.

A Safe Secure Linker ("SSL") which combines object files and the corresponding Safe Secure Bounds Data Files, producing either fatal link-time diagnostics or a Safe Secure Executable Program.

A Safe Secure Semantic Analyzer ("SSSA") which uses the parse tree to determine Requirements and Guarantees.

A Safe Secure Diagnostic Generator ("SSDG") which generates fatal diagnostic messages in situations where undefined behavior would result and generates various warning messages to call the programmer's attention to various other situations.

A Safe Secure Code Generator ("SSCG") which generates object code which is free from the designated sets of undefined behaviors (including "buffer overflow" and "null pointer indirection").

A Safe Secure Pointer Attribute Hierarchy ("SSPAH") which controls the inference of attributes based upon other attributes.

A Safe Secure Pointer Attribute Predicate Table ("SSPAPT") which controls the determination of attributes resulting from predicate expressions.

A Safe Secure Bounds Data Table ("SSBDT") which tabulates the Guarantees and Requirements for expressions, sub-expressions, declarations, identifiers, and function prototypes.

A Safe Secure Interface Inference Table ("SSIIT") which controls the inference of Requirements on the interface of each externally-callable function.

A Safe Secure Bounds Data Symbol Table ("SSBDST") which tabulates the Requirements and Guarantees for defined and undefined symbols during the Safe Secure Linking process.

A Safe Secure Link-Time Analyzer ("SSLTA") which matches Requirements to Guarantees for function-call, external array, and external pointer linkage contexts.

A Safe Secure Link Diagnostic Generator ("SSLDG") which generates a fatal diagnostic at link-time if any Requirement is unsatisfied; this prevents the production of any executable program.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 7 shows an exemplary illustrative non-limiting Safe Secure Pointer Attribute Hierarchy (SSPAH 41);

FIG. 8 shows an exemplary illustrative non-limiting Safe Secure Pointer Attribute Predicate Table (SSPAPT 51);

FIG. 10 shows an exemplary illustrative non-limiting Safe Secure Interface Inference Table (SSIIT Y111);

DETAILED DESCRIPTION

Figure 1:
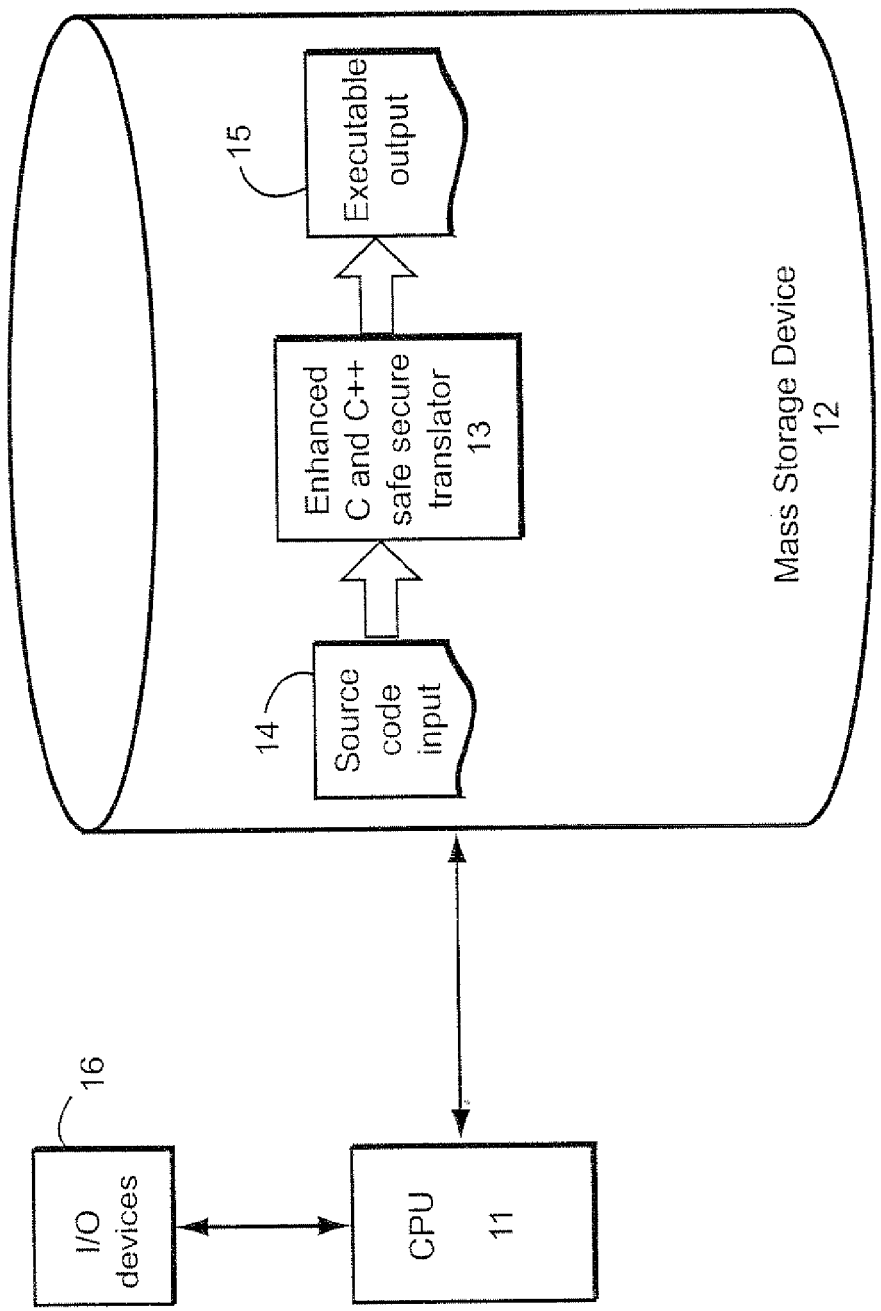
FIG. 1 shows an example safe secure software development system.
Figure 2:
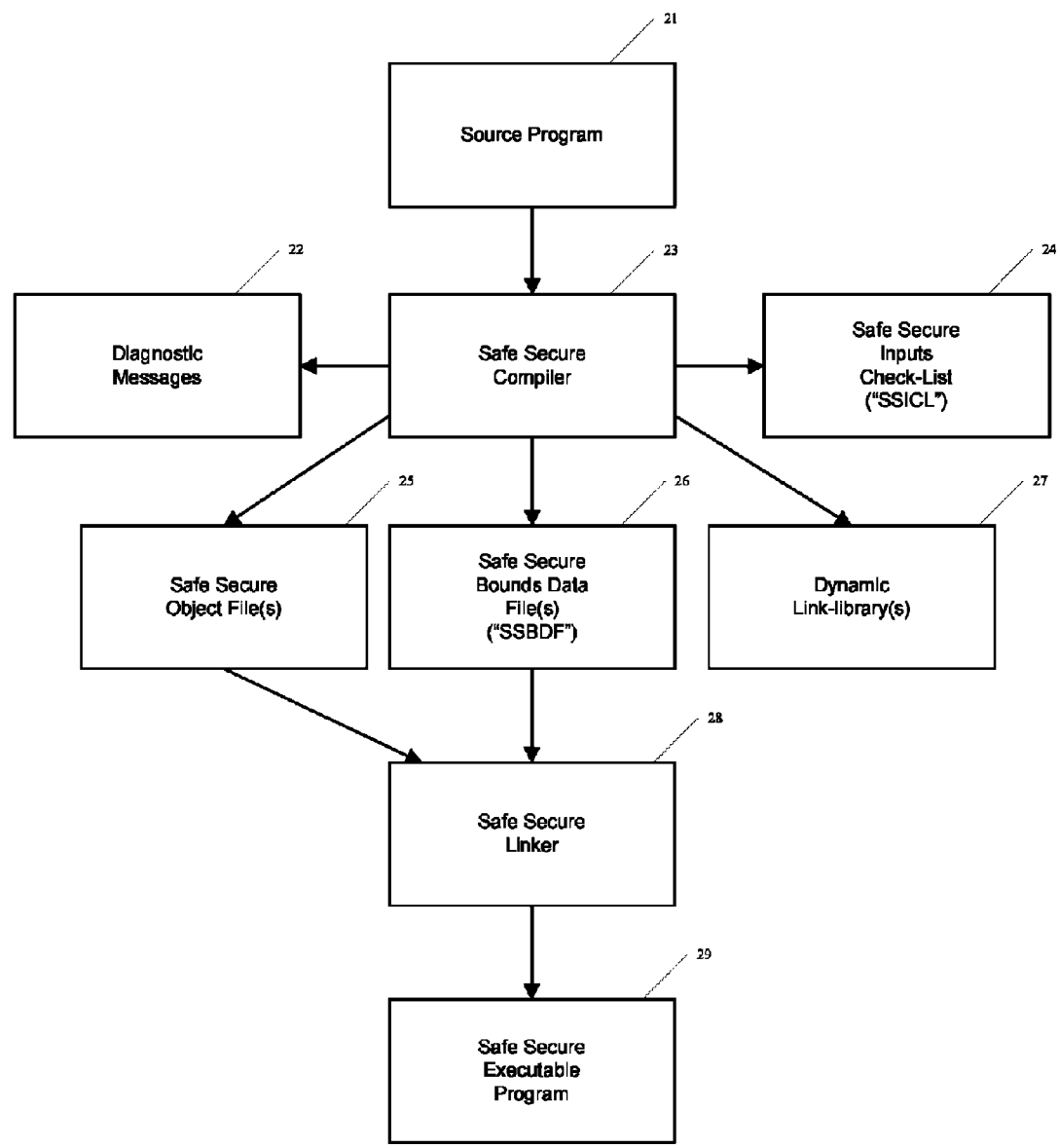
FIG. 2 shows a flow diagram of an exemplary illustrative non-limiting implementation of a program translation system.

FIG. 1 shows an example illustrative non-limiting automated safe secure computer software development system 100. For example, an exemplary non-limiting system 100 may comprise a central processing unit (CPU) 11 coupled to a mass storage device 12 such as a magnetic or other disk. The CPU 11 may execute program instructions including for example a safe secure translator 13 the executable code for which is stored on the mass storage device and executed by CPU 11. When executed by CPU 11, the translator 13, in simplified terms, takes a source code input 14 and converts it to an executable output 15 that can be executed by the same or different computer. The computer system 100 may further include input/output devices 16 such as for example keyboards, pointing devices, display devices and the like so that human software developers can interact with the computer. In one exemplary arrangement, the techniques described herein can be used to enhance a conventional compiler for the C and C++ programming language (as will be described below) to eliminate undefined behavior. Referring to FIG. 2, consider the following source program serving as a non-limiting illustrative example of Source Program 21 providing input to Safe Secure Compiler 23:

```
int main( ) {
return 0; }
```

Figure 3:
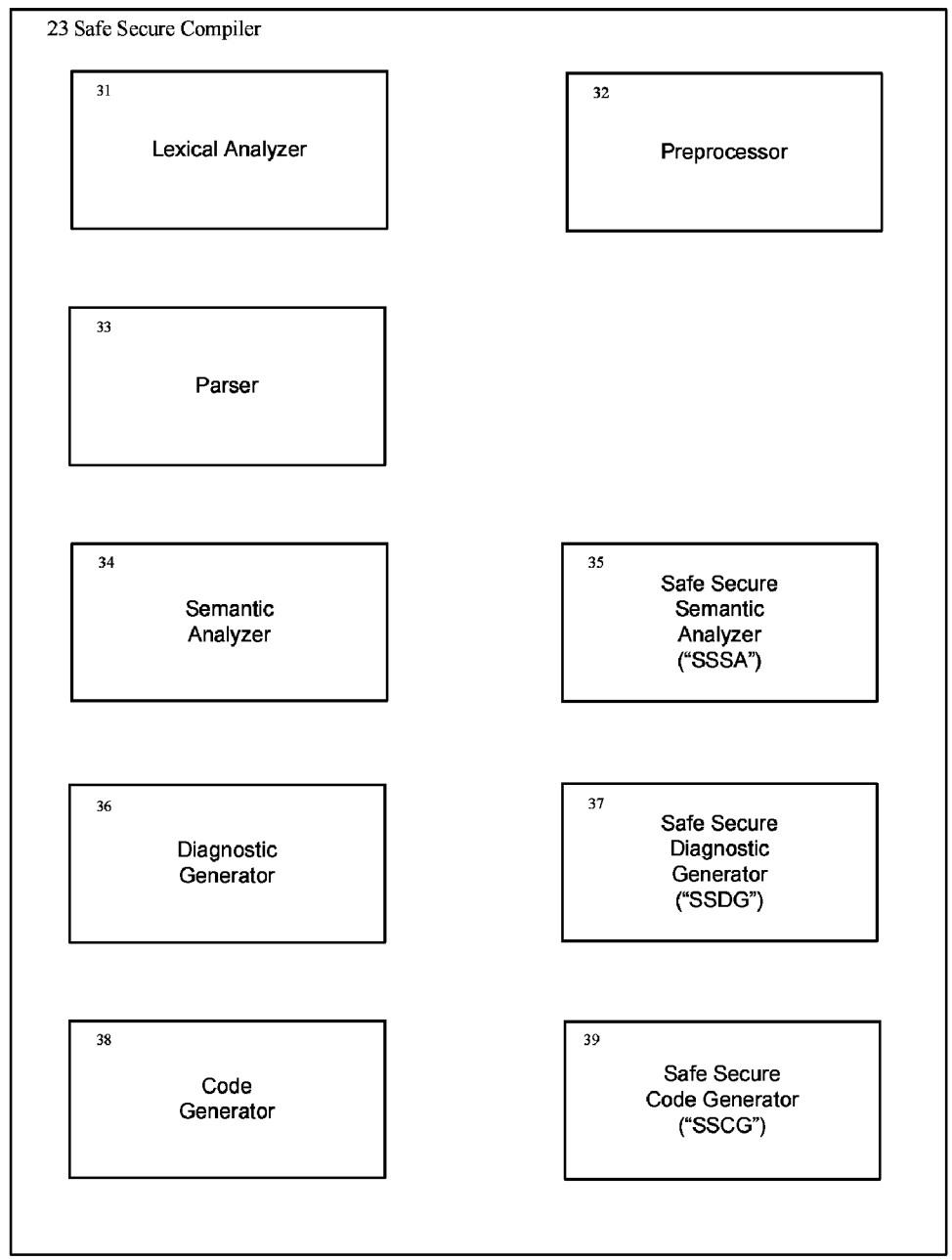
FIG. 3 shows a block diagram of an exemplary illustrative non-limiting compiler implementation.

Exemplary components of Safe Secure Translator 13 are shown in FIG. 3. In compiling this example, Lexical Analyzer 31, Preprocessor 32, and Parser 33 perform as commonly understood in the art. Then, Semantic Analyzer 34 verifies that the integer 0 is an acceptable value to return from the function "main" which is defined to return "int". After that, the Code Generator 38 will produce an Object File 25, the ultimate output from Safe Secure Compiler 23. Finally, the Safe Secure Linker 28 will combine the Object File 25 with various system-dependent library code, producing Executable Program 29.

States of Objects [stat]

The standards for C and C++ make use of modifiers upon types, known as "qualifiers" in C and "cv-qualifiers" in C++. Once declared, an identifier that designates an object (region of memory) retains its type and cv-qualifiers throughout its scope. A related concept, but distinctly different, is the state of an object.

One well-known state in modern programming languages is the "definitely assigned" state. Definite-assignment analysis is a central feature of the Java and C# programming languages. The present exemplary illustrative implementation of a Safe Secure method does not use the definitely-assigned state in quite the same way, but does make extensive use of state analysis. One example of a state used in the Safe Secure method is the pointer-null-state, which has three alternative state values. (The pointer-null-state in this example is one dimension of a more complicated pointer-range-state, shown later.)

a. Nul—pointer is null.

b. Nnul—pointer is non-null.

c. Qnul—pointer might, or might not, be null; i.e. "questionably-null".

Analysis of program state proceeds using flow analysis. Consider the following source program serving as another non-limiting illustrative example of Source Program 21 providing input to Safe Secure Compiler 23:

```
int main( ) {
int *p = (int*)0;
return *p; }
```

As described previously, Lexical Analyzer 31, Preprocessor 32, and Parser 33 perform as commonly understood in the art. Semantic Analyzer 34 determines that pointer p is initialized on its declaration and determines that the initial value is the null pointer value. Within Semantic Analyzer 34, control flow analysis determines that there is no transfer of control in or out of the control-flow arc from the point of initialization to the point of usage (which attempts to fetch a value from the target of pointer p) and data-flow analysis determines that there are no alterations of the value of pointer p within that arc. Control-flow analysis and data-flow analysis are commonly used to support optimization, but they also provide input data for the Diagnostic Generator 36. In the present example, the Semantic Analyzer 34 will commonly provide to the Diagnostic Generator 36 data indicating that upon all possible arcs the program would encounter the indirecting of a null pointer, and the Diagnostic Generator 36 will commonly produce a fatal diagnostic message and will commonly prevent the Code Generator 38 from producing any object code. (Each use of the term "fatal diagnostic" implies without exception that object code is never produced for any program which causes a fatal diagnostic.) In a non-exclusive alternative to the present method, an input file describing hard-coded machine addresses can be provided as an input to the Safe Secure Compiler 23, which will specify the address, bounds, and data type of specific locations in the machine address space.

Consider this portion of another Source Program 21:

```
if (p!= 0) ++n;
```

Figure 4:
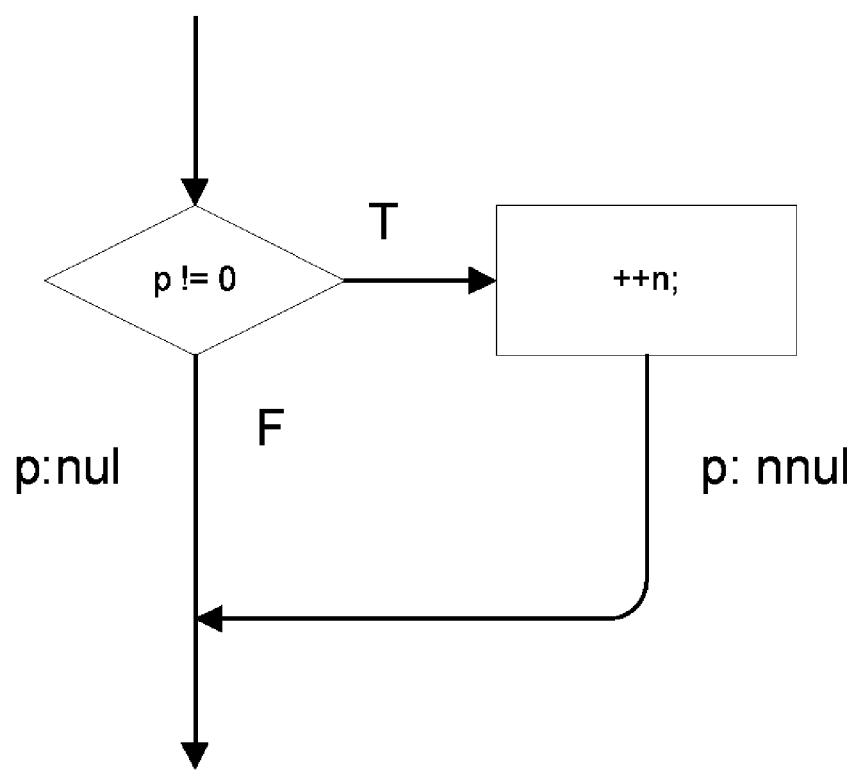
FIG. 4 shows exemplary illustrative annotation of pointer-null-state to a non-limiting illustrative flow-chart.
Figure 5:
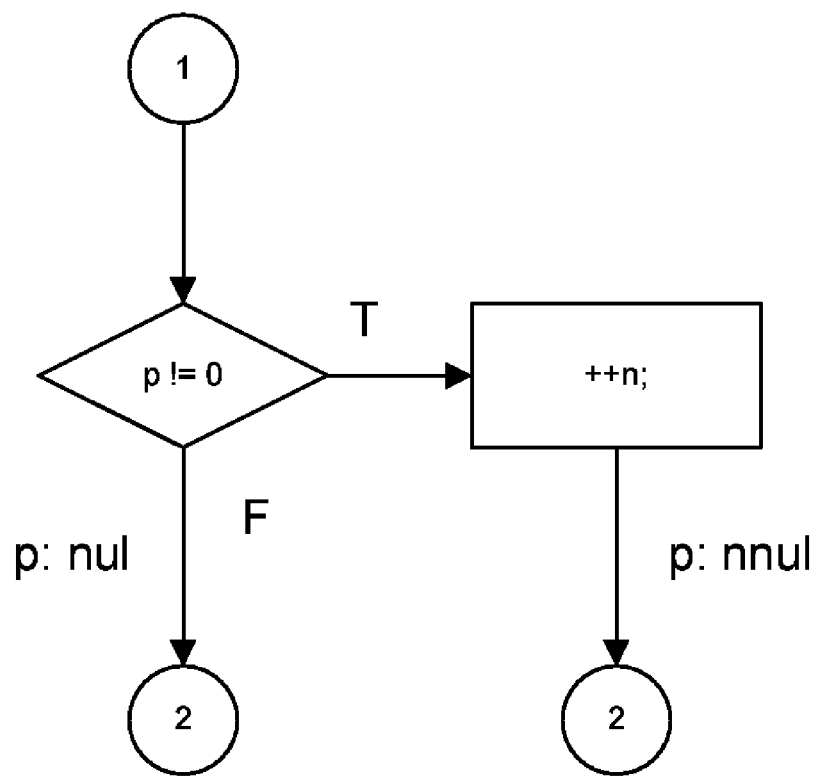
FIG. 5 shows a different exemplary illustrative representation of the same flow-chart.

FIG. 4 shows the flowchart which corresponds to the control flow in this example. In this conventional flowchart presentation, the two arcs re-join into the same flow-of-control (program-counter) state, but the pointer-null-state of p is different after the branch. An alternative presentation provides numbers (or labels) to each flow-of-control state, but records the continuation of each arc as a distinctly different state, as shown in FIG. 5. The difference is made clearer by adding another instruction to the example:

```
if (p!= 0) ++n;
if (p==0) ++m;
```

Figure 6:
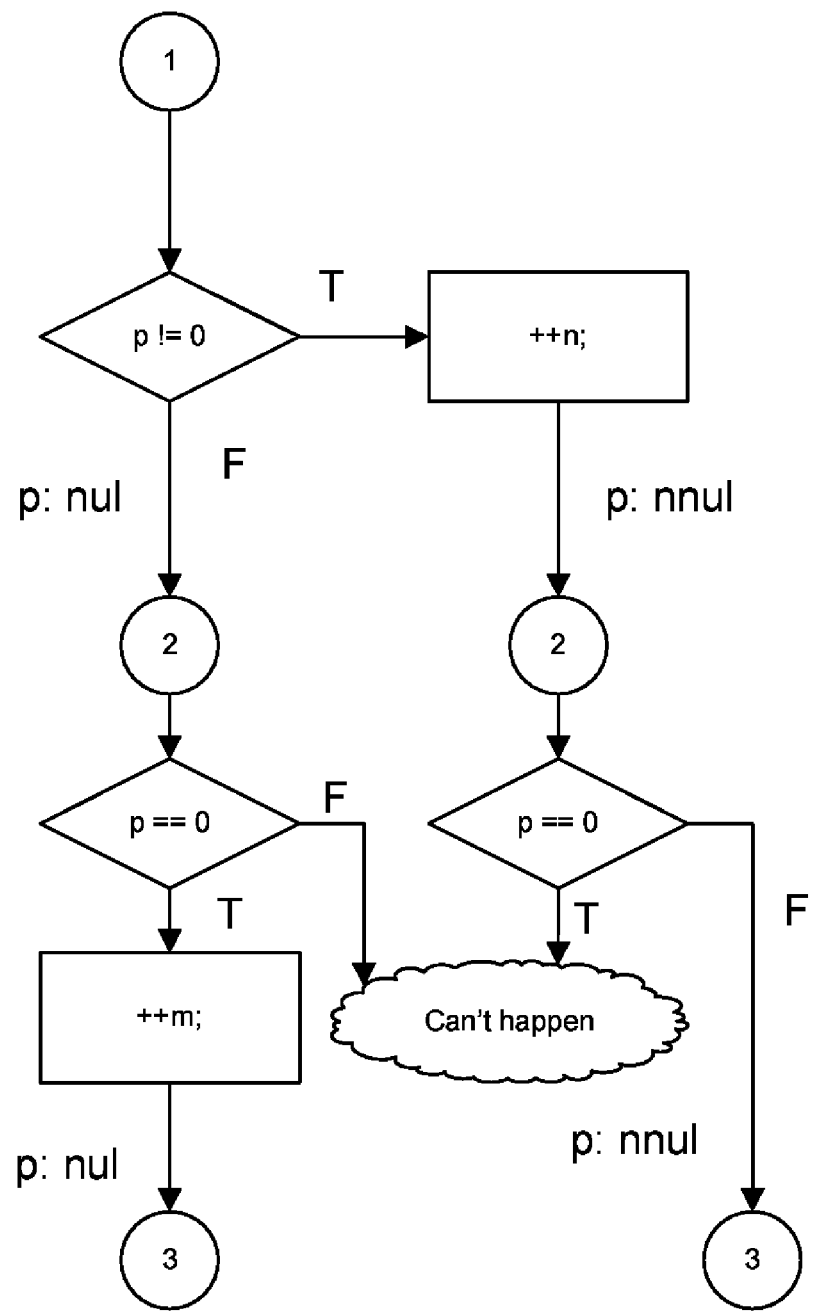
FIG. 6 shows a further exemplary illustrative flow-chart, including some "can't-happen" outcomes.

The resulting flowchart is shown in FIG. 6. The Safe Secure Semantic Analyzer ("SSSA") 35 verifies that the pointer-null-state of pointer p pre-determines the outcomes of the second "if" statement, so there are only two actual flow-of-control paths in the flowchart of FIG. 6. In the SSSA 35 the flow chart of each function is factored into separate continuations of each arc at every place in the function, except that all arcs re-join at the return from the function (and the epilog implied by that return).

The concept of "state" applies to objects during run-time. Herein, the term "attribute" is used for the compile-time designation of a run-time state of an identifier or expression.

As will be explained below, the compile-time attributes as used in the SSSA 35 are sometimes capable of modeling every detail of the run-time state analysis; in these cases the compile-time attributes are all that is needed in the analysis. In other cases, the compile-time attributes are capable of modeling many, but not all, details of the run-time state analysis; in these cases, the compile-time attributes permit compile-time diagnosis of many but not all errors. Therefore, these cases will require some bits in the run-time storage to record run-time state information.

With this background, we can describe the system of pointer-range states and attributes that is employed in the SSSA 35. We distinguish the following attributes of pointers, noting that the attributes are not mutually exclusive:

| Attribute | Description |
| --- | --- |
| Unk | Unknown |
| Nul | Null |
| Ni | not-indirectable |
| Nnul | non-null |
| Qnul | maybe-null = nul or nnul |
| Qi | maybe-indirectable = indirectable or nul |
| Nth | not too high |
| Ntl | not too low |
| End | one-too-far |
| I | Indirectable |
| Lo | At Lo limit |
| Hi | At Hi limit |
| Nullterm | At or before Hi, null-terminator is present |
| Length | Number of characters prior to null-terminator |
| T | target is defined |

Some attributes imply other attributes; see the Safe Secure Pointer Attribute Hierarchy ("SSPAH") 41 in FIG. 7 for details.

When the source program contains a test (i.e., predicate) to a pointer (or subscript) value, that pointer's attribute will be set, upon the true and false outcome arcs from that predicate; see the Safe Secure Pointer Attribute Predicate Table ("SSPAPT") 51 in FIG. 8 for details.

The Lo, Hi, End, Nth, and Ntl attributes can be applied either to a pointer or to a subscript (if the subscript's array context is clear).

The spelling and/or capitalization of the names of the attributes, values, Requirements, and Guarantees are not essential, and can be chosen to meet any other requirements. For a non-limiting example, the attribute name "Nullterm" could be abbreviated as "Nullt", and the attribute name "Indirectable" could be abbreviated as "Indir" (or "I" as shown above), provided that those names are unambiguous in the context in which they are used. For another non-limiting example, the attribute name "End" could be changed to "Too-far", to emphasize the important difference between the "Too-far" attribute and the "Hi" attribute (but the name "End" will be used consistently within the remainder of this application).

To determine the state transition for the Nullterm attribute, the SSSA 35 first determines the outcome Indirectable ("I") attribute; if the outcome attribute is I then it is also Nullterm; if it is not I then it is not Nullterm either. For example if a pointer p is Nullterm, and comparison <=Hi is True, the result attribute is I and is also Nullterm. But if the comparison is False, the result attribute is Ni and not Nullterm.

The present method does not require that the null pointer compares low to all other pointer values. In an alternative method, this requirement ("unsigned pointer comparison") is added to the pointer semantics; "nul>=Lo" becomes a "can't happen" condition that produces the "Ntl" attribute, and "nul>Hi" becomes a "can't happen" condition that produces the "Ni" attribute.

The Safe Secure method relies heavily upon analysis of pointer-bounds states, but there are some other significant states of storage.

In C and C++, a union can contain objects of different types at different times. In the present Safe Secure method there are no trap representations; any sequence of bytes can be fetched without causing any exceptions, and those bytes determine a value within the range of values for the type of the lvalue. Therefore, accessing a union object through an lvalue of an "incorrect" type may produce an incorrect value but will not cause an exception or any undefined behavior. Assigning a value to a union member determines the current effective type of the union, which is an important aspect of the run-time system of states. In the Safe Secure method, assigning a pointer (address) value to a union object establishes the state of all union members which are pointers to types with the same representation and alignment. In an alternative, because of the restrictions listed in the section "Design-time choices [dt]", assigning a pointer (address) value to a union object establishes the state of all union members which are pointers to any data type. With or without this alternative, an expression which uses the value of a pointer member of a union imposes a Requirement that the union object is in a pointer state; i.e., it imposes a Requirement that the most recent assignment to the union object was an assignment to a pointer member. Taken together, the behaviors in this paragraph indicate that, since any C/C++ object can be considered to be a union of the declared object and an array of char, the "member" specified in any Requirement or Guarantee is actually defined only by a numerical offset from the start of that object. The designation of members within the SSC 23 could be represented in a notation that conveys the offset information; for a non-limiting example, the "member" at offset zero might be represented as the ".m0" member. However, in examples herein we show the more conventional notation of member names. Consider the following non-limiting example:

```
union { char *p; unsigned char *q; int n; } u;
char a[3] = "ab";
u.p = a; // u.p and u.q are in Indirectable (i) state, and equal to Lo of a
u.n = 0; // u.p and u.q are in Unknown (unk) state
```

In the terminology of the Safe Secure method, all the attributes shown so far appear as Guarantees, i.e. post-conditions, established by various predicates on arcs of control flow. In subsequent sections, attributes will be used in Requirements, i.e. pre-conditions, Stream objects can in one exemplary implementation contain an "is-open" run-time state which is reflected in a compile-time attribute (called e.g. "is_open"). The representation of the is-open state can in one exemplary implementation be non-zero.

After the standard C and C++ library function setvbuf is invoked, the calling program should make no further use of the array provided to the buf argument. In the Safe Secure Bounds Data File 26 which contains data for the setvbuf function, a post-condition specifies that the buf argument is Not-Indirectable after invocation, using methods defined in the next section.

In some cases, after consideration of all compile-time and link-time restrictions, a Requirement can be guaranteed only by inserting extra run-time code. The extra run-time code is usually of no concern in the Debug mode. However, in Non-Debug mode the overhead of any inserted run-time code is of crucial importance.

The process of "code hoisting" is well understood in the prior art. We rely upon code hoisting to pull inserted run-time code out of the inner loops. However, some additional techniques of code hoisting are described below.

In most algorithms involving a subscript or pointer variable, the variable is monotonically incremented toward some limit which is less than or equal to the Hi or End value. In a few cases, the monotonic incrementing is interrupted by a bounded number of decrements, which the compiler can determine to never go below the Lo value. Somewhat less commonly, the same two patterns are found in the downward (decrementing) direction: either monotonic decrementing, or decrementing interrupted by bounded incrementing.

In all the cases described in the preceding paragraph, even if the compiler cannot determine (at compile-time) that the variable does not exceed the appropriate limit in its direction of travel, there is no need to redundantly verify that it has not exceeded the opposite limit. In other words, at most one test is required in these cases, not two. Note that this requires a design-time restriction that the lowest address in memory is not within a user-accessible object. (The corresponding restriction that the highest address in memory is not within a user-accessible object is already required by the C and C++ standards.)

In some of these cases, the compiler can determine that the variable will not exceed (above or below) the value of some other variable, e.g. the value of a loop limit, but cannot determine that the loop limit does not exceed the appropriate bounding value (the Bound, Tsize, Lo, Hi, or End value). In such cases, it suffices for the compiler to generate code which verifies that the bounding value (e.g. loop limit) does not exceed the appropriate bounding value, rather than redundantly checking the value of the subscript or pointer variable itself at each access. In other cases, the compiler can determine that the variable might exceed the allocated bounds of an object, but only by a number of members (N) which can be determined at compile-time. In such cases, the compiler can avoid any run-time overhead by allocating N additional members of the object at successive memory locations. (The size of operator should not report such padding in the total size reported.) And in other cases, the compiler can determine that the loop will continue until some sentinel value is reached. In such cases, the compiler can ensure that the sentinel value is placed at the end of the array object, either as a data value within the object itself, or as a value placed into padding allocated after the object. In still other cases, the compiler can determine that the loop will continue until some predicate involving array elements is made to be false (or true). For a non-limiting example, the loop will continue until the N+1-st element compares low to the N-th element. In such cases, the compiler can ensure that this "sentinel predicate" is made true by elements within the array object, or is made true by objects initialized into the padding allocated after the object. The list of four programming idioms provided in section [buf] above is expanded to include these two idioms:

---

Idiom #5: Loop limited by sentinel value: the loop increments an indirectable pointer until its target equals the sentinel value Idiom #6: Loop limited by sentinel predicate: the loop increments an indirectable pointer until some predicate is made true (or false) by a relationship involving the target

---

In a further alternative, the SSC 23 provides an implementation-defined method (either a pragma or a formatted comment) by which the programmer can require that a warning diagnostic message is produced if the compiler does not recognize a specific numbered idiom in the code following said pragma or formatted comment.

The remainder of this section will focus upon code generation for the non-Debug mode(s) which emphasize a "keep on running" ("KOR") logic, such as _Modwrap, _Sat, and _Zerobound logic. The generated assembler code can use assembler conditional instructions to avoid introducing branches. The alternatives of _Modwrap, _Sat, and _Zerobound can be evaluated by the Safe-Secure Code Generator ("SSCG") 39 to determine which alternative produces optimal assembler code. (The name "_Saturation" can be used as equivalent to "_Sat".) Note that the prior art of the C and C++ standards specifies that if the compiler can determine that undefined behavior must result on all flow paths, the compiler is entitled to "clip" the value within the object itself, that is, to assign the saturated, or modwrapped, or zerobounded, value back into the object itself.

For a non-limiting example, in _Sat logic where a subscript or pointer N should not exceed a Hi value, the generated assembler can use assembler conditional instructions such as Load N, Cmp Hi, Load Hi if Greater.

For another non-limiting example, if the processor supports only a _Sat logic that saturates at a UINT_MAX value (call it P), then the generated assembler can saturate at an arbitrary Bound using an "Add-Sat" instruction (add with saturation at P) such as Load N, Add-Sat (P—Bound), Subtract (P—Bound).

For another non-limiting example, if Bound is a power of two, then _Modwrap is provided by bitwise-and. In a further version of this example, one option to be evaluated in code optimization is to allocate extra elements in the (static, stack, or allocated) array to make its actual Bound be the next higher power of two. Note that the resulting Non-Debug code will propagate Guarantees using a larger (power-of-two) Bound (and Hi, and End) than the exact values that are used in the corresponding Debug version of the same program.

For another non-limiting example, if the (possibly-adjusted) Bound is exactly 255 or 32,767, then the generated assembler code can maintain a subscript value N as a one-byte or two-byte value within a larger value, using one-byte or two-byte instructions, which will act as if every store of N were bitwise-anded with 0xFF or 0xFFFF before each store.

For another non-limiting example, _Zerobound logic can be implemented using conditional assembler instructions, such as Load P, Cmp Bound (producing a zero or non-zero value), Load *P if non-zero (leaving the zero result of comparison as the result value of the _Zerobound logic).

Previous examples have focused upon the ways the Bounds information can determine whether a pointer or subscript is Indirectable or Not-Indirectable. However, Alignment requirements play a similar role. For example, if a pointer-to-int is cast to pointer-to-char, the char* result is always Indirectable. If flow analysis determines that no changes have been made to the value, and the pointer-to-char is cast back to pointer-to-int, then the int* result is Indirectable. However, if the value has been changed (incremented, decremented, added, subtracted, etc.), then the int* result is Not-Indirectable. If the result is used in a context imposing a Requirement of Indirectable, then the Safe Secure Code Generator can insert run-time assistance: in Debug mode, insert a test to determine whether the value is properly aligned. In non-Debug mode, insert a forcible alignment. (For the basic types which occupy power-of-two sizes, the forcible alignment can simply be a bitwise—and with a mask containing low-order zeroes.)

The SSC 23 can require that any type instantiated in the C++ complex and valarray templates shall have no operations that throw exceptions.

The SSC 23 can require that the argument to the constructor of an auto_ptr is a new-expression, guaranteeing that there are no aliased copies of the argument object.

The methods shown in this section will eliminate the following undefined behaviors:

the size of the type T, i.e. the number of bytes in the array between the address of the first object of type T and the last object of type T. If there is only one element in the array, the Tsize-adjusted is zero.

The SSSA 35 maintains this bounds information for every pointer used to fetch-or-store; therefore, the analysis presented in this Safe Secure method will incorporate the syntax and semantics of the restrict keyword (from C99). Whenever this keyword appears within this Application, it reflects in syntax a restriction that otherwise must be stated in (non-formalized) semantics, i.e. a restriction that the target object designated by the restrict-qualified pointer does not overlap any other object that is accessible through external pointers or other argument pointers. This restriction can in one exemplary implementation be verified at compile-time to the extent that the bounds information is available. The remaining checks can in one exemplary implementation be verified at run-time by examination of the bounds data of the forementioned set of pointers. Note that the restrict keyword is not part of the (1998 or 2002) C++ standard, but the no-overlap restriction is part of the (non-formalized) semantics of the C library contained in that C++ standard, and therefore is part of the requirements for the elimination of undefined behavior in C++ as well as C.

| SSM# | C-Std# | Description |
|---|---|---|
| stat | c6.2.4, c6.7.8, c6.8 | The value of an object with automatic storage duration is used while it is indeterminate |
| stat | c7.19.3 | The value of a pointer to a FILE object is used after the associated file is closed |
| stat | c6.5.3.2 | The operand of the unary * operator has an invalid value |
| stat | c7.19.5.3 | An output operation on an update stream is followed by an input operation without an intervening call to the fflush function or a file positioning function, . . . |
| stat | c7.19.5.3 | . . . or an input operation on an update stream is followed by an output operation with an intervening call to a file positioning function |
| stat | c7.19.5.6 | An attempt is made to use the contents of the array that was supplied in a call to the setvbuf function |
| stat | c7.19.7.11 | The file position indicator for a binary stream is used after a call to the ungetc function where its value was zero before the call |
| stat | c7.19.9.2 | The fseek function is called for a text stream with a nonzero offset and either the offset was not returned by a previous successful call to the ftell function on a stream associated with the same file or whence is not SEEK_SET |
| stat | c7.19.9.3 | The fsetpos function is called to set a position that was not returned by a previous successful call to the fgetpos function on a stream associated with the same file |

| SSM# | C++-Std# | Description |
|---|---|---|
| stat | 20.4.5 para 3 | More than one auto_ptr owns the same object |
| stat | 26.1 para 2 | Any operation on T throws an exception |

Safe Pointers [buf]

In the present method, all pointers are implemented as "compile-time-safe pointers", subject to a maximal verification at compile time.

Figure 9:
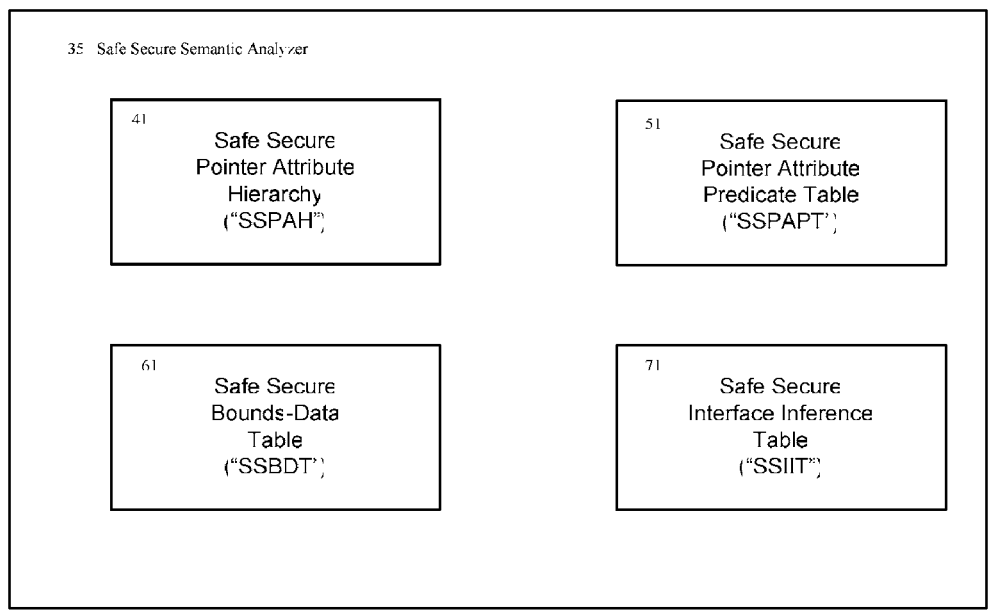
FIG. 9 shows exemplary illustrative non-limiting components of a Safe Secure Semantic Analyzer (SSSA 35)

The target-size, or Tsize, is defined as the number of bytes in the object or array designated by the pointer. The Bound is defined as the Tsize divided by the size of the type T to which the pointer is pointing. The Tsize-adjusted is the Tsize minus Components of the SSSA 35 are as shown in FIG. 9.

A pointer value that designates an object in an array has a compile-time relationship with the bounding addresses of the array. When a pointer value is assigned to a pointer object, the target pointer object receives all the attributes pertaining to the original pointer. All pointer arithmetic (ptr+n, ptr−n, ptr−ptr, ptr[n]) checks the result (at compile-time, link-time, or run-time) against the Lo-Hi bounds; the End ("one-too-far") value is permissible as a result from pointer arithmetic. (The practitioner will of course understand that incrementing and decrementing, ++ptr and −−ptr, are special cases of ptr+n and ptr−n.) Fetching or storing via indirection operators (explicitly via "star" or implicitly in the lvalue use of subscript) causes the SSSA 35 to check the pointer or subscript against the Lo-Hi bounds; the "one-too-far" value is not permissible for fetching or storing. If at run-time, any bounds are exceeded, in Debug mode ss_unwind is invoked (see Ss_unwind [longj]); in non-Debug mode the semantics of Sat, _Modwrap or _Zerobound (defined later in this section) may be produced by the SSCG 39, based upon considerations of best performance. In the alternative, any algorithm of alternating between semantics is allowable. The underlying intent of this alternative is that programmers will not be given an expectation that any specific semantics is predictable or deterministic.

A compile-time-safe pointer uses the same (one-word) representation as the ordinary C or C++ implementation. In all contexts that require bounds information, that information is made known to the SSSA 35 through a variety of mechanisms. In compile-time-safe code, the SSSA 35 ensures that each non-scalar pointer must have, within the same region (global static, block static, block local, parameters, or heap) bounds information (or bounds information stored in the global static region), stored in locations made known to the Safe Secure Compiler 23, sufficient to verify the safety of any fetches or stores expressed in the program.

Here is an itemization of the contexts that require or use bounds information for a pointer: arithmetic (p+n, p−n, p−p), subscripting (p[n] and n[p]), pointer argument passing, returning a pointer, taking the address-of, pointer copying and assignment. For each pointer variable or expression appearing in a context which requires bounds information, that bounds information is inferred by the SSSA 35, using one of several alternative methods.

The SSSA 35 stores Guarantees and Requirements for pointer bounds in the Safe Secure Bounds-Data Table ("SSBDT") 61. A subset of this information is also stored in the Safe Secure Bounds-Data File ("SSBDF") 26, namely all bounds data entries which provide information about the Requirements and Guarantees of references to, and definitions of, external arrays, external pointers, and the parameters and return type of externally-callable functions, i.e. function prototype entries. At or before termination of execution of the SSSA 35, all such entries in the SSBDT 61 are written to the SSBDF 26 contained in a persistent storage ("file storage").

The format and representation of the SSBDT 61 can be optimized to suit the requirements of each SSSA 35. In the SSBDT 61, the Guarantees and Requirements are attached as needed to expressions, sub-expressions, declarations, identifiers, and function prototypes, using whatever indexing or coordinates as are needed to identify the relevant location in the internal representation of the Parser 33. For purposes of presentation in the present Safe Secure method, all entries in the SSBDT 61 will be represented in the narrative text or in the style of macro invocations inserted into the Source Program 107. In the present method, this representation does not presuppose that any such invocations of actual macros are present in the actual Source Program 107. The Safe Secure method requires that one or more of the following are provided:

1. The Parser 33 recognizes some notation identical to or equivalent to the macro notation shown herein; or,
2. The SSSA 35 provides a method whereby the human programmer can add annotations to the SSBDT 61 and SSBDF 26. If the Compiler 23 is a component in an Interactive Design Environment (IDE), then the mechanism for adding annotations to the SSBDT 61 and SSBDF 26 can be integrated into the IDE.

The concepts of pre-condition and post-condition are well-known. Note that "Requirement" as used herein is synonymous with "pre-condition" and that "Guarantee" is synonymous with "post-condition", with the following contextual difference: in some technology communities the terms "pre-condition" and "post-condition" are primarily used for annotations made by the human programmer. The choice herein of different terminology is intended to avoid this connotation; the huge number of Requirements and Guarantees required by the Safe Secure methods would be an unreasonable burden if performed only by human annotation. Note that it may take several lines of code for a Guarantee to be established. It should be obvious to the Practitioner that establishment of the Guarantee must be completed either (a) before encountering the first Requirement that requires it, or (b) before the current function returns.

The entries in the SSBDT 61 are represented as follows:

| | |
|---|---|
| char *p BOUND_IS(n) | n provides the Bound of p. |
| char *p LENGTH_IS(n) | n provides the Length of p |
| char *p TSIZE_IS(n) | n provides the Tsize of p |
| char *p TSIZEA_IS(n) | n provides the Tsize-adjusted of p |
| char *p INDIRECTABLE | p is Indirectable |
| char *p NOT_INDIRECTABLE | p is Not Indirectable |
| char a[ ] LO_IS(p) | p provides the Lo of a |
| char HI_IS(p) a[ ] | p provides the Hi of a |
| char LO_IS(p) HI_IS(q) a[ ] | p provides the Lo of a and q provides the Hi of a |

For convenience and flexibility, alternative annotations are provided, which can be attached to the declaration of the integer or pointer which is providing the bounds information:

| | |
|---|---|
| int n IS_BOUND_OF(p) | n provides the Bound of p |
| int n IS_LENGTH_OF(p) | n provides the Length of p |
| int n IS_TSIZE_OF((p,q)) | n provides the Tsize of p and of q |
| int n IS_TSIZEA_OF((p,q,r)) | n provides the Tsize-adjusted of p, of q, and of q |
| char *p IS_HI_OF (a) | p provides the Hi of a |
| char *p IS_LO_OF(a) | p provides the Lo of a |
| char *p IS_END_OF(a) | p provides the End of a |

As indicated by the last examples, all the IS_*_OF annotations accept a variable number of names, enclosed within a second level of parentheses.

If the Lo bound is not explicitly specified, then the initial value of each pointer in each scope is initially the Lo bound. The initial Lo bound plus the initial Bound (or Length or Tsize) value determines the Hi bound.

The default for a pointer without any bounds annotation is Not-Indirectable. As an alternative, said default can be the Unknown state.

The SSSA 35 can infer from the source code of a function that a parameter is being used as the Hi, or Bound, or Length, or Tsize, of another parameter. The itemized set of rules for the inference is detailed in FIG. 10. The Practitioner will understand that the inference rules are interpreted broadly to cover all forms of indirection and subscripting; for a non-limiting example, the form of the indirection might be *++p or *p++ or p[i++] etc. In other words, the inference rules concern the substance of the semantics of loop traversal and indirection, not the specific syntactic form of the source code.

There are several special cases for the bounds annotations in the SSBDT 61:

| | |
|---|---|
| int n IS_BOUND_OF(return) | n provides the Bound of the function's returned pointer |
| int n IS_LENGTH_OF(return) | n provides the Length of the function's returned pointer |

| | |
|---|---|
| int n IS_TSIZE_OF(return) | n provides the Tsize of the function's returned pointer |
| char *p IS_HI_OF(return) | p provides the Hi of the function's returned pointer |
| char * QI(return) f( ) { | function f returns a Maybe-Indirectable return value |

Note that any attributes provided for the function's returned value are always Guarantees and never Requirements, because the returned value comes into existence only upon function return. Attributes provided for the function's parameters are both Requirements and Guarantees (unless specifically indicated otherwise), since the attribute is presumed to hold before and after execution of the function.

The SSBDT 61 also uses a special notation for NULLTERM, for char arrays which are guaranteed to be null-terminated:

```
int main(int argc, NULLTERM char* argv[ ] BOUND_IS(argc));
```

In the SSBDT 61, void* generic pointers are annotated just the same as char* pointers.

When one parameter (such as n in this example) provides bounds data for a pointer (such as s1 in this example), that pointer is understood to be Indirectable. However, if one parameter provides bounds data but a pointer is explicitly Maybe-Indirectable, then either the pointer is null or it is indirectable and has bounds data.

If both Tsize and Bound are specified for the same object, then the Tsize is the Tsize of one element, and the Bound is the number of elements. For a non-limiting example, the standard library function calloc is represented in the SSBDT 61 as follows:

```
void * QI(return) calloc(
    size_t a IS_BOUND_OF(return), size_t b IS_TSIZE_OF(return)
);
```

If both Tsize (or other bounds data) and Nullterm are specified for the same pointer, then the Tsize is understood as the largest object that will be accessed through this pointer. For example, the standard library function strncpy is represented in the SSBDT 61 as follows:

```
char * strncpy(
    char *s1, const char *s2 NULLTERM, size_t n
    IS_TSIZE_OF((s1,s2))
);
```

In the notation described so far, the attributes for "indirectable" and "null-terminated" represent Requirements-and-Guarantees for arguments and Guarantees for returned value. These attributes can also be used for Guarantees (post-conditions) upon an argument when there is no corresponding Requirement (pre-condition) upon entry to the function. An additional marker ("POST") is used to indicate post-conditions (Guarantees) in the notation of the SSBDT 61:

```
int swprintf(wchar_t * restrict s POST(NULLTERM)
LENGTH_IS(return),
    size_t n IS_BOUND OF(s),
    const wchar_t * restrict format NULLTERM, ... );
```

This notation indicates that there is no Requirement for null-termination of s upon entry to the swprintf function, but there is a Guarantee of null-termination upon return from the function.

When a pointer or subscript which has a bounds attribute is assigned to another pointer or integer variable, both the source and the target acquire that specific bounds attribute. When one of those variables is modified, the other variable retains the bounds attribute. For a non-limiting example, if a pointer equals the Lo bound, and then that pointer is incremented, then any other Lo for that pointer retains its Lo attribute. Here is a non-limiting example:

```
void f(int *p) {
    int *q = p; // p and q are the LO of p and the LO of q
    ++p; // now only q is the LO of p; it is also the LO of q
```

At any particular point in the control flow of the Source Program 107, attribute information might be redundantly attached to several different objects. If one of these objects is subsequently modified, another object may retain the attribute as before. Here is a non-limiting example:

```
void f(int n, int *p BOUND_IS(n)) {
    int *q = p + n; // at this point, q is the END of p
    --n; // because q holds the END value, n is no longer BOUND_OF(p)
```

The SSSA 34 embodies a rule that can be summarized informally as "half a loaf is better than none": if there is only one copy of the LO, HI, END, BOUND, TSIZE, TSIZEA, or LENGTH, and if that copy is incremented or decremented, then that copy retains the appropriate attribute. Here is an illustrative non-limiting example:

```
void f(char *p) {
    int a[n] = {0}; // at this point, n is the BOUND of a xxx
    int *p = a; // now, p is the LO of a and the LO of p, and n is the BOUND
of p
    --n; // because we haven't saved the END value, n is our only
BOUND_OF(p)
```

Here is a similar non-limiting example:

```
int n = N;
int a[N] = {0}; // at this point, n is the BOUND of p
int *p = a; // now, p is the LO of a and the LO of p
int *q = p + n; // at this point, q is the END of p
--n; // because we saved the END value, n is no longer BOUND_OF(p)
```

In the SSBDT 61 there is no need to re-state the type information that was present in the function prototypes; the table needs only to contain the bounds-data annotations. Note that this avoids the space- and time-overhead of recording and using type information; the present method requires only the bounds-data annotations. Some of the subsequent non-limiting examples of SSBDT 61 notation will omit extraneous type information to permit more concise presentation. However, complicated declarators such as pointer-to-pointer will still require some way to show which level of pointer or array the annotation pertains to; these methods are indifferent to the specific scheme of notation. The present method covers the functional behavior of the use of the bounds data without limitation to one specific notation.

In some cases, separate bounds-data entries are required for the separate annotation of SUCCEED and FAIL cases (and see Function invocation patterns [invoc]). For a non-limiting example, consider the two separate annotations which the SSSA 35 would make in the SSBDT 61 after analyzing the standard C and C++ library function fgets:

| | |
|---|---|
| SUCCEED | fgets(s POST(NULLT), n IS__TSIZE__OF(s), stream INDIR) |
| FAIL | fgets(s, n IS__TSIZE__OF(s), stream INDIR) |

This notation means that when fgets returns successfully, the string pointed to by s is null-terminated; when fgets returns unsuccessfully, there is no Guarantee about null-termination. In either case, n is the Tsize of s (a Requirement upon entry to fgets, and a Guarantee upon return from fgets), and stream is Indirectable (a Requirement upon entry to fgets, and a Guarantee upon return from fgets).

When the Requirements and Guarantees within one function are different in different blocks within the function, and when one set of such blocks is controlled by an if-else test upon a parameter value, that function is analyzed as two separate functions which depend upon an attribute of an argument. For a non-limiting example, consider the two separate annotations which the SSSA 35 would make in the SSBDT 61 after analyzing the standard C and C++ library function mbtowc:

| |
|---|
| mbtowc(pwc, s IS__NULL, n) |
| mbtowc(pwc INDIR, s, n IS__TSIZE__OF(s)) |

For further non-limiting examples of the annotation in the SSBDT 61 (and the various special cases mentioned above), consider the following bounds-data entries for various functions from the C and C++ standard library.

setbuf(stream INDIR, buf INDIR)
setvbuf(stream INDIR, buf IS__NULL mode, size)
setvbuf(stream INDIR, buf POST NOT__INDIR, mode, size IS__TSIZE__OF(buf))
vtprintf(stream INDIR, fmt NULLT, arg)
fgetpos(stream INDIR, POS INDIR)
fclose(stream INDIR)
fsetpos(stream INDIR, POS INDIR)
fseek(stream INDIR, offset, whence)
wcstombs(s POST NULLT, pwcs NULLT n IS__BOUND__OF(s))
SUCCEED fgets(s POST(NULLT), n IS__TSIZE__OF(s), stream INDIR)
FAIL fgets(s, n IS__TSIZE OF(s), stream INDIR)
vsnprintf(s POST NULLT, n IS__BOUND OF(s), fmt NULLT, arg)
wctomb(s BOUND__IS(MB__CUR__MAX), we)
fopen(filename NULLT, mode NULLT)
freopen(filename NULLT, mode NULLT, stream INDIR)
vprintf(fmt NULLT, arg)
strtod(nptr NULLT, endptr IS__NULL)
strtod(nptr NULLT, char NULLT ** endptr INDIR)

-continued strtol(nptr NULLT, endptr IS__NULL, base)
strtod(nptr NULLT, char NULLT **endptr INDIR, base)
fputs(s NULLT, stream INDIR)
remove(filename NULLT)
rename(old NULLT, new NULLT)
strchr(s NULLT, c)
mblen(s IS__NULL, n)
mblen(s NULLT n, IS__BOUND__OF(s))
strncmp(s1 NULLT, s2 NULLT, n IS__BOUND__OF((s1,s2)))
fwrite(ptr, size IS__TSIZE__OF(ptr), nmemb IS__BOUND__OF(s), stream INDIR)
bsearch(key, base, n IS__BOUND__OF(base), size IS__TSIZE__OF((key,base)), cmp INDIR)
memchr(s NULLT, c, n IS__TSIZE__OF(s))
memcmp(s1, s2, n IS__TSIZE__OF((s1,s2)))
fputc(int c, stream INDIR)
fread(ptr, size IS__TSIZE__OF(ptr), nmemb IS__BOUND__OF(ptr), stream INDIR)
memcpy(sl, s2, n IS__TSIZEOF((sl,s2)))
qsort(base, nmemb IS__BOUND__OF(base), size IS__TSIZE__OF(base), cmp INDIR)
memset(s, c, n IS__TSIZE__OF(s)))
memmove(sl, s2 n IS__TSIZEOF((s1,s2,return)))
mbtowc(pwc, s IS__NULL, n)
mbtowc(pwc INDIR, s, n IS__TSIZE__OF(s))
mbstowcs(pwcs, s, n IS__BOUND__OF(pwcs))

As has been shown, the bounds information for a pointer is made available to the Safe Secure Compiler 23 through a variety of mechanisms depending upon the context: explicit attribute macros in a calling sequence (or equivalent programmer notations through IDE or other means), attributes inferred from usage in the called function, a visible allocation expression such as malloc or new, information made known to the linker by the SSBDF 26, or from direct visibility of an array declaration. If the programmer has provided explicit notations of bounds information, the Safe Secure Compiler 23 checks them against the inferred bounds; otherwise, the inferred bounds will be used during the compilation. It is likely that professional programmers providing library code for consumption by others will be urged to provide explicit notations.

When the Safe Secure Compiler 23 can see the assignment ptr=malloc(n) (or other standardized allocation), the specific bounds macros (LO_IS, HI_IS, END_IS, BOUND_IS, TSIZE_IS, TSIZEA_IS) are allowed but not required, because the Safe Secure Compiler 23 can infer that variable n IS_TSIZE_OF(ptr). So long as the variable n is not subsequently modified, it provides bounds information for ptr. Even if the argument to malloc has been modified, when the SSSA 35 determines that the ptr is unmodified from the original returned value, the SSCG 39 generates code to implement all the bounds macros (LO_OF, HI_OF, END_OF, BOUND_OF, TSIZE_OF, TSIZEA_OF) by accessing the heap-allocation data of the pointer ptr. However, if the function passes ptr as an argument to an external function, the function must pass the bounds information through an argument. The SSBDF 26 does not provide notation to distinguish dynamically-allocated pointer arguments from ordinary pointer arguments.

Analysis of pointer-range-state starts by identifying all fetch-or-store expressions that involve pointers or subscripts, and all objects and variables (i.e. named objects) that are part of those expressions. Next, identify all expressions and statements that involve those objects and variables. Then identify certain control-flow patterns which guarantee the "counted-loop" ("counted-plus" and "counted-minus") semantics.

The process can be illustrated with a small non-limiting example:

```
int m[2] = {1, 2};
int main( ) {
    int i, j = 0;
    for (i = 0; i < 2; ++i)
        j += m[i];
    return j;
}
```

Since m is defined in this translation unit, its bounds are known to the SSSA 35; specifically, its Bound is 2, its Lo is the address of m[0], its Hi is the address of m[1], and its End is the address of m[2]. The Tsize of m is 2 times sizeof(int), and its Tsize-adjusted is sizeof(int). There is only one fetch-or-store expression involving pointers or subscripts; it is the expression m[i]. The variables involved in this expression are m and i. As the Practitioner knows, the semantics of C and C++ requires that the subscript expression m[i] must be within the range of Lo to Hi; we designate this as the Requirement of the expression. The expressions and statements that involve those variables are contained in the one for-loop. The for-loop matches one of the "counted-plus" patterns, therefore the subscripting is valid. In our terminology, we refer to the for-loop as the Guarantee that satisfies the Requirement given above. Another way of stating this Requirement is that "i is a Subscript-For the array m". (For a compact notation, we can write "i SUB4(m)". The same Requirement can be applied to pointers; "p SUB4(m)" means that p is bounded between the Lo and Hi of m.) A slightly different Requirement is that "i is a Subscript-For (or End of) the array m" which we could abbreviate "i SUB5(m)", and similarly for pointers, where "p SUB5(m)" means that p is bounded between the Lo and End of m.

When recognizing the patterns for a counted-loop (counted-plus and counted-minus), subscripting expressions can be converted into pointer expressions and vice-versa. Some patterns may be expressed more easily with subscripts and others with pointers. The previous example can be converted into this equivalent example:

```
int m[2] = {1, 2};
int main( ) {
    int *pi;
    int j = 0;
    for (pi = &m[0]; pi < &m[2]; ++pi)
        j += *pi;
    return j;
}
```

A scalar pointer is one which, in its scope and lifetime, is never incremented/decremented, never participates in address arithmetic, and is never subscripted (except using p[0]). It does not require bounds information.

The rules for a counted-loop (counted-plus and/or counted-minus) are the same whether a pointer is incremented/decremented or an integer subscript is incremented/decremented. These are the patterns that identify a counted-plus and/or counted-minus (each pattern is given an "idiom number"):

Idiom #1: Loop limited by Bound: the loop performs N repetitions where N is less than or equal to the Bound of p, and the pointer designates a sequence of objects p through p + N − 1, or p through p − N + 1
Idiom #2: Loop limited by Hi: the loop increments an indirectable pointer until it is equal to Hi (i.e., during the last iteration the pointer is equal to Hi)
Idiom #3: Loop limited by Lo: the loop decrements an indirectable pointer until it is equal to Lo (i.e., during the last iteration the pointer is equal to Lo)
Idiom #4: Loop limited by null terminator: the loop increments an indirectable pointer until its target is null The SSCG 39 provides semantics for several attributes of pointers and/or subscripts. The "_Sat" ("saturated") semantics generates machine-dependent instructions or software code sequences such that the pointer or subscript never increments (or adds) higher than its Hi value, and never decrements (or subtracts) lower than its Lo value. (In other words, it is like a guage that "pegs" at its minimum and maximum values.) The "Modwrap" semantics generates machine-dependent instructions or software code sequences such that pointer and/or subscript is wrapped modulo the End value. Therefore, as the pointer or subscript is successively incremented, it runs from the Lo value to the Hi value, then starts again at the Lo value. The "_Zerobound" semantics generates machine-dependent instructions or software code sequences such that any fetch from outside the Lo-Hi limits (including the null-pointer value) produces a zero value (or a default-initialized value for a non-scalar), and any store outside the Lo-Hi limits (including the null-pointer value) produces a no-op. All three of these semantics can be implemented in silicon. A relaxation of _Zerobound permits delivery of any unspecified value upon out-of-bounds fetch, while requiring a no-op for out-of-bounds store. This relaxation permits greater optimization of fetch operations: install an alternate service routine for the "segmentation" or "invalid address" trap to deliver a zero result to the calling operation. In this alternative, there is no run-time penalty for any fetch instruction, even if bounds are not known at compile time.

If some control flow is too complicated and doesn't fit a simple counted-plus or counted-minus pattern, and pointer-range attributes don't guarantee safe fetch-or-store access and all other compile-time bounds-checks fail, then the SSCG 39 inserts executable bounds-check code. In the Safe Secure method there are two modes of bounds-check code. When the SSCG 39 is compiling in Debug mode, every attempt to fetch or store out of bounds, or to create a pointer value out of the full range of values (which includes the one-too-far address), or to fetch-or-store through a null pointer, causes an invocation of an "unwind", such as ss_unwind (which in an interactive debugging environment causes an interactive breakpoint). In non-Debug mode, the SSCG 39 implements a choice among the following options: (a) use Debug semantics; or (b) every attempt to fetch or store out of bounds produces a well defined result (either _Sat semantics, or _Modwrap semantics, or _Zerobound semantics) whichever produces the best fit to the current optimization profile (which might be "minimum code size" or "minimum CPU time" or other). A warning should be generated to inform the programmer. In non-Debug mode, every attempt to create a pointer value out of the full range of values produces an algebraically well-defined pointer value, even though that value would not be usable for indirection or bounds-testing. Note that if a pointer has the Ntl (not-too-low) attribute, and is being dynamically compared against the Hi or End value, the _Modwrap semantics will not be as efficient as the _Sat or _Zerobound semantics, because the latter semantics require only the Hi (or End) value to complete the bounds-checking. The same is true for a pointer with the Nth (not-too-high) attribute and a Lo limit.

The selection between Debug mode and non-Debug mode is conditional upon a switch set either at compile-time, at link-time (using an external flag), at load time (using an environment variable), or during run-time (using an interactive debugger)

In both Debug and non-Debug mode, the SSDG 37 generates a warning message to inform the programmer that run-time bounds-checking has been inserted by the Safe Secure Compiler 23.

The SSSA 35 provides a mechanism by which the programmer can request that, if the programmer believes that the control flow does in fact guarantee adequate bounds checks, the original control flow is communicated to the organization which distributes the SSSA 35. By incorporating this automated client feedback mechanism, said organization will have the opportunity to increase the set of counted-bounds control-flow contexts and Requirement-Guarantee patterns. To the extent that third-party organizations perform certification, validation, and/or branding of technology herein, said client feedback is subject to the same third-party processes, since the assurances of safety and security provided by the Safe Secure method are dependent upon the correctness of the patterns that are accepted by the Safe Secure method.

The full set of bounds-enforcement mechanisms may produce a number of inserted bounds-check code segments. As an optional Alternative, the Safe Secure method provides a further tool by which these bounds-checks (and the associated warnings) can be eliminated. Define an environmental interaction as a function invocation which produces a returned value or other state change which depends upon the external environment (such as command-line argument, input function, or getenv invocation). The Safe Secure method ensures that for every environmental interaction there is a guarantee that returned values and modified argument strings are either bounded in size and value, or null-terminated. If unbounded but null-terminated, the Safe Secure method requires that some bounding construct be imposed before use of the input value. (For example, a potentially very long command line argument can be converted into a numeric value by one of the string-to-numeric library functions, at which point the resulting value is bounded by the min and max of its type.) Define all the segments of code in between environmental interactions as "pure code". Use the incremental code-coverage method (Plum U.S. Pat. No. 5,758,061) to identify environmental interactions which precede code blocks which contain inserted bounds-check code segments. Let the Safe Secure Compiler 23 insert checkpoint/restart code segments at those environmental interactions. Now the environmental interactions can be simulated, using the minimum and maximum values for the input, and/or using the complete range of values for the input, and the pure code which follows those interactions can be executed in the environment of the full range of values for the input. Note that the set of input values must include any values which affect the control flow within the pure-code segment, and should also include the values one-less-than and one-greater-than these special values.

The static analysis necessary to determine bounds-checking need not be as aggressive as whole-program-optimization. The Safe Secure method imposes upon programmers the requirement that each function contains within its calling sequence and its control flow the guarantees necessary to assure that all fetches and stores are within bounds. Therefore, no entity larger than the function need be analyzed. Furthermore, good software design suggests that "proving" that each fetch-or-store is valid should not require examination of hundreds of lines of code. If the validity is not already obvious, then the programmer should add such constructs as are required to make it obvious.

Note that the SSSA 35 must interact with the optimization analysis performed in Semantic Analyzer 34. For a non-limiting example, the analysis necessary to keep a pointer or an integer in a register ("aliasing logic") may be required to determine that that pointer or that integer retains its bounds-related attributes during specific arcs of the flow graph. Further note that the "buckets" introduced in section [use-linker] below can be used by the SSSA 35 to maintain bounds data even when aliasing logic cannot determine whether the bounds data in the user's variables might have been altered.

The methods described above for enforcing bounds safety have relied upon insertion by the SSCG 39 of bounds-check code segments when state analysis is unable to determine the validity of fetch-or-store accesses. In an alternative method, the SSCG 39 inserts invocations of macros or inline functions in an intermediate representation of the original program. For a non-limiting example, the following macros-or-functions can be used:

| | |
|---|---|
| _csafe_fetch_hi(p, hi) | *p if p<=hi |
| _csafe_fetch_end(p, end) | *p if p<end |
| _csafe_fetch_loh(p, lo, hi) | *p if p>=lo and p<=hi |
| _csafe_fetch_lob(p, lo, bound) | *p if p>=lo and p<lo+bound |
| _csafe_fetch_lot(p, lo, tsize) | *p if p>=lo and (char*)p<(char*)p+tsize |
| _csafe_store_hi(p, hi, val) | *p = val if p<=hi |
| _csafe_store_end(p, end, val) | *p = val if p<end |
| _csafe_store_loh(p, lo, hi, val) | *p = val if p>=lo and p<=hi |
| _csafe_store_lob(p, lo, bound, val) | *p = val if p>=lo and p<lo+bound |
| _csafe_store_lot(p, lo, tsize, val) | *p = val if p>=lo and (char*)p<(char*)p+tsize |

Alternative names can be used, avoiding conflict with other implementation-defined names while reducing the length of the name. Efficient implementation of these macros (or inline functions) will depend upon characteristics of the target implementation. The SSSA 35 ensures that the pointer arguments in the macro invocations are named variables (which may be named temporaries introduced by the SSSA 35), so that no side-effects (i.e. no increment, decrement, assignment, or function-call) are present in the macro argument expressions. In the event that p is not in-bounds, the macro behaves in accordance with the requirements specified above for Debug and non-Debug mode.

Un-referenced auto storage is initially in the Unaliased state. Dynamically-allocated storage (via the C++ operator new, or malloc, etc.), and the pointer which is initialized by the allocation expression, initially has the Unaliased attribute. If a reference to an object, or a pointer, is assigned to another pointer within the same translation unit, both acquire the Visibly-Aliased attribute, and the SSSA 35 can record the full set of visibly-aliased pointers. If the address is passed to an external function, or assigned to an external pointer, then the set of all visibly-aliased pointers acquires the Opaquely-Aliased attribute. If the function parameter, or the external pointer, has the C99 "restrict" qualifier, then the SSSA 35 can require that the pointer was not Opaquely-Aliased prior to passing the argument or assigning the pointer.

The methods shown in this section will eliminate the following undefined behaviors:

| SSM# | C-Std# | Description |
| --- | --- | --- |
| buf | c7.1.4 | The pointer passed to a library function array parameter does not have a value such that all address computations and object accesses are valid |
| buf | c6.5.6 | An array subscript is out of range, even if an object is apparently accessible with the given subscript (as in the value expression a[1][7] given the declaration int a[4][5]) |
| buf | c6.5.6 | Addition or subtraction of a pointer into, or just beyond, an array object and an integer type produces a result that points just beyond the array object and is used as the operand of a unary * operator that is evaluated |
| buf | c7 | An attempt is made to copy an object to an overlapping object by use of a library function, other than as explicitly allowed (e.g., memmove) |
| buf | c6.5.8 | Pointers that do not point to the same aggregate or union (nor just beyond the same array object) are compared using relational operators |
| buf | c6.5.6 | Pointers that do not point into, or just beyond, the same array object are subtracted |
| buf | c6.5.6 | Addition or subtraction of a pointer into, or just beyond, an array object and an integer type produces a result that does not point into, or just beyond, the same array object |
| buf | c6.3.2.1 | An lvalue does not designate an object when evaluated |
| buf | c7.19.6.1, c7.24.2.1 | An s conversion specifier is encountered by one of the formatted output functions, and the argument is missing the null terminator (unless a precision is specified that does not require null termination) |
| buf | c7.19.6.2, c7.24.2.2 | A c, s, or [ conversion specifier is encountered by one of the formatted input functions, and the array pointed to by the corresponding argument is not large enough to accept the input sequence (and a null terminator if the conversion specifier is s or [) |
| buf | c7.21.1, c7.24.4 | A string or wide string utility function is instructed to access an array beyond the end of an object |
| buf | c6.7.3.1 | A restrict-qualified pointer is assigned a value based on another restricted pointer whose associated block neither began execution before the block associated with this pointer, nor ended before the assignment |
| buf | c6.7.3.1 | An object which has been modified is accessed through a restrict-qualified pointer to a const-qualified type, or through a restrict-qualified pointer and another pointer that are not both based on the same object |

Applying Pointer Analysis to Implementation-Generated Pointers [vptr]

In C++ there are object types which are restricted to the same simple semantics as in C; these are known as the "plain old data" (POD) types. The C++ non-POD class (including struct) types have semantics that are more complicated than the POD types. The process of constructing a non-POD object starts with the allocation (in static, stack, or heap) of "raw storage"; then the constructors of bases and members may modify the storage, possibly involving virtual pointers (vptrs) and virtual tables (vtables). Only when all constructors have executed is the object fully-constructed. A POD object is always "raw storage" because no virtual pointers or virtual tables are involved.

There are several situations that can produce undefined behaviors in C++ that take place when the object is in the "raw storage" state. The Safe Secure Compiler (SSC) 23 can produce a fatal diagnostic when any of these situations occur (as listed in the table below).

There are only a few ways that a pointer to a non-POD class type T can receive the address of something which is-not-a T. Variable-argument linkage is covered in the section "Variable argument list checking [varg]". Any time an old-style cast or a reinterpret cast converts to a pointer-to-T, the SSC 23 can insert run-time checks to verify that the target is-a T.

When the target of a fetch is of pointer-to-function type (which for the purposes of these methods includes pointer-to-member-function), the behavior upon invalid fetch depends upon the Debug mode and the bounds-check semantics (_Modwrap, _Saturated, or _Zerobound). It would be obvious to the Practitioner that if the fetch does not produce a valid pointer value, then the behavior will depend upon the Debug-vs-Non-Debug mode. In Debug mode, if any attempt is made to invoke a function via an invalid pointer value, an "unwind" (such as ss_unwind) can be invoked, and the implementation may throw an exception of an implementation-defined type. In non-Debug mode, the result can be a no-op. Further obvious, in whichever semantics, if the pointer value is null, that value is not a valid pointer value for function invocation.

Within one region of code analysis, where the compiler has complete knowledge of the Requirements and Guarantees associated with the implementation-generated pointers, the compiler has adequate knowledge to apply all the methods of the present method. However, when control leaves that region of analysis (e.g. invocation of code which is "external", i.e., unavailable to the compiler at compile-time, which may include constructors, destructors, functions, and operations that could raise exceptions), the compiler can ensure that implementation-generated pointers are in the Maybe-indirectable state (i.e., either the pointer is null, or it points to valid data or code). In some cases, the compiler understands that the address designated by the pointer is actually the pointer's value plus or minus some offset value which is visible to the compiler; in these cases, the "Maybe-indirectable" property means "either the pointer value is null, or the pointer (as adjusted by the offset) is valid". At any point where the compiler knows the value to be placed in the pointer, but does not yet know the value(s) to be placed in the offset(s), if "external" code must be called, then the pointer value must be null before calling such code.

The methods shown in this section will eliminate the following undefined behaviors:

| SSM# | C++-Std# | Description |
| --- | --- | --- |
| vptr | 3.6.3 para 2 | Flow of control passes through the definition of a previously destroyed local object |
| vptr | 3.8 para 5 | "Raw-storage" pointer is used as the operand of a delete-expression |
| vptr | 3.8 para 5 | Non-POD in "raw-storage" state, and ptr is used to access a non-static data member |
| vptr | 3.8 para 5 | Non-POD in "raw-storage" state, and ptr is used to call a non-static member function |
| vptr | 3.8 para 5 | Non-POD in "raw-storage" state, and ptr is implictly converted to ptr to base |
| vptr | 3.8 para 5 | Non-POD in "raw-storage" state, and ptr is used as operand of static_cast (with some exceptions) |
| vptr | 3.8 para 5 | Non-POD in "raw-storage" state, and ptr is used as operand of dynamic_cast |
| vptr | 3.8 para 6 | Lvalue designates an object in "raw-storage" state, and lvalue-to-rvalue conversion ("fetch") is applied to the lvalue |
| vptr | 3.8 para 6 | Non-POD in "raw-storage" state, and lvalue is used to access a non-static data member |
| vptr | 3.8 para 6 | Non-POD in "raw-storage" state, and lvalue is used to call a non-static member function |
| vptr | 3.8 para 6 | Non-POD in "raw-storage" state, and lvalue is implictly converted to ptr to base |
| vptr | 3.8 para 6 | Non-POD in "raw-storage" state, and lvalue is used as operand of static_cast (with some exceptions) |
| vptr | 3.8 para 6 | Non-POD in "raw-storage" state, and lvalue is used as operand of dynamic_cast |
| vptr | 3.8 para 8 | Static or auto T has non-trivial dtor, and implicit dtor takes place when object is in "raw-storage" state |
| vptr | 3.8 para 9 | Object is created in the same storage that a static or auto const object occupies (or used to occupy) |
| vptr | 4.1 para 1 | Lvalue of type T designates an object which is-not-a T, and lvalue-to-rvalue conversion is applied |
| vptr | 4.1 para 1 | Lvalue of type T designates an object which is uninitialized, and lvalue-to-rvalue conversion is applied |
| vptr | 5.2.9 para 5 | Converting B lvalue to D lvalue, where the B object is not a sub-object of a D object |
| vptr | 5.2.9 para 8 | Converting B rvalue to D rvalue, where the B object is not a sub-object of a D object |
| vptr | 5.2.9 para 9 | Converting B ptr-to-member to D ptr-to-member, where the B object is not a sub-object of a D object |
| vptr | 9.3.1 para 1 | Object is-not-a X, and member of X is called on that object. |
| vptr | 10.4 para 6 | Making virtual call to pure virtual function from ctor or dtor of abstract class. |
| vptr | 12.4 para 14 | Dtor is invoked for object whose lifetime has ended. |
| vptr | 12.6.2 para 8 | Calling member functions, typeid, or dyanamic_cast from ctor-initializer before all mem-initializers for base classes complete. |
| vptr | 12.7 para 1 | For a non-POD, referring to nonstatic member or base before ctor or after dtor. |
| vptr | 12.7 para 2 | Converting ptr-to-X to ptr-to-B before starting ctors of X and its B bases or after completion of their dtors. |
| vptr | 12.7 para 2 | Forming pointer to, or fetching value of, direct nonstatic member of object before ctors start or after dtors complete. |
| vptr | 12.7 para 3 | Virtual function call from ctor or dtor uses explicit class member access, but the type is not the class (or base) of ctor (or dtor) |
| vptr | 12.7 para 4 | typeid is used in ctor or dtor, and static type of operand is not the class (or base) of ctor (or dtor) |
| vptr | 12.7 para 5 | dynamic_cast is used in ctor or dtor, and static type of operand is not the class (or base) of ctor (or dtor) |

Iterative Method for Determining Requirements and Guarantees [iter]

The exemplary methods described above are implemented in the SSSA 35, which follows an interative method to be described in this section. (This section spells out in greater detail the steps described in section "Safe pointers [bar]" above.)

Each operation upon pointers, arrays, and/or subscripts may impose one or more Requirements upon the preceding operations, declarations, and/or initializations. Specific rules for inferring Requirements are shown in the Safe Secure Interface Inference Table ("SSIIT") 71. Each Requirement causes the initiation of an upward search for the Guarantee that satisfies the Requirement.

Each operation, declaration, and/or initialization may produce one or more Guarantees for subsequent operations. Each Guarantee persists across subsequent operations and statements until some subsequent event terminates the Guarantee; such events include the end of the lifetime of any objects in the Guarantee.

The steps itemized above can be performed in any order during the semantic analysis. Each time that these steps are applied to the entire translation unit the SSSA 35 must determine whether progress was made, i.e. whether any new Guarantee was determined, or whether any Requirement (not previously satisfied on previous iterations) is now satisfied. If an iteration covers the entire translation unit without making progress, then the SSSA 35 makes a list of all unsatisfied Requirements. For each such Requirement, if it is capable of link-time resolution, then entries are created in the SSBDF 26 so that it can be resolved or diagnosed at link-time. Otherwise, if the Requirement is capable of run-time prevention (using Sat or _Modwrap or _Zerobound logic), then the SSCG 39 generates one of the Code-Generation Choices as described above. If none of these link-time or run-time resolutions are available then the SSDG 37 issues a diagnostic. If the code whose Requirement cannot be satisfied occurs in a code region which can never be executed (i.e. "dead code") or is not executed in this application (i.e. "sleeper code"), then the implementation is permitted to treat the diagnostic as a warning. In any other context, the "unsatisfied Requirement" diagnostic must prevent production of object code. Furthermore, if the unsatisfied Requirement occurs in sleeper code, then the SSSA 35 makes notations in the SSBDF 26 to indicate that the code cannot be safely invoked, and the SSCG 39 generates a stub which satisfies the linkage requirements and produces safe behavior in Debug or non-Debug mode.

Any Requirement of "at least enough" or "no more than" can be satisfied by a Guarantee that is more strict than the Requirement.

These Requirement-Guarantee patterns are intended to reflect the basics, as understood by all Practitioners, of objects in machine memory, memory addressing, and aliasing rules. The patterns illustrated below are non-limiting examples.

Acknowledging the risk of redundancy, the Requirement-Guarantee patterns are itemized in the lists below. The first list itemizes the patterns that were defined in the Preliminary Application.

1. If the SSSA 35 has identified a Requirement that a pointer p is non-null, and if the current control flow proceeds from a non-null arc of a pointer test, then the non-null arc provides the necessary Guarantee.
2. If the SSSA 35 has identified a Requirement that a pointer, array, and/or subscript has attributes Qi, I, Nth, Ntl, End, Lo, or Hi, then various relevant Guarantees are found in Safe Secure Pointer Attribute Hierarchy 41 (see FIG. 7).
3. If the SSSA 35 has identified a Requirement that a pointer or array has the Nullterm attribute, then various relevant Guarantees are found in the paragraph "To determine the state transition for the Nullterm attribute" in section "States of objects [sta]".
4. If the SSSA 35 has identified a Requirement that an integer is usable as a subscript for array A, and if BOUND_OF(B)<=BOUND_OF(A), and if the integer is usable as a subscript for array B, then this provides the needed Guarantee.
5. If the SSSA 35 has identified any bounds Requirement after invocation of a C and C++ standard library function (such as "ptr=malloc(n)"), then the Guarantee may be provided by semantics of that function (such as "TSIZE_OF(ptr) is n") as specified in its entry in the SSBDF 26.
6. If the SSSA 35 has identified a bounds Requirement for a pointer which is visible to the SSSA 35 as a heap-allocated pointer, then a run-time Guarantee can be provided that uses bounds data from the argument(s) to the heap allocation.
7. If the SSSA 35 has identified any bounds Requirement for an array defined in the current translation unit, the bounds Guarantee is immediately available to the SSSA 35 from the defining declaration.
8. If the SSSA 35 has identified any bounds Requirement involving a subscript or pointer within the body of a counted-loop (counted-plus or counted-minus loop), then the bounds Guarantee is given by that counted-plus or counted-minus loop.

This second list itemizes additional patterns:
1. If the SSSA 35 has identified a Requirement that, for some limit LIM, 0<=i<LIM, and we have a bounding loop for (i=0; M*i<N; ++i), then the loop provides a Guarantee that LIM=N/M.
2. If the SSSA 35 has identified a Requirement that the Tsize of pointer p is at least N (in other words, the bytes from *p to *(p+N−1) are all within one object), and if p loops from a upwards to b, then the Requirement is satisfied for all p iff it is satisfied for the maximum value, b.
3. If the SSSA 35 has identified a Requirement that some property is true when N+c reaches its maximum value (where N is independent of c), then the Requirement is satisfied when c reaches its maximum value.
4. If the SSSA 35 has identified any Requirement upon a member of an object, and the context lies within one case of a switch statement (or an if-statement equivalent to a switch), and the switch expression tests the value of another member of the same object, then the Requirement is annotated with the qualifier "WHEN(member, (list-of-values))". This construct is conventionally known as a "discriminated union" or "variant record".

For a non-limiting example consider the following source program for a rudimentary storage allocator:

```
static char a[N];
static char *p = a;
void * my_alloc(size_t n) {
    char *ret = p;
    char *lim;
    if (n == 0) n = 1;
    lim = p + n;
    if (n > N || lim > a + N) return (void*)0;
    else {
        p = lim;
        return (void*)ret;
    }
}
```

As per the definition of the iterative method, the determination of Requirements and Guarantees can proceed in any order. For a non-limiting example, start with those Requirements and Guarantees that require no flow analysis. The static declarations indicate that the Bound of a is N, and that p is initialized to the same bounds as a. The expression a+N designates the End of a. On the false ("else") arc, lim has Nth or End attribute, as determined by the SSPAPT 51, and ret has whatever attributes p had on entry to my_alloc. Then flow analysis determines that p is never decremented, that no external code can modify it (because of the file-scope static), and that it is incremented only by an unsigned value which is guaranteed not to "wrap-around" the address space. Therefore, p is never less than its initial value, the Lo of a. The function performs no fetch-or-store operations using pointers or subscripts. Therefore, the SSSA 35 needs only to determine the attributes of the returned value. On one arc the returned value is null. On the "else" arc the returned value is at least Indirectable, because p is always strictly less than a value (lim) which is Nth or End. Then the SSSA 35 determines the bounds of the returned value. The returned value is a pointer into array a, so the End of p is the End of a, but the attributes of array a are not visible outside the source file of my_alloc and therefore cannot be used to define the bounds.

The only externally-visible object involved in my_alloc is the parameter n. The SSSA 35 can guarantee that the Tsize of the returned value is at least n, because p+n is at most equal to the End of a. The Tsize cannot be greater than n, because p+n can be equal to the End of a. Therefore the SSSA 35 enters into the SSBDT 61 an entry for my_alloc as follows:

---
QI TSIZE_IS(n) my_alloc(n)
---

Note that if the array a had been declared extern instead of static, the entry for my_alloc would instead specify "QI SUB4(a)". The programmer can use one of the alternative methods as defined in [0104] to indicate an intention to restrict the return attributes to "QI TSIZE_IS(n)" (or change the "extern" back to "static", of course). Such annotations by the programmer can be used to restrict Guarantees, or to impose Requirements, but such annotations cannot be used to impose broader Guarantees. If an annotation would impose a broader Guarantee, the SSDG 37 can produce a fatal diagnostic.

As a further example consider the source code for an implementation of the standard C and C++ library function strlen:

---
```
size_t strlen(const char *str) {
    size_t n = 0;
    while (*p++ !'\0')
        ++n;
    return n;
}
```
---

Because it contains a fetch using p, the SSSA 35 determines that the Requirement upon p is at least an Indirectable requirement. Because *p is never modified (consistent with the "const" qualifier), and no de-allocation is performed upon p, the Indirectable Requirement is also a Guarantee. The pattern of the loop determines the stronger Nullterm Requirement, which is also a Guarantee. The relationship between the parameter and the returned value is also dictated by the pattern of the loop. The inference of Requirements and Guarantees produces the following entry into the SSBDT 61:

---
strlen(str NULLTERM LENGTH_IS(return))
---

Consider a situation in which the programmer had explicitly indicated conflicting annotations; for example NULL, or QI, or TSIZE_IS(return). It is a requirement of the Safe Secure method that a diagnostic message shall be produced by the SSDG 37 to call the conflict to the attention of the programmer.

Figure 11:
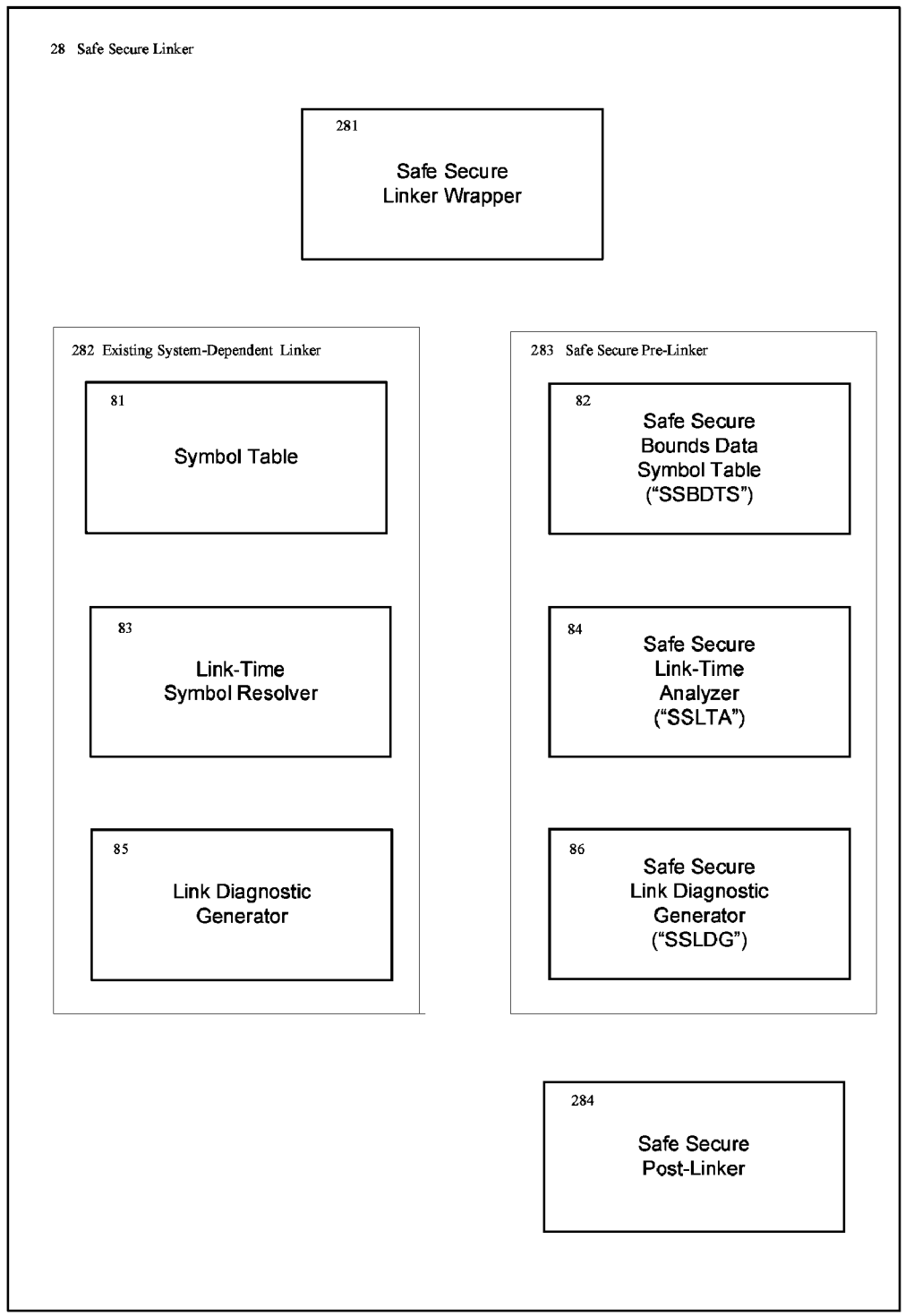
FIG. 11 shows exemplary illustrative non-limiting components of the Safe Secure Linker (SSL 28)
Figure 12:
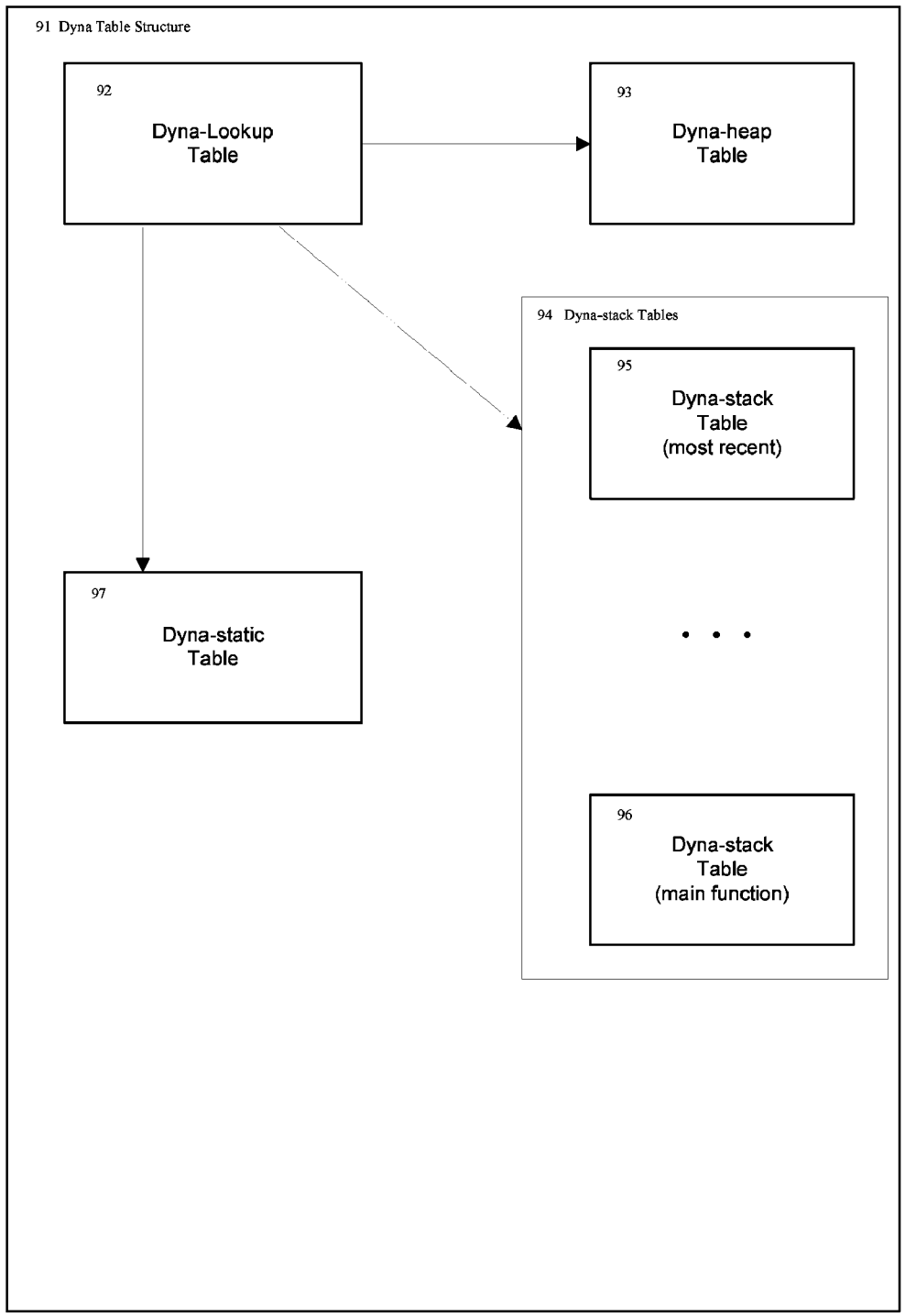
FIG. 12 shows exemplary illustrative non-limiting dynamic ("dyna") tables.
Figure 13:
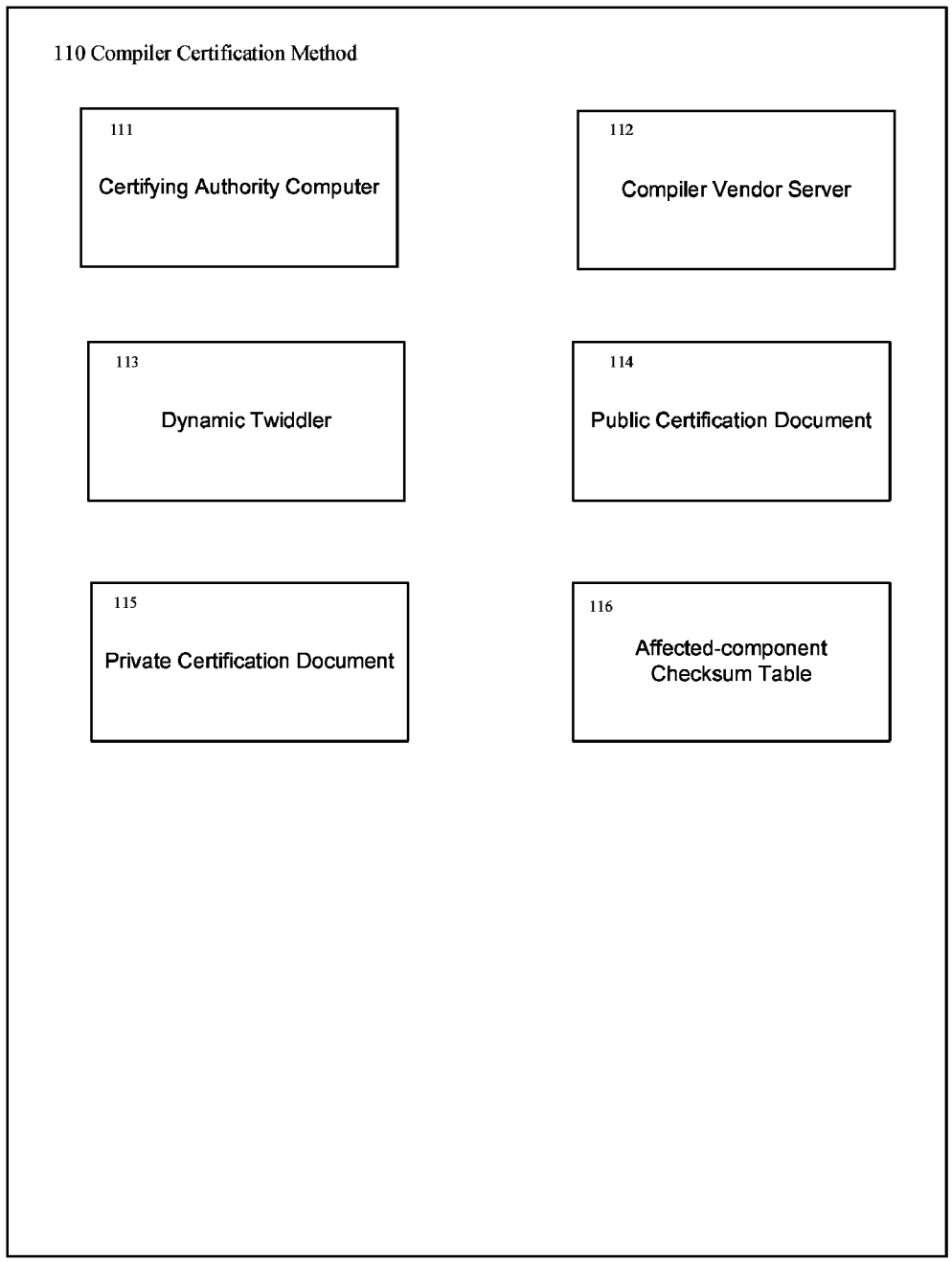
FIG. 13 is a block diagram showing the components in the certification system.
Figure 14:
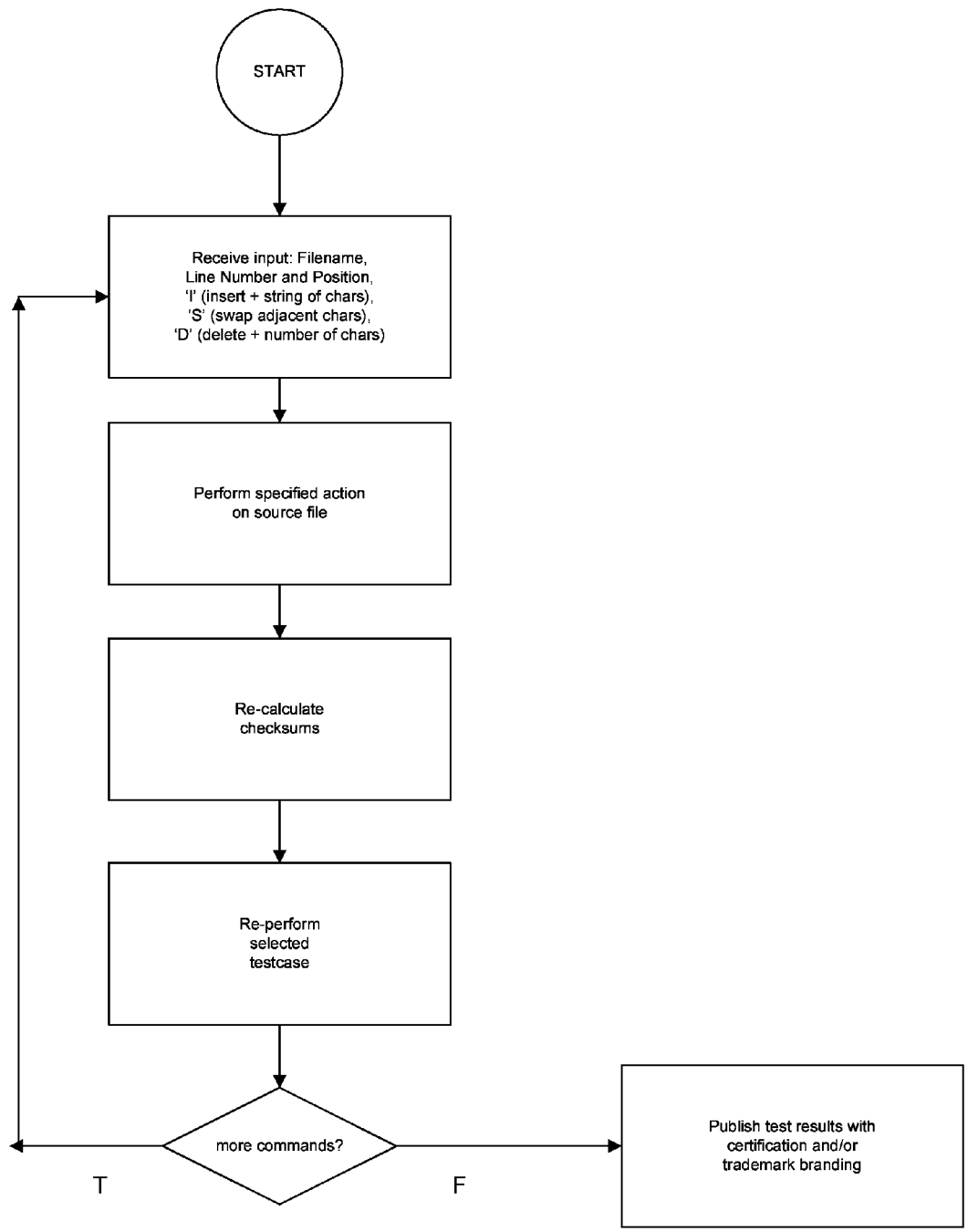
FIG. 14 is a flow chart showing the operation of the Dynamic Twiddler.

The components of the Safe Secure Linker are shown in FIG. 11. As is common in the art, the Safe Secure Linker ("SSL") 28 reads Object File(s) 25, creating a Symbol Table 81 of symbols provided and symbols needed. The Link-Time Symbol Resolver 83 determines the addresses of the symbols which will be loaded in the executable image. If any symbols are needed but not provided (or if typesafe linkage fails in C++), then the Link Diagnostic Generator 85 produces a message, as is customary in the common art. The Safe Secure Linker 28 provides further methods beyond the common art. Along with each Object File 25 and/or Dynamic Link-Library 27, Safe Secure Compiler 23 produced a SSBDF 26 containing Requirements and Guarantees. The Safe Secure Linker 28 reads the SSBDF(s) 26 which accompany the Object File(s) 25 being linked. Each "undefined symbol" entry in the Symbol Table 81 is augmented in the Safe Secure Bounds Data Symbol Table ("SSBDST") 82 with the Requirements and Guarantees provided by the various code contexts that require the symbol. Each "defined symbol" entry in the Symbol Table 81 is augmented augmented in the Safe Secure Bounds Data Symbol Table ("SSBDST") 82 with the Requirements and Guarantees provided by the defining instance of that symbol. The Safe Secure Link-Time Analyzer ("SSLTA") 84 performs these tests:

1. For each function-call linkage context, each Requirement of the called function is satisfied by a Guarantee in the calling function.
2. For each external array or pointer linkage context, each Requirement in one object file is satisfied by a Guarantee in the other object file.

Any unsatisfied Requirement causes a fatal diagnostic from the Safe Secure Link Diagnostic Generator ("SSLDG") 86; this prevents the production of any executable program.

As a further example we present part of the analysis of one program from the SPEC benchmarks. We chose to test the Safe Secure method with a hand-simulation on one complete application. Of the 12 different apps in SPEC CINT2000, the smallest is "256.bzip2", which contains about 4600 lines of code in two C source files (spec.c and bzip2.c). The smaller file (spec.c) contains about 36 fetch-or-store instances and the larger file (bzip2.c) contains about 250 fetch-or-store instances. The example below shows the first 8 instances of fetch-and-store operations in spec.c.

```
int spec_init ( ) {
    int i, j;
    debug(3, "spec_init\n");
    /* Clear the spec_fd structure */
    /* Allocate some large chunks of memory, we can tune this later */
    for (i = 0; i < MAX_SPEC_FD; i++) {
        int limit = spec_fd[i]/*1*/.limit;
        memset(&spec_fd[i], 0, sizeof(*spec_fd/*2*/));
        spec_fd[i].limit = limit;
        spec_fd[i].buf = (unsigned char *)malloc(limit+FUDGE_BUF);
        if (spec_fd[i].buf == NULL) {
            printf("spec_init: Error mallocing memory!\n");
            exit(1);
        }
        for (j = 0; j < limit; j+=1024) {
            spec_fd[i].buf[j]/*3*/ = 0;
        }
    }
    return 0;
}
int spec_random_load (int fd) {
    /* Now fill up the first chunk with random data, if this data is truly
       random then we will not get much of a boost out of it */
    #define RANDOM_CHUNK_SIZE (128*1024)
    #define RANDOM_CHUNKS (32)
        /* First get some "chunks" of random data, because the gzip
           algorithms do not look past 32K */
    int i, j;
    char random_text[RANDOM_CHUNKS][RANDOM_CHUNK_SIZE];
    debug(4, "Creating Chunks\n");
    for (i = 0; i < RANDOM_CHUNKS; i++) {
        debug1(5,"Creating Chunk %d\n", i);
        for (j = 0; j < RANDOM_CHUNK_SIZE; j++) {
            random_text[i]/*4*/[j]/*5*/ = (int)(ran( )*256);
        }
    }
    debug(4, "Filling input file\n");
    /* Now populate the input "file" with random chunks */
    for (i = 0 ; i < spec_fd[fd]/*6*/.limit; i+=
    RANDOM_CHUNK_SIZE) {
```

```
    memcpy(spec_fd[fd].buf + i, /*7*/
        random_text[(int)(ran( )*RANDOM_CHUNKS)]/*8*/,
        RANDOM_CHUNK_SIZE);
  }
  /* TODO-REMOVE: Pretend we only did 1M */
  spec_fd[fd].len = 1024*1024;
  return 0;
}
```

Eight instances of fetch-or-store operations are marked in the code sample above. Here is the analysis of Requirements and Guarantees for these eight marked instances:

| 1. spec_fd[i] | Requires: i IS_SUBSCRIPT_FOR(spec_fd) |
|---|---|

Searching for the Guarantee to meet this Requirement, we search up to the for-loop. The for-loop is a counted-plus which guarantees that i is less than MAX_SPEC_FD. MAX_SPEC_FD is 3, so the maximum value of i is 2, which is the highest subscript for the spec_fd array. Therefore, i IS_SUBSCRIPT_FOR(spec_fd). (We can abbreviate this as "i SUB4(spec_fd)".) So Requirement 1 is satisfied by the counted-plus loop.

Note a series of occurrences of the same expression (spec_fd[i]) which are satisfied by the same Guarantee, so this by-hand analysis won't re-state the previous process.

| 2: * spec_fd | Requires: (nothing) |
|---|---|

This expression (*spec_fd) looks like an indirection but it isn't; it's just syntax for the size of one element of spec_fd. Because sizeof doesn't evaluate its argument, there is no fetch-or-store. Therefore, there is really no Requirement here.

| 3: spec_fd[i].buf[j] | Requires: j SUB4(buf) |
|---|---|

Search up to the for-loop. The loop is monotone increasing, so the largest value for j is limit-1. In how many places is buf initialized? Only one, 6 lines earlier. The malloc initialization guarantees that TSIZE_OF(spec_fd[i].buf) is greater than limit. So Requirement 3 is satisfied.

| 4: random text[i] | Requires: i SUB4(random_text) |
|---|---|

This one is trivial. The "for i" loop runs i to RANDOM_CHUNKS-1, which is the Hi of random_text. So Requirement 4 is satisfied.

| 5: random_text[i][j] | Requires: j SUB4(random_text[i]) |
|---|---|

Also trivial; see the "for j" loop to the Hi of random_text[i]. Therefore Requirement 5 is satisfied.

| 6: spec_fd[fd] | Requires: fd SUB4(spec_fd) |
|---|---|

Searching upward in the spec_random_load function, nothing provides the needed Guarantee, so the Requirement becomes a Requirement of the function. Using the "bounds-data file" notation, the requirement is spec_random_load(fd SUB4(spec_fd))

It appears that this spec_random_load function is never called in this application, so this Requirement never propagates.

| 7: memcpy(–, –, RANDOM_CHUNK_SIZE) | Requires: see below |
|---|---|

The "bounds-data" file entry for memcpy will look like this:

memcpy(s, p, n IS_TSIZE_OF((s,p)))

Therefore, there are two parts to this Requirement 7:

Requirement 7a: TSIZE_OF(spec_fd[fd].buf+i) is RANDOM_CHUNK_SIZE

Requirement 7b: TSIZE_OF(random_text[(int)(ran( )*RANDOM_CHUNKS)]) is RANDOM_CHUNK_SIZE The Tsize of the first argument is the number of bytes from spec_fd[fd].buf+i to the last byte of spec_fd[fd].buf. This number of bytes reaches its minimum (its tightest constraint) when spec_fd[buf]+i reaches its maximum value. The maximum value of spec_fd[fd].buf+i is reached when i reaches its maximum value, namely spec_fd[fd].limit. The relationship between spec_fd[fd].buf and spec_fd[fd].limit is established in the function spec_init: TSIZE_OF(spec_fd[i].buf) is spec_fd[i].limit+FUDGE_BUF.

Therefore Requirement 7a is equivalent to spec_fd[i].limit + RANDOM_CHUNK_SIZE <= spec_fd[i].limit + FUDGE_BUF which simplifies to

RANDOM_CHUNK_SIZE <= FUDGE_BUF

Therefore Requirement 7a cannot be satisfied without changes to the source code. (For example, FUDGE_BUF could be increased to the same value as RANDOM_CHUNK_SIZE.) Note that this unsatisfiable Requirement occurs inside "sleeper code", i.e. code which is not executed in this application. A compiler which is being tested by SPEC would in all likelihood not give fatal diagnostics for dead code and sleeper code, and would compile and execute the application despite the unsatisfiable Requirement 7a in the sleeper-code function spec_random_load. The resulting executable program is still certifiably free from buffer overflows.

The Tsize of each row of the random_text array is RANDOM_CHUNK_SIZE, as given by the declaration of random_text; therefore Requirement 7b is trivially satisfied.

8: random_text[(int)(ran( )*RANDOM_CHUNKS)] Requirement: see below

Requirement 8 is that (int)(ran( )*RANDOM_CHUNKS) must be usable as a subscript for random_text; i.e.
(int)(ran( )*RANDOM_CHUNKS SUB4(random_text).
From the declaration of random_text, its Bound is RANDOM_CHUNKS. Therefore Requirement 8 requires
$0 <= $(int)(ran( )*RANDOM_CHUNKS)<RANDOM_CHUNKS
or
$0 <= $ran( )<1.0
This imposes a Requirement upon the ran( ) function (not shown in this example). Determining at compile-time that ran( ) actually produces a non-negative result smaller than 1.0 is beyond the scope of the Safe Secure Requirement-Guarantee patterns at compile time. Therefore the Safe Secure Compiler 23 must analyze the options for run-time checking, namely _Sat, _Modwrap, and _Zerobound. Let T1 designate the temporary result of calculating the subscript (int)(ran( )*RANDOM_CHUNKS). Since RANDOM_CHUNKS is a constant (32), the code generation for the run-time checking is as follows:

```
_Sat       random_text[0 > T1 ? 0 : (31 < T1 : 31 : T1)]
_Modwrap   random_text[T1 % 32]
_Zerobound (0 > T1 : dummy : (31 < T1 : dummy : random_text[T1])
```

Since this particular example arises in a SPEC benchmark, the compiler will probably favor optimization for speed. Because the modulus is a constant power of two, the compiler will in all likelihood recognize a special-case pattern in the _Modwrap alternative and generate the platform-dependent optimized version, which typically looks like random_text[T1& 0x1F].

The SSSA 35 can determine additional states for pointers in C++. If the pointer is produced by an array new-expression, then it acquires the Array-New attribute. If the pointer is produced by a scalar new-expression, then it acquires the Scalar-New attribute. At compile-time, or at link-time, the delete array expression requires a pointer with the Array-New attribute, and the static type of the pointer must be identical to the dynamic type. At compile-time, or at link-time, the delete scalar expression requires a pointer with the Scalar-New attribute, and the static type of the pointer must be identical to the dynamic type, or else the static type is a base class of the dynamic type and the static type has a virtual destructor.

The SSSA 35 attaches certain attributes to types in certain situations. If a class type is an incomplete type at the point where an object of that type is deleted, then the Incomplete-at-deletion attribute is attached to the class type. At the point in compilation when the class type is completed, the SSSA 35 verifies that the complete class type does not contain a non-trivial destructor or deallocation function; otherwise, a fatal diagnostic is issued.

When a member, or destructor, is invoked for an object, the compiler can determine (usually but not always) whether the type of that object is appropriate for that member (or destructor). The context in which the member or destructor is invoked imposes a Requirement on the pointer value used in that context. This Requirement is then propagated upward to meet an appropriate Guarantee; if the upward propagation stops at a function parameter list, then the Requirement is added to the link-time Requirements of that function. If the compile-time or link-time tests cannot resolve the Requirement with a Guarantee, then a fatal diagnostic can be produced.

The methods shown in this section will eliminate the following undefined behaviors:

| SSM # | C++-Std # | Description |
|---|---|---|
| Iter | 5.3.5 para 2 | In delete object expression, operand is not pointer to non-array object or a base-class subobject |
| Iter | 5.3.5 para 2 | In delete array expression, operand is not the pointer value from previous array new-expression |
| Iter | 5.3.5 para 3 | In delete object expression, static type is different from dynamic type, and static type is not a base class of dynamic type |
| Iter | 5.3.5 para 3 | In delete object expression, static type is different from dynamic type, and static type does not have a virtual destructor |
| Iter | 5.3.5 para 3 | In delete array expression, static type is different from dynamic type |
| Iter | 5.3.5 para 5 | Object being deleted has incomplete class type at point of deletion, and complete class has non-trivial dtor or deallocation function |
| Iter | 5.5 para 4 | Dynamic type does not contain the pointed-to member. |
| Iter | 12.4 para 12 | Object is-not-a X, and dtor of X is called on that object. |

Special Requirements for Special Functions [funcs]

A function is determined to be a signal handler if its address is passed to the signal function; this imposes a set of Requirements called "signal-handler Requirements" on the function. Any function called by a handler also gets marked for the signal-handler Requirements. These Requirements require that the function does not modify any object whose type is not std::sig_atomic_t or whose cv-qualifier(s) do not include volatile.

In the function-try-block of a constructor or destructor, any direct reference to a non-static member of a base class can be diagnosed at compile time. Any fetch or store via pointers imposes a Requirement upon the pointer that it does not refer to a non-static member of a base.

The methods shown in this section will eliminate the following undefined behaviors:

| SSM # | C++-Std # | Description |
|---|---|---|
| funcs | 1.9 para 9 | After receipt of a signal, the value of any object not of volatile std::sig_atomic_t is modified by the handler |
| funcs | 15.3 para 11 | Referring to non-static member of base in handler for fn-try-block of ctor or dtor (overtly or via pointer values) |

Bitwise Manipulation of Pointers [bitp]

If the low-order bits of a pointer are masked OFF or ON by a compile-time constant mask, and if that mask specifies a value smaller than the alignment requirement of the pointed-to type, then the pointer-bound-state of the pointer is not altered thereby. Alternatively, bitwise manipulation of pointers is permitted provided that the resulting pointer value is within the bounds specified by the prior value, and is aligned appropriately for the pointed-to type. In all other cases, the pointer-bound-state of the pointer is indeterminate (Unk)

after manipulation. Reading a pointer from external store (via % p, fread, or other method) produces the indeterminate pointer-bound-state. It should be obvious to the Practitioner that a pointer with the indeterminate pointer-bound-state (Unk attribute) can safely be compared against any pointer value, and that the result depends only upon the binary value of the pointer values, given the restrictions described in "Design-time choices [dt]".

The range of unsigned integer values can in one exemplary implementation be sufficient to represent the difference of any two pointers, as well as sufficient to represent unambiguously the value of any pointer.

The methods shown in this section will eliminate the following undefined behaviors:

| SSM # | C-Std # | Description |
|---|---|---|
| bitp | c6.3.2.3 | Conversion of a pointer to an integer type produces a value outside the range that can be represented |
| bitp | c7.19.6.2, c7.24.2.2 | The input item for a % p conversion by one of the formatted input functions is not a value converted earlier during the same program execution |

Variable Argument List Checking [varg]

A compiler 23 configured for the Safe Secure method can in one exemplary illustrative non-limiting implementation produce special assistance for invocation of functions declared with ellipsis ("variable-argument functions"). If the SSBDF 26 for such a function indicates the "Null-terminated" attribute at, or associated with, the ellipsis notation, then each "extra" argument to that function can be required to have the same pointer type as the last named argument, and the last argument can be required to be a null pointer. This Requirement is inferred if the source code for that function performs a loop extracting such pointers until reaching a null pointer. In addition, at each invocation, the Safe Secure Compiler 23 is aware of the promoted types of the actual arguments, and can in one exemplary implementation produce a null-terminated string containing the name-mangled representation of the promoted arguments. (For a description of a typical name-mangling algorithm, see e.g., Mark Mitchell et al., "Itanium C++ABI") The Safe Secure Compiler 23 can in one exemplary implementation provide special handling of the va_arg macro as defined in header <stdarg.h>as follows: If the type argument is a scalar type which produces a one-byte encoding in the mangled name string (e.g. double, which produces the single character 'd' in typical name-mangling, then an invocation such as $$p = va\_arg(ap, double);$$

produces a translated invocation such as $$p = \_\_va\_arg3(ap, double, 'd');$$

The enhanced_va_arg3 macro can in one exemplary implementation test that the next byte in the argument mangled-name string is the character 'd', incrementing the pointer after the test. If the test is false, an associated "match" function is invoked, such as $$\_\_va\_ar\_double\_match(\&ap);$$

The rules for type-matching for variable-argument functions permit more matches than the strict same-type rules of C++; refer to section [ts1]. If the argument mangled-name character fails the type-matching rules described there, then a run-time error is reported by using the ss_unwind function.

If at compile-time, a va_list (e.g. ap) is (1) passed as an argument to another function, (2) passed in that function to the va_arg macro, and (3) also passed to the va_arg macro in the original function, then the Safe Secure Diagnostic Generator ("SSDG") 37 can produce a fatal diagnostic. At run-time, in Debug mode, if the macro va_arg is invoked using the parameter ap that was passed to a function that invoked the macro va_arg with the same parameter, an "unwind" (such as ss_unwind) can be invoked, and the implementation may throw an exception of an implementation-defined type. At run-time in non-Debug mode, in this situation the behavior can be an implementation-defined choice between producing the next value in sequence from where the called function left off, or the next value in sequence ignoring any accesses performed in the called function. That is, the va_list information can be contained in the ap object which was passed to the called function, or the va_list information can in some way be pointed to by the ap object.

The methods shown in this section will eliminate the following undefined behaviors:

| SSM # | C-Std # | Description |
|---|---|---|
| varg | c7.15.1.1 | The va_arg macro is invoked when there is no actual next argument, or with a specified type that is not compatible with the promoted type of the actual next argument, with certain exceptions |
| varg | c7.15 | The macro va_arg is invoked using the parameter ap that was passed to a function that invoked the macro va_arg with the same parameter |
| varg | c7.15.1.4 | The va_start macro is called to initialize a va_list that was previously initialized by va_start (or va_copy in c99) without an intervening invocation of the va_end macro for the same va_list |
| varg | c7.19.6.8, c7.19.6.9, c7.19.6.10, c7.19.6.11, c7.19.6.12, c7.19.6.13, c7.19.6.14, c7.24.2.5, c7.24.2.6, c7.24.2.7, c7.24.2.8, c7.24.2.9, c7.24.2.10 | The vfprintf, vfscanf, vprintf, vscanf, vsnprintf, vsprintf, vsscanf, vfwprintf, vfwscanf, vswprintf, vswscanf, vwprintf, or vwscanf function is . . . |
| varg | c7.19.6.8, c7.19.6.9, c7.19.6.10, c7.19.6.11, c7.19.6.12, c7.19.6.13, c7.19.6.14, c7.24.2.5, c7.24.2.6, c7.24.2.7, c7.24.2.8, c7.24.2.9, c7.24.2.10 | . . . called with an improperly initialized va_list argument, or the argument is used (other than in an invocation of va_end) after the function returns |

Type-Secure Linkage

In the Safe Secure method, C functions are type-checked using an implementation mechanism similar to that used for C++. This does not introduce overloading in C; the underlying function-name identifier must be unique for each C function. The rules for matching the type of C functions also permit linkage of functions whose signature differs from the expected type by the rules of "same representation and alignment" (see [R13] 6.2.5). For example, on many implementations, the representation of the long double type is actually the same representation as the double type, i.e., a 64-bit floating point representation. The test for "same representation and alignment" extends to pointers, both for the pointer value itself and for the type pointed-to. Pointer-to-character (signed, unsigned, or unspecified) is compatible with pointer-to-void. The reason for using the relaxed rules of "same representation and alignment" rather than the strict "same type" rules is to avoid negative responses from today's C and C++ programmers, who are currently accustomed to "practical" rather than "pedantic" standards for proper behavior of variable-argument functions. Portability is often important, but portability cannot over-ride the requirements of safety and security. (An alternate name for "type-secure linkage" is "type-compatible linkage".)

The type-secure linkage rules apply to data as well as to functions.

The methods shown in this section will eliminate the following undefined behaviors:

| SSM # | C-Std # | Description |
|---|---|---|
| tsl | c6.2.7 | Two declarations of the same object or function specify types that are not compatible |
| tsl | c6.3.2.3 | A pointer is used to call a function whose type is no compatible with the pointed-to type |
| tsl | c6.5.2.2 | A function is defined with a type that is not compatible with the type |
| tsl | c6.9 | An identifier with external linkage is used, but in the program there does not exist exactly one external definition for the identifier, or the identifier is not used and there exist multiple external definitions for the identifier |
| tsl | c7.1.4 | An argument to a library function has an invalid value or a type not expected by a function with variable number of arguments |

Mode Strings For Fopen [fopen]

If at compile-time the string pointed to by the mode argument in a call to the fopen function does not exactly match one of the expected character sequences a fatal diagnostic message can be produced. If the error occurs at run-time in Debug mode, ss_unwind can be invoked; the implementation may throw an exception of an implementation-defined type. If the error occurs at run-time in non-Debug mode, the implementation can ignore all unrecognized portions of the mode argument.

The methods shown in this section will eliminate the following undefined behaviors:

| SSM # | C-Std # | Description |
|---|---|---|
| fopen | c7.19.5.3 | The string pointed to by the mode argument in a call to the fopen function does not exactly match one of the specified character sequences |

Digital Signatures for all Components [digsig]

Safety and security are compromised when compiler components (such as system header files) do not contain the approved un-modified sources as released and installed. The Safe Secure method requires that the Safe Secure Compiler 23 provides one menu choice, or one command-line invocation, which tells the user whether the components of the Safe Secure Compiler 23 (including executable programs, library object files, and system headers) have been altered (whether deliberately or inadvertently) from their initial state as delivered. The specific mechanism for such verification is left to the vendor's choice, and several mechanisms (such as checksums and digital signatures) are well-known in the current art. Furthermore, during each compilation, the first time each header (or other component) is opened for reading, the same checking of that header takes place. The same checking is also performed for all library components referenced at link-time.

The Safe Secure Compiler 23 produces the Safe Secure Inputs Check-List ("SSICL") 24, a list of the file-names (or equivalent designation) of all the source components which were read by the compiler during the compilation of one or more outputs. In addition to each file-name, the SSICL 24 also contains two or more checksums for the contents of the corresponding component. (The term "check-list" is used here to designate a list of names and checksums.) At least one of the checksums embodies the following method of forming the checksum:

1. Text files represented in ASCII, ISO 646, ISO 8859-1 ("Latin-1"), or the UTF-8 encoding of Unicode or ISO 10646, are checksummed using the values of that encoding. Otherwise, each text file is converted to the UTF-8 form of ISO 10646 before checksumming.
2. Each sequence of whitespace is replaced by one Space character before checksumming, except that
3. any tabs or spaces appearing after a line-feed are checksummed invididually rather than being condensed into one space character before checksumming.
4. No other transformations are applied to the source characters.

The SSBDF 26 contains a similar check-list listing each output file produced by the compiler (object file, executable file, or dynamic link-library), together with one or more checksums. At least one of the checksums embodies the method given above, using the actual 8-bit value of each byte as an unsigned character value (from 0 to 255). This check-list includes one entry designating the SSICL 24, including the one-or-more checksums formed in the same way as specified above for the entries contained in the SSICL 24.

Also contained in the SSBDF 26 is a list of checksums known as the Compilation Signature, formed as follows. At the $N^{th}$ occurrence of a compiler operation specified by the Safe Secure method (e.g., the inference of an attribute, or the satisfying of a Requirement by a Guarantee), the SSC 23 forms a checkum of the operand(s) of that operation. This checksum is stored as the first entry on the Compilation Signature list. Repeat this process at the $2*N^{th}$ operation, the $4*N^{th}$ operation, the $8*N^{th}$ operation, etc. The resulting list of checksums in the Compilation Signature is of a size roughly proportional to the base-2 logarithm of the program size. This Compilation Signature provides a record of the compilation of a specific program by a specific Safe Secure Compiler 23.

Distinctive Marking of Validated Applications [mark]

The SSC 23 and SSL 28 can insert code to implement the authentication method defined in U.S. Pat. No. 5,579,479; therefore, after an application has been successfully compiled and linked according to the methods described in the present invention, the executable application performs its start-up in a specific fashion.

Format Strings for Printf, Scanf, Strftime Functions [fmt]

If at compile-time the string pointed to by the format argument in a call to any of the printf/scanf functions does not match the number and types of the actual arguments, a fatal diagnostic message can be produced (as is well-known in current art). If the format string is a run-time character string (i.e., not a compile-time string), no additional argument-checking is required beyond the type-checking performed for variable argument lists (see section "Variable argument list checking [varg]").

If at compile-time the string pointed to by the format argument in a call to the strftime function does not exactly match one of the expected character sequences a fatal diagnostic message can be produced. If the error occurs at run-time, ss_unwind can be invoked; the implementation may throw an exception of an implementation-defined type.

The methods shown in this section will eliminate the following undefined behaviors:

| SSM # | C-Std # | Description |
|---|---|---|
| fmt | c7.19.6.1, c7.19.6.2, c7.23.3.5, c7.24.2.1, c7.24.2.2, c7.24.5.1 | An invalid conversion specification is found in the format for one of the formatted input/output functions, or the strftime or wcsftime function |
| fmt | c7.19.6.1, c7.19.6.2, c7.24.2.1, c7.24.2.2 | An n conversion specification for one of the formatted input/output functions includes any flags, an assignment-suppressing character, a field width, or a precision |
| fmt | c7.19.6.1, c7.19.6.2, c7.24.2.1, c7.24.2.2 | There are insufficient arguments for the format in a call to one of the formatted input/output functions, or an argument does not have an appropriate type |
| fmt | c7.19.6.1, c7.19.6.2, c7.24.2.1, c7.24.2.2 | A conversion specification for one of the formatted input/output functions uses a length modifier with a conversion specifier other than those described |
| fmt | c7.19.6.1, c7.24.2.1 | A conversion specification for a formatted output function uses an asterisk to denote an argument-supplied field width or precision, but the corresponding argument is not provided |
| fmt | c7.19.6.1, c7.24.2.1 | In a call to one of the formatted output functions, a precision appears with a conversion specifier other than those described |
| fmt | c7.19.6.1, c7.24.2.1 | A conversion specification for a formatted output function uses a # or 0 flag with a conversion specifier other than those described |
| fmt | c7.19.6.2, c7.24.2.2 | The result of a conversion by one of the formatted input functions cannot be represented in the corresponding object, or the receiving object does not have an appropriate type |

Function Invocation Patterns [invoc]

Some functions in the standard C and C++ library return nothing (the "void" functions). Other functions always return a value with no success-or-fail status information. Some functions return a value which provides status information. The C library exhibits a rather inconsistent set of status-returning patterns. Here is a list of the various patterns of status-returns for standard C and C++ functions:
 a. boolean (non-zero is success): setjmp, the character classification functions (7.1.4), feof, ferror, mblen(with null s), mbtowc(with null s), wctomb(with null s), mbsinit, wide character classification functions (7.25.2.1)
 b. null is failure: setlocale, tmpfile, tmpnam, fopen, freopen, fgets, gets, calloc, malloc, realloc, getenv, bsearch, memchr, strchr, strpbrk, strrchr, strstr, strtok, gmtime, localtime, fgetws, wcschr, wcspbrk, wcsrchr, wcsstr, wcstok, wmemchr
 c. SIG_ERR is failure: signal
 d. zero is success: raise, rename, fclose, setvbuf, fgetpos, fseek, fsetpos, atexit
 e. EOF is failure: fflush, fgetc, fputc, fputs, getc, getchar, putc, putchar, puts, ungetc, fputws, wctob
 f. negative is failure: fprintf, printf, sprintf, vfprintf, vprintf, vsprintf, fwprintf, swprintf,vfwprintf, vswprintf, vwprintf, wprintf
 g. number of items transmitted: fscanf, scanf, sscanf, vfscanf, vscanf, vsscanf, fread, fwrite, fwscanf, swscanf, vfwscanf, vswscanf, vwscanf, wscanf
 h. nonnegative and less than n: snprintf, vsnprintf
 i. negative one is failure: ftell, mblen(with non-null s), mbtowc(with non-null s), wctomb(with non-null s), mbstowcs, wcstombs, clock, mktime, time, wcrtomb, mbsrtowcs, wcsrtombs
 j. high-low-equal: memcmp, strcmp, strcoll, strncmp, fwide, wcscmp, wcscoll, wcsncmp, wmemcmp
 k. greater than n is failure: strxfrm, wcsxfrm
 l. [reserved—no L]
 m. zero is failure: strftime, wcsftime
 n. WEOF is failure: fgetwc, fputwc, getwc, getwchar, putwc, putwchar, ungetwc, btowc
 o. minus two through n: mbrlen, mbrtowc In each of the calling contexts listed above, there is a special "comparison value" against which the returned value should be tested. For cases 1, 2, 4, 6, 10, and 12, the comparison value is zero. For case 3, the comparison value is SIG_ERR. For case 5, the comparison value is EOF. For cases 7 and 11, the comparison value is a value unambiguously determined by the list of arguments. For case 8, the comparison value can be either zero or a value unambiguously determined by the list of arguments. For case 13, the comparison value is WEOF. For case 14, the comparison value can be −2, or −1, or a value unambiguously determined by the list of arguments.

There are several calling contexts which will meet the requirements listed above:
 a. A conditional control-flow test (if, while, for, switch, or logical operator) which explicitly or implicitly tests the returned value against the appropriate comparison value.
 b. Assignment of the returned value to some object, after which the first conditional control-flow test is a test that matches the preceding context (#1).

This determination of proper calling context can in one exemplary implementation also be made available for user-written functions by providing to user programs a macro such as _ _CALLED_LIKE(name).

If the function is called properly, then error returns are handled normally, without incurring additional run-time overhead in the calling or called function. In Debug mode, if the function was not called properly, extra code is generated in the calling function such that a failure return causes an ss_unwind with a descriptive string argument. In non-Debug mode, in all cases where execution can continue without causing fetch-or-store errors, then execution continues without interruption; otherwise a fatal diagnostic is produced at compile-time. The cases where a fatal diagnostic is produced in non-Debug mode are specified below:
 a. boolean (non-zero is success): none
 b. null is failure: getenv. (Note that FILE* pointer parameters are required to have the "indirectable" attribute in CSAFE mode, so passing "maybe-indirectable" FILE* variables will be diagnosed at compile time. Similarly, pointer returns from allocation and searching functions do not demand immediate null-testing, because the "maybe-indirectable" attribute will require null-testing before later indirecting.)

c. SIG_ERR is failure: none
d. zero is success: atexit (Note: most I/O failures may produce erroneous results but do not cause fetch-or-store errors.)
e. EOF is failure: none (Note: most I/O failures may produce erroneous results but do not cause fetch-or-store errors.)
f. negative is failure: none (Note: most I/O failures may produce erroneous results but do not cause fetch-or-store errors.)
g. number of items transmitted: snprintf, sprintf, vsprintf (Note: most I/O failures may produce erroneous results but do not cause fetch-or-store errors.)
h. nonnegative and less than n: none (Note: most I/O failures may produce erroneous results but do not cause fetch-or-store errors.)
i. negative one is failure: mktime
j. high-low-equal: none
k. greater than n is failure: strxform, wcsxform
l. [reserved—no L]
m. zero is failure: strftime, wcsftime
n. WEOF is failure: none
o. minus two through n::none Compile-Time Diagnosis [ct]

Many of the situations labeled as "undefined behavior" are capable of diagnosis by the compiler. In the methods presented here, the cases identified by the code "ct" in column one result in the production of a fatal diagnostic message by the Safe Secure Compiler 23. Furthermore, production of a fatal diagnostic message prevents the Safe Secure Compiler 23 from producing a translated file.

The C standard defines a diagnostic message as follows: "3.10 diagnostic message: message belonging to an implementation-defined subset of the implementation's message output". The C standard places this requirement on the #error preprocessor directive [ISO/IEC 9899 4 para 3]: "The implementation shall not successfully translate a preprocessing translation unit containing a #error preprocessing directive unless it is part of a group skipped by conditional inclusion." In other words, a "fatal diagnostic" is a diagnostic message which has an effect as if it were produced by a #error preprocessing directive.

The SSC 23 can issue a fatal diagnostic if any of the following conditions occur in a C++ program: an object has incomplete type, its address is taken, and the complete type is a class that contains an operator&( ); the implementation-defined limit on template instantiation depth is exceeded; flowing off the end of a function-try-block (or return with no value) in a value-producing function; declarations or definitions or template specializations are added to namespace std, or names are declared or defined in a context where it is reserved (unless otherwise specified in ISO/IEC 14882); instantiating a Standard Library container with an auto_ptr; the basic_filebuf traits::pos_type is not fops<traits::state_type>.

The methods shown in this section will eliminate the following undefined behaviors:

| SSM # | C-Std # | Description |
|---|---|---|
| ct | c6.5.2.2 | For a call to a function without a function prototype in scope where the function is defined with a function prototype, . . . |
| ct | c6.5.2.2 | . . . either the prototype ends with an ellipsis or the types of the arguments after promotion are not compatible with the types of the parameters |
| ct | c6.10.6 | A non-STDC # pragma preprocessing directive that is documented as causing translation failure or some other form of undefined behavior is encountered |
| ct | c6.5.2.2 | For a call to a function without a function prototype in scope where the function is not defined with a function prototype, the types of the arguments after promotion are not compatible with those of the parameters after promotion |
| ct | c6.5.2.2 | For a call to a function without a function prototype in scope, the number of arguments does not equal the number of parameters |
| ct | c6.5.2.2, c6.5.15, c6.5.16, c6.5.17 | An attempt is made to modify the result of a function call, a conditional operator, an assignment operator, or a comma operator, or to access it after the next sequence point |
| ct | c7.1.2 | A file with the same name as one of the standard headers, not provided as part of the implementation, is placed in any of the standard places that are searched for included source files |
| ct | c7.1.2 | A function, object, type, or macro that is specified as being declared or defined by some standard header is used before any header that declares or defines it is included |
| ct | c7.1.2 | A standard header is included while a macro is defined with the same name as a keyword |
| ct | c7.1.2 | The program attempts to declare a library function itself, rather than via a standard header, but the declaration does not have external linkage |
| ct | c7.1.3 | The program declares or defines a reserved identifier, other than as allowed by 7.1.4 |
| ct | c7.1.3 | The program removes the definition of a macro whose name begins with an underscore and either an uppercase letter or another underscore |
| ct | c7.12 | A macro definition of math_errhandling is suppressed or the program defines an identifier with the name math_errhandling |
| ct | c7.13 | A macro definition of setjmp is suppressed in order to access an actual function, or the program defines an external identifier with the name setjmp |
| ct | c7.13.2.1 | An invocation of the setjmp macro occurs other than in an allowed context |
| ct | c7.14.1.1 | The program specifies an invalid pointer to a signal handler function |
| ct | c7.15, c7.15.1.1, | A function with a variable number of arguments attempts to access its |

| SSM # | C-Std # | Description |
|---|---|---|
| | c7.15.1.4 | varying arguments other than through a properly declared and initialized va_list object, or before the va_start macro is invoked |
| ct | c7.15.1 | A macro definition of va_start, va_arg, va_copy, or va_end is suppressed in order to access an actual function, or the program defines an external identifier with the name va_copy or va_end |
| ct | c7.15.1, c7.15.1.2, c7.15.1.3, c7.15.1.4 | The va_start or va_copy macro is invoked without a corresponding invocation of the va_end macro in the same function, or vice versa |
| ct | c7.15.1.1 | The type parameter to the va_arg macro is not such that a pointer to an object of that type can be obtained simply by postfixing a * |
| ct | c7.15.1.4 | The parameter parmN of a va_start macro is declared with the register storage class, with a function or array type, or with a type that is not compatible with the type that results after application of the default argument promotions |
| ct | c7.2 | The macro definition of assert is suppressed in order to access an actual function |
| ct | c7.5 | A macro definition of errno is suppressed in order to access an actual object, or the program defines an identifier with the name errno |

| SSM # | C++-Std # | Description |
|---|---|---|
| ct | 5.3 para 4 | Object has incomplete type, its address is taken, and the complete type is a class that contains an operator&( ) |
| ct | 14.7.1 para 14 | Exceeding an implementation-defined limit on template instantiation depth. |
| ct | 15.3 para 16 | Flowing off the end of a function-try-block (or return with no value),in a value-returning function. |
| ct | 17.4.3.1 para 1 | Adding declarations or definitions to namespace std unless otherwise specified |
| ct | 17.4.3.1 para 1 | Adding template specializations to namespace std except as permitted |
| ct | 17.4.3.1 para 3 | Declaring or defining a name in a context where it is reserved (except where permitted) |
| ct | 20.4.5 para 3 | Instantiating a Standard Library container with an auto_ptr |
| ct | 27.8.1.1 para 4 | Basic_filebuf traits::pos_type is not fpos<traits::state_type> |

Big Safe Pointers [bsafe]

This section presents an alternative to the compile-time-safe ("CSAFE") pointers defined in the sections "States of objects [stat]" and "Safe pointers [buf]". In this alternative, all pointers are implemented as "big-safe pointers" (or "BSAFE" pointers) using a struct containing three ordinary pointers (each represented as a pointer to an underlying type T). The methods shown in this section provide an alternative mechanism to address the undefined behaviors that are listed above in the section "Safe pointers [buf]".

In one specific implementation, the big-safe-pointer mechanism is achieved by transforming the C or C++ source program into a C++ program in which each big-safe pointer is implemented as a template struct:

```
template <class T> struct bsafe_ptr {T* ptr; T* lo; T* hi;};
```

Thus, every big-safe pointer will include low and high bounds information.

In an alternative embodiment, the high-bound information is represented as a Tsize-adjusted field. The Bound is defined as the Tsize divided by the size of the type T to which the pointer is pointing. The Tsize-adjusted is the Tsize minus the size of the type T, i.e. the number of bytes in the array between the address of the first object of type T and the last object of type T. If there is only one element in the array, the Tsize-adjusted is zero.

In order to make a copy of a bsafe_ptr, we provide a clone(T* p) member:

```
bsafe_ptr<T> clone(T*p) {
    bsafe_ptr<T>* ret = new bsafe_ptr<T>(p,lo,hi);
    if (Debug && p > hi+1) {
        delete ret;
        ss_unwind("bsafe_ptr out of range: clone \n");
    }
    ret->ptr=p; ret->lo=lo; ret->hi=hi;
    return *ret;
}
```

Since the initial target language is the intersection of C and C++, we want to map the semantics of big-safe-pointers into a macro-compatible syntax:

```
#define LO_OF(p)     ((p).clone((p).lo))
#define HI_OF(p)     ((p).clone((p).hi)
#define END_OF(p)    ((p).clone((p)+BOUND_OF(p)))
#define BOUND_OF(p)  (TSIZE_OF(p)/sizeof((*p)))
#define TSIZE_OF(p)  ((size_t)((p).ts) + sizeof(*(p)))
```

In other words, END_OF(p) is a bsafe pointer with the same Lo and Hi values as p and containing the "one-too-far" address as its current ptr value. Similarly, LO_OF(p) is a bsafe pointer with the same Lo and Hi values as p and containing p.lo as its current ptr value. The BOUND_OF(p) is an integer designating the number of elements in the array that extends from LO_OF(p) to HI_OF(p). The TSIZE_OF(p) ("target size of p") is the number of bytes in the storage accessed through p.

We define the Lo-Hi information, or Lo-Hi bounds, as the information embodied in the lo and hi fields.

A pointer value that designates an object in an array includes the bounding addresses of the array. Assigning a pointer value to a pointer object preserves the lo, hi, and ptr members. Creating a pointer via the big-safe version of malloc(N) produces a bsafe_ptr containing the ptr address of the new storage, a lo equal to ptr, and a hi of N/ sizeof(T). Casting a bsafe_ptr, for example from char* to T*, converts ptr and lo to T* values; if ptr or are not properly aligned, an ss_unwind is raised.

Pointer arithmetic (ptr+n, ptr−n, ptr−ptr, ptr[n]) and fetch-and-store indirection operators (explicitly via "star" or implicitly in the lvalue use of subscript) are checked and diagnosed according to the rules as described in section "Safe pointers [buf]", with the obvious inclusion of run-time checking against the values store in the big-safe-pointer.

Note that the first member of a bsafe_ptr is the pointer value ptr. This is intentional and required; any non-BSAFE code which refers to a bsafe_ptr as an ordinary pointer will properly address the pointer value.

In the big-safe-pointer alternative, all external pointers have bsafe_ptr representation. In particular, any system-defined external pointers (such as environ) have bsafe_ptr representation. (The cost is only two extra words per external pointer.)

There are a few application niches which might conceivably use only big-safe pointers, such as the training of programmers, the creation of user-provided callback functions, the production of specialized "one-off" prototypes, etc. All are areas that might be willing to trade some time and space for greatly increased reliability. However, most application domains are using C and C++ because of superior intrinsic efficiency, and the overheads of big-safe pointers would be commercially unsupportable; this favors the compile-time-safe pointer methods as described earlier.

Note that the printf/scanf functions use pointer arguments for the % s and % p formats. Therefore, although the old "unsafe" versions can be called via a "wrapper" in the CSAFE mode, the wrapper must indicate by a state flag that % p input produces a "not-indirectable" pointer in the CSAFE mode. The fully bounds-checked versions can be provided in BSAFE mode Including the big-safe-pointer alternative, the Safe Secure method has defined four modes of code generation: Debug BSAFE, Debug CSAFE, non-Debug BSAFE, and non-Debug CSAFE. A further alternative is to reduce the modes to two: Debug BSAFE and non-Debug CSAFE.

Implementing the SSBDF using Name-Mangling [mangl]

One non-limiting method for implementing the SSBDF 26 makes use of the name-mangling facilities of C++, employing appropriate encodings in the object-file representation to convey the bounds information for each fetch-and-store variable in each function's calling sequence. The parameter type can be encoded into the apparent classname of the pointer argument:

| | |
|---|---|
| __csafe__ptr__B1 | Bound = 1 |
| __csafe__ptr__Ba2 | Bound = int arg #2 |
| __csafe__ptr__L5 | Length = 5 |
| __csafe__ptr__La7 | Length = int arg #7 |
| __csafe__ptr__T9 | Tsize = 9 |
| __csafe__ptr__Ta_11 | Tsize = int arg #11 |
| __csafe__ptr__A3 | Tsize-adjusted = 3 |
| __csafe__ptr__Aa4 | Tsize-adjusted = int arg #4 |
| __csafe__ptr__Ae10Identifier | Tsize-adjusted = external Identifier of 10 characters |
| __csafe__ptr__Oa1 | Lo = compatible-type ptr arg #1 |
| __csafe__ptr__Ha2 | Hi = compatible-type ptr arg #2 |
| __csafe__ptr__Ea3 | End = compatible-type ptr arg #3 |

-continued

| | |
|---|---|
| __csafe__ptr__Oa1Ha2 | Lo = compatible-type ptr arg #1, Hi = compatible-type ptr arg #2 |
| __csafe__ptr__I | Indirectable |
| __csafe__ptr__QI | Maybe-indirectable = indirectable or null |
| __csafe__ptr__NI | Not-Indirectable |
| __csafe__ptr__NT | Null-Terminated (with no other bounds info) |
| __csafe__ptr__NTTa1 | Null-Terminated, Tsize = int arg #1 |

Using this system, the object code for memcpy would embody encodings such as these:

___csafe__ptr__Ta1<void>
memcpy(___csafe__ptr__Ta1<void> s1, ___csafe__ptr__Ta1<void> s2, size__t n);

Parameters which are not pointers may be involved in fetch-or-store expressions in the called function, so a similar encoding is provided for non-pointers:

| | |
|---|---|
| __csafe__n__Te2Id | This integer parameter is the Tsize of the external array named "Id". |
| __csafe__n__Ie1A | This integer parameter is indirectable (i.e. usable as subscript) for the external array named "A". |
| __csafe__n__Be3buf | This integer parameter is the bound of the external array named "buf". |
| __csafe__n__Le3str | This integer parameter is the length of the external array named "str". |

Sometimes within a Source Program 107 an integer parameter is used within the called function to specify the bounds, or subscript, for several different external arrays; the SSSA 35 knows which arrays those are from examination of the code in the called function. Rather than encoding all those array names into the parameter's augmented-type, the array with the smallest bound should be chosen; if two or more have this same bound, choose the shortest name; if two or more names have the same length, choose the lexicographically smallest name. Here is an example that illustrates the intended usage:

File 1:
extern int a[ ];
void f(int k) {
 ap[k] = 1;
}

File 2:
int a[64] = {0};
int main( ) {
 int j;
 for (j − 0; j < 64; ++j)
  f(j);
}

The augmented signature of the function f is as follows:

void f(___csafe__n__Ie1a<int>)

This presents a Requirement for the invocation of fin File 2, namely, that the argument must be suitable for use as a subscript on array a, and informs the main program that the variable j is being used for fetch-or-store access to a. The main program must determine the range of values for j and verify that j is suitable as a subscript on array a.

Since the names of these "helper" classes are intended only for consumption by the Safe Secure Compiler 23 itself, there is no need for human-readable names in this context. In the preferred implementation, an alternative encoding is produced by reducing the length of the names of the "_csafe" classes while avoiding collision with implementation-defined names in the implementer's namespace. The parsing of the class names as part of a mangled name requires no lookahead or added terminators. When integers are permitted in the name, a single-digit integer is encoded as-is, and an N-digit integer is prefixed by N−1 underscore characters. When an identifier is encoded, it is prefixed by the N-digit integer designating the length of the identifier (without any leading underscore characters).

Notating an attribute as a post-condition (shown as POST earlier) is achieved by adding a marker such as 'P' in the augmented name-mangling method:

```
int swprintf(___csafe_ptr_NTBa1PLa0<wchar_t> restrict s,
    size_t n,
        ___csafe_ptr_NT<const wchar_t> restrict format, ...);
```

Note that in the Guarantees, the returned value is indicated as "argument number zero", with digit zero.

In CSAFE mode, any pointer argument can have the "not-indirectable" attribute. This attribute is the default attribute for pointer parameters. This attribute is explicitly documented via the template type_csafe_ptr_NI<T>("csafe pointer, not-indirectable"), or more simply as an ordinary T* pointer.

Making Changes to Incorporate the Bounds-Checking C Library [libchanges]

The components and methods embodied in the SSC 23 and SSL 28 can be used to convert existing C and C++ programs to make use of the Bounds-checking C library referred to above in "Secure library [slib]". (An original proposal was called the "Secure library", then revised to "Safer library", then changed to "Bounds-checking library".)

In one alternative, the methods described in "Dynamic monitoring of allocated storage [dyna]" are not used in the compiler which will compile and execute the C or C++ program. In this alternative, all information needed to prevent undefined behavior (such as array-bounds information) must be verified by the SSC 23 and SSL 28 at compile-time and link-time respectively, otherwise a fatal diagnostic is produced. For each ("non-deprecated") function defined in the Bounds-checking C library (such as strcpy_s), there is a corresponding function that lacks some indication of the bounds data of the target (such as strcpy); call that the "corresponding deprecated function". The set of all the corresponding deprecated functions constitutes the "deprecated functions". For each invocation of a deprecated function in the program being compiled, the bounds-data Requirements are well-known in the current art, as illustrated in the table at [0129] above. If the SSC 23 employing the methods given above is unable to determine a corresponding bounds-data Guarantee, then the methods above specify that a fatal diagnostic is issued. Otherwise, the source code invocation is re-written by the SSC 23 to an invocation of the corresponding non-deprecated function, in which the bounds-data Guarantee is explicitly passed as an argument. If the source-code context tests the returned value from the deprecated function, then the SSC 23 consults the table given above in "Function invocation patterns [invoc]", to rewrite the success-or-fail test into a test against the "errno_t" returned value from the corresponding non-deprecated function.

In a second alternative, the methods described in "Dynamic monitoring of allocated storage [dyna]" are used in the compiler which will compile and execute the C or C++ program. In this alternative, even if all array-bounds information has not been verified by the SSC 23 and SSL 28 at compile-time and link-time respectively, the resulting executable program will still produce no undefined behaviors, because of the dynamic-monitoring mechanisms. If the SSC 23 employing the methods given above is unable to determine a corresponding bounds-data Guarantee, then the source code invocation is not re-written by the SSC 23. The invocation of the deprecated function (such as strcpy) remains in the source code. In this alternative, the user-callable deprecated functions are provided in specially-programmed versions, and the un-checked low-level equivalents (such as _unchecked_strcpy) are also provided, as indicated in the prior art cited above in "Dynamic monitoring of allocated storage [dyna]". If the invocation of the deprecated function is re-written into an invocation of the corresponding non-deprecated function, and if the source-code context tests the returned value from the deprecated function, then the SSC 23 consults the table given above in "Function invocation patterns [invoc]", to rewrite the success-or-fail test into a test against the "errno_t" returned value from the corresponding non-deprecated function.

Providing Optimizations for the Bounds-Checking C Library [liboptim]

The components and methods embodied in the SSC 23 and SSL 28 can also be used to optimize the execution of C and C++ programs that make use of the Bounds-checking C library referred to above in "Secure library [slib]".

In one alternative, the methods described in "Dynamic monitoring of allocated storage [dyna]" are not used in the compiler which will compile and execute the C or C++ program. For each invocation of a non-deprecated function defined in the Bounds-checking C library (such as strcpy_s), the SSC 23 may be able to determine at compile time that all the Requirements of that non-deprecated function are met by Guarantees in the source program. In such cases, the compiler can implement the invocation by an invocation of the corresponding deprecated (more efficient) function. The returned value is known at compile time to be the success (zero) value; any non-empty code along the failure (non-zero) branch of the test can be eliminated as dead code.

In a second alternative, the methods described in "Dynamic monitoring of allocated storage [dyna]" are used in the compiler which will compile and execute the C or C++ program. For each invocation of a non-deprecated function defined in the Bounds-checking C library (such as strcpy_s), the SSC 23 may be able to determine at compile time that all the Requirements of that non-deprecated function are met by Guarantees in the source program. In such cases, the compiler can implement the invocation by an invocation of the corresponding un-checked low-level equivalent function (such as _unchecked_strcpy). The returned value is known at compile time to be the success (zero) value; any non-empty code along the failure (non-zero) branch of the test can be eliminated as dead code.

Using Existing Linkers within the Safe Secure Linker [uselinker]

The exemplary illustrative non-limiting implementation provides the SSL 28 as one program. An alternative implementation of the SSL 28 is to combine an existing system-dependent linker program with three new components: the Safe Secure Linker Wrapper 281, the Safe Secure Pre-Linker (SSPreL) 283 and the Safe Secure Post-Linker (SSPostL) 284. The subsequent sections describe methods embodied in the SSPreL 283 and/or the SSPostL 284; the same methods can alternatively be embodied in an integrated SSL 28 program.

The SSPreL 283 implements all the techniques described to this point, leaving the system-dependent linker program to perform the usual functions as commonly understood in the art. For a non-limiting example, the SSPreL 283 reads all the SSBDFs 26 to verify Guarantees against Requirements.

Each implementation can provide an implementation-defined means of instructing the SSPreL 283 to require that all invocations of library functions have been verified at compile-time, so that ordinary un-checked libraries can be used.

Applying all the methods and techniques as described above, in certain situations the SSPreL 283 would be used to produce a fatal diagnostic if one SSBDF 26 imposed a Requirement which could not be satisfied. Here is one further alternative for any cases in which the Requirement affects a pointer in static storage which has an external identifier (i.e., a "global pointer"). In such cases, the SSPreL 283 creates a notation in the SSBDF 26 for each object file in which the pointer is defined or modified, indicating that the End ("Toofar"), or alternatively the End and the Lo, of said pointer are required to be maintained in objects to be added to said object file. We define the term "bucket" to designate an address-sized object which is added to the object file to record bounds data at run-time. One implementation method is to publish to the linker "mangled" names designating "the Lo address for pointer Identif" and "the End address for pointer Identif", where "Identif" is the external name (or a mangled representation of the lvalue expression derived from the external name) of the pointer. An alternative implementation method ("pseudo-operators") is to assign unique but unpredictable names localized to the specific object file, along with annotation in the SSBDF 26 designating "the Lo address for pointer Identif" and "the End address for pointer Identif". With or without this alternative, the SSC 23 can directly recognize the notations shown in section "[buf]" at and previously mentioned, using the ordinary identifiers such as TSIZE_OF(Identif), or identifiers in the implementation name-space such as _TSIZE_OF(Identif), or any equivalent naming scheme. Furthermore, the SSC 23 can directly recognize a notation such as _TSIZE to appear in an argument list, indicating the Tsize for the preceding argument, as in the following example:

```
memcpy_s(buf, _TSIZE, src, n);
```

If an End bucket is null, then no data is stored in that bucket or in any associated Lo bucket.

We provide a non-limiting (but far-fetched) source-program example to illustrate the method. In one source file a global pointer p is allocated to some random number of bytes

```
extern char *p;
void f( ) {
    p = malloc( rand( ) );
    if (p==0) abort( );
}
```

In a second source file, the pointer p is defined and used:

```
char *p = 0;
int main( ) {
    f( );
    p[42] = 0;
}
```

The SSBDF 26 for the second object file specifies the Requirement that, after invoking f, the integer value 42 is suitable as a subscript for p. Since the SSBDF 26 for the first object file specifies no corresponding Guarantee, the SSPreL 283 would have been required to issue a fatal diagnostic. However, by the current alternative, the SSPreL 283 can specify a bucket for "the End address for pointer p" into the SSBDF 26 for both object files (or alternatively, two buckets for End and Lo). The SSPreL 283 can cause the re-compilation of both source files. In the first file, each time the pointer p is modified, the SSCG 39 assigns its End address (or End and Lo addresses) to the designated bucket(s). In the second file the bucket is used to validate the subscript before the assignment. As a further extension of the current alternative, the SSCG 39 can perform the same creation and use of a bucket within one source file, while indicating in the SSBDF 26 the availability of the bucket(s) for any other object file that needs them. The current alternative uses the notation in each SSBDF 26 to include a list of global pointers that are modified within the associated object file.

As an alternative, the Lo and End buckets can be unconditionally created for each global pointer. In this alternative, there is no need for the SSPreL 283 to cause re-compilation of source files to obtain buckets for global pointers, because Lo and End buckets are always maintained for each global pointer. Conventional techniques for deleting unreferenced data (and unreferenced functions) are well-known in the current art, and are in this alternative performed by the SSPreL 283.

Providing Optimizations for Dynamic Monitoring of Allocated Storage [dyna-optim]

The techniques described in "Dynamic monitoring of allocated storage [dyna]" can be significantly optimized, as described in this section. One may create one or more tables (the "dyna tables") at (or before) each moment of run-time, said tables containing pairs of addresses (or address-equivalents) recording the Lo address and the End ("Toofar") address for each object currently allocated; except that for any objects whose addresses could never be the subject of pointer or array references or arithmetic (in contexts in which their bounds are not already provided to the SSC 23), the addresses of such objects need not be recorded into the table. The paragraphs below will describe the methods for creating an optimized version of said tables. In each case, a simple version is presented; in later paragraphs, alternatives will be defined to address complications, or optimization opportunities, that may be encountered in some implementations.

Tables for Monitoring Static Storage [dyna-static]

In the process of producing the Object File 25 and the SSBDF 26 for each Source Program 21, the SSC 23 becomes aware of the "[Lo, End)" values for each object residing in static storage. If an object is found in block-local static storage (or file-scope non-external static storage) and its address is never taken, or its address is never exposed outside its block-local scope (or static file scope), then no bucket is required for that object. If two occurrences of the same string literal are stored as two separate arrays of characters in memory, then no bucket is required for a string literal unless it has been assigned to a pointer which is exposed outside its block-local scope and no existing variables already provides Guarantees for its bounds.

For every non-scalar static object (other than those excluded above) an entry is created in the SSBDF 26 for this Source Program 21, recording the object's offset from the start of the data segment of the Object File 25, the size in bytes of the object, and the external name of the object (if any). In a further alternative, the SSC 23 can accept an input file which provides a list of all objects located at absolute addresses, to accommodate embedded and hardware-dependent applications.

At link-time, the SSPreL 283 reads the entries in all the SSBDFs 26, determines the order of the various address ranges, and creates a compilable C source file (the "dyna-static source file") containing the definition and initialization of a table, the Dyna-Static Table 97, which contains all the entries as described above. Each entry in the table consists of one pair of buckets: the "End" address of each object, and the "Lo" address of each object (alternatively stored vice-versa). The table is stored in sorted sequence, running from low-to-high (or high-to-low) addresses. (The SSC 23 can ensure that the "End" address of one object in the table is never equal to the "Lo" address of the object at the next location in the table. For a non-limiting example, this can be achieved by interspersing scalar objects between array objects, or by introducing unused "padding" bytes between array objects.) The format of the table can be chosen by the implementation to achieve any desired optimization policy; some form of tree structure is a typical choice.

If "Identif" is the external identifier for an object whose "Lo, End" buckets are entered into the table, then those buckets are published to the linker with a "mangled" name designating "the Lo address for Identif" and "the End address for Identif". (The details of an adequate name-mangling method are dependent upon the restrictions of each implementation, but are in general well-understood.) Alternatively, the pseudo-operators method can be employed, as described above.

The SSPreL 283 causes the compilation of the dyna-static source file to produce an object file (the "dyna-static object file"). The SSPreL 283 then causes the existing system-dependent linker 282 to link the dyna-static object file with the other object files to produce the Safe Secure Executable Program 29 (using methods well-known in the current art).

In some implementations, the address-allocation rules employed by the system linker may produce static-address sequences that contradict the low-to-high (or high-to-low) sequence in which the table was created. In such implementations, the SSPostL 284 can examine the contents of the dyna-static object file to determine the actual sequence, producing an address-order-file that reflects the actual sequence, re-writing the dyna-static source file, causing the compilation of that source file to produce the dyna-static object file, and causing the linking of the dyna-static object file with the other object files to produce the Safe Secure Executable Program 29. Each subsequent execution of the SSPreL 283 can consult the address-order-file to determine the initial ordering of the Dyna-Static Table 97.

Note that the buckets created by the SSPreL 283 for global pointers (as described in section [use-linker]) are not incorporated into the Dyna-Static Table 97.

Tables for Monitoring Stack Storage [dyna-stack]

In the process of producing the Object File 25 for each Source Program 21, the SSC 23 becomes aware of the "[Lo, End)" values for each object residing in stack storage. If an object is found in block-local stack storage and its address is never taken, or its address is never exposed outside its block-local scope, or existing variables already provide Guarantees for its bounds, then no entry is required for that object.

The tables which record the address values for stack objects are the Dyna-stack Tables 94. In this simplest version of the dyna-stack tables, every non-scalar stack object (other than those excluded above) is recorded into the dyna-stack table for the current function. Said dyna-stack table contains offsets (determined in an implementation-dependent way as offsets from a "frame-address" determined from the frame pointer designating the current stack frame, or an equivalent address, such as the address of the lowest-addressed object contained within this stack frame). The pairs of "End" offset and "Lo" offset are entered into a table structured as described above. Each table is arranged in sorted sequence, as described above. (The SSC 23 can ensure that the "End" offset of one object in the table is never equal to the "Lo" offset of the object at the next location in the table. For a non-limiting example, this can be achieved by interspersing scalar objects between array objects, or by introducing unused "padding" bytes between array objects.) Optionally, the frame-address is recorded at a location within the table structure; in general, said frame-address value must be initialized in the function prolog, typically by adding or subtracting a constant from the value of the frame pointer.

In a location prior to the table appears an address-sized object to hold a "next-link" address which will point to the next higher-address (or lower-address) dyna-stack table. A null pointer is initialized in the next-link address at the bottom of the chain, i.e. the Dyna-stack Table 96 for the "main" function (or the low-level function which calls the "main" function).

Except for initializing the next-link, the values of each bucket are computed at compile time; the dyna-stack tables are generated by the compiler into local static storage and are not modified at run time.

There is no need for naming any locations in the Dyna-stack Tables 94, because the compiler has access to all expressions that might contain identifiers designating stack objects.

In the simplest implementations, the parameters to the current function can be identified by offsets from the current frame-address. Said parameters are then considered to be stack objects, and are subject to the details of the dyna-stack structure method.

In addition to the Dyna-stack Tables 94 described above, the SSC 23 can create Hi and End buckets for pointers residing in stack storage, using the name-mangling or pseudo-operator notations as described above. Any such buckets which are unused within the current block can be eliminated at compile-time without incurring any costs of stack usage or run-time overhead.

Tables for Monitoring Heap Storage [dyna-heap]

The Allocation functions of the standard libraries are those functions which allocate, re-allocate, or free storage in the heap. In the Standard C Library, the Allocation functions are specifically the malloc, calloc, realloc, and free functions. In C++, there are implementation-defined details regarding the various "new" and "delete" operations. (Furthermore, on each specific implementation platform, there are further Allocation functions which manipulate the heap.) Each Allocation function becomes aware of the "[Lo, End)" values for each heap object being allocated or freed by said function.

In this simplest version of the dyna-heap tables, every heap object is recorded into a Dyna-heap Table 93 as described above (in [dyna]) when an allocation (or re-allocation) function is invoked, and removed from that table when a free function is invoked.

There is no need for naming any locations in the dyna-heap tables, because objects in the heap do not have names.

Selecting the Appropriate Tables [dyna lookup]

At various points in the generated code, the SSCG 39 generates run-time code sequences which require bounds data for some specific operations. When said bounds data is unavailable from ordinary objects known to the SSC 23 (by the attribute relationships designated by IS_BOUND_OF, IS_HI_OF, IS_TSIZE_OF, etc.), the generated code can obtain the bounds data from the appropriate bucket, as follows.

If the object is designated by an identifier or a pointer in static or stack storage, the appropriate bucket can be identified by a mangled identifier or pseudo-operator (as above). Otherwise, the current value of the address (herein the "Value") is used as a lookup key to determine the specific "Lo, End" pair that determines the bounds of Value. The Dyna-lookup Table 92 is consulted to determine whether the Value will be found in the Dyna-static Table 97, the Dyna-stack Tables 94, or the Dyna-heap Table 93; in the simplest implementations, the address values for these regions form a simple ordering relationship. Once the appropriate region is determined, the lookup proceeds according to the structure of the table for that region, eventually determining a "Lo, End" range or a "not found" result.

Further Considerations for Static Storage [dyna-static2]

In an alternative, the SSPreL 283 can divide the Dyna-static Table 97 into several separate tables, each preceded by an address value that records the address of the lowest-addressed object contained within this table.

With or without the previous alternative, the buckets can be stored as offsets (like the Dyna-stack Tables 94). In a further alternative (assuming that the structure is preceded by a lowest-address value), the buckets hold only a two-byte offset. Each occurrence of an object too large to represent in the smaller bucket is represented by starting a new Dyna-static Table 97 (prefixed by its own full-size lowest-address value). In this latter alternative, a Dyna-static Table 97 recording only one very-large object must contain an address to record that object's End address.

With or without the previous alternatives, if the SSPreL 283 determines that absolutely no use was made of any dyna tables in any component linked into the executable file, then a re-compilation of all components can be initiated, using optimized function prolog-epilog, optimized Allocation functions, and no space overhead for dyna tables. With or without the previous alternatives, the default behavior can be reversed, so that each source file is compiled without any use of dyna tables; if the SSPreL 283 determines that some Requirement would remain unsatisfied without the use of dyna tables, then the SSPreL 283 can cause the re-compilation of the set of affected source files making use of dyna tables as needed.

With or without the previous alternatives, if the implementation provides mechanisms for sharing memory between processes, each shared memory segment can be given its own Dyna-static Table 97, identified by implementation-dependent methods as itself part of shared memory, and protected by implementation-defined locks.

Further Considerations for Stack Storage [dyna-stack2]

In an alternative (assuming that the structure is preceded by a lowest-address value), the buckets hold only a two-byte offset. Each occurrence of an object too large to represent in the smaller bucket is represented by starting a new Dyna-stack Table 95 (prefixed by its own full-size lowest-address value). In this latter alternative, a Dyna-stack Table 95 recording only one very-large object must contain an address to record that object's End address.

Regardless of the choices above, in a further alternative the pointer to the most recent Dyna-stack Table 95 can be held in a variable (whose name is not accessible to user code), rather than anywhere within the stack frame; in this alternative, a function that does not create any Dyna-stack Tables 94 does not incur any overhead in time or space. When searching the Dyna-stack Tables 94, such functions are not encountered, so therefore they contribute no overhead to the lookup time.

Further Considerations for Heap Storage [dyna-heap2]

In an alternative, the Dyna-heap Table 93 can be integrated into the Allocation functions and the heap tables. The details of this alternative will be different in each implementation. In most heap implementations, the heap table encodes the Lo and Tsize information of each heap object; thus there is zero run-time overhead for creating the dyna-heap table. However, the resulting dyna-heap data is distributed among all the objects in the heap; if frequent use is made of the dyna-heap data, then arbitrarily large portions of the heap might be brought into the working set.

In this alternative (integrating the Dyna-heap Table 93 into the heap), if the actual requested amount is smaller than the allocated amount, then the last byte of the allocated storage can record the "unused overhead". One bit (or the equivalent) must then mark an allocation as "exactly equal" or alternatively as "not exactly equal". (For example, in some existing implementations of malloc, the chunk size is always an even number, and an unused low-order bit can be used to mark the "exactly-equal" case.)

With or without the previous alternatives, if the implementation provides mechanisms for sharing memory between processes, and provides a special heap for shared memory, said special heap can be given its own Dyna-heap Table 93, identified by implementation-dependent methods as itself part of shared memory, and protected by implementation-defined locks.

Further Considerations for Lookup [dyna-lookup2]

In an alternative, the top-level lookup tree can incorporate entries for all the Dyna-static Tables 97 (if there are more than one), so that the top-level lookup will directly determine the specific Dyna-static Table 97 in which the address (or equivalent offset) will be found.

With or without the previous alternative, the frame-address values in the Dyna-stack Tables 94 can, in the function prolog, be entered into a dynamically-modified lookup tree, and be removed from that tree in the function epilog. As a further alternative, the execution-time overhead can be reduced by (a) never entering the most-recently-entered N stack frames, relying upon simple linear search for these N frames, and (b) entering or removing M frames all at once, each time frames are entered or removed; where N and M are small integers to be determined by performance tuning. The details of maintaining said lookup tree are well-understood in the art. Note that maintaining a dyna-stack lookup tree can improve performance in those environments which allocate stack frames from within a heap, which results in stack frames that have no necessary ordering of higher-addresses or lower-addresses between stack frames.

With or without the previous alternatives, in a multi-threaded implementation there must be one set of Dyna-stack Tables 94 for each thread. Note that the Dyna-static Table 97 and Dyna-heap Table 93 will usually be shared among all threads. The Dyna-stack Tables 94 will be maintained within each thread. As an alternative layout for the Dyna-stack Tables 94, the table of offsets is (as before) initialized into the static storage, one per function, but the frame-address and next-link are maintained within the stack frame, along with a pointer to the (constant) Dyna-stack Table 95. This keeps all the thread-local values within the thread-local stack.

Further Consequences of Dynamic Monitoring [dyna-further]

Using only the methods of application Ser. No. 10/964,830, some Source Programs 21 would have caused fatal diagnostics because the program did not provide adequate bounds data; however, the methods described in the sections beginning at "[dyna-optim]" permit safe secure compilation and execution of a larger set of programs. In turn, these methods create opportunities to augment the methods within the other sections.

To the set of pointer attributes defined in the section "[stat]", add the attribute "Based". This designates a pointer whose "Lo, End" bound information is known, even if the validity of the pointer value is not known at every line of code in the current function. Before said pointer is passed to an external function, or used within a fetch-or-store context, the validity of the actual current value can be determined by use of the available bound information. The result of such determination can be used for the Code-Generation Choice. The "Based" attribute implies the "Nnul" attribute (and no others). No other attributes imply the "Based" attribute.

As noted previously, the SSC 23 can ensure that the "End" offset of one object in the table is never equal to the "Lo" offset of the object at the next location in the table.

The methods described in the sections beginning at "[dyna-optim]" permit some new code generation choices to be made in the SSCG 39.

If Arr is the name of an external array defined in source file Asrc and referenced in source file Aref, the SSCG 39 can be certain that the SSPreL 283 will at link-time be provided with the bounds information for Arr, and that the bounds information will be constant values. However, if the SSBDF 26 for Asrc has not yet been seen when compiling Aref, the SSCG 39 has a choice: An "optimistic" assumption can be made that when the constant bounds information for Arr becomes available to the SSPreL 283, that constant bounds information will meet the Requirement(s) being published in the SSBDF 26 for Aref. Alternatively, a "pessimistic" assumption can be made that the constant bounds information will turn out not to satisfy the Requirement(s) for Aref, and that the Code-Generation Choices will embody run-time bounds-checking.

If the "optimistic" assumption turns out wrong when the SSPreL 283 reads the SSBDF 26 for Asrc, a link-time fatal diagnostic is produced by the SSLDG 86 (as described in [iter]). Re-compiling the source file Asrc will resolve the problem, because now the SSC23 will see the SSBDF 26 for Asrc and produce Code-Generation Choices that are appropriate for the (inadequate) bounds of Arr.

If the "pessimistic" assumption turns out wrong when the SSPreL 283 reads the SSBDF 26 for Asrc, the SSPreL 283 can produce an advisory warning, or some other hint regarding the future opportunities for optimization. Re-compiling the source file Asrc will produce more optimal code, because now the SSC 23 will see the SSBDF 26 for Asrc and will recognize that the (constant) bounds data for Arr is adequate for all Requirements in Aref.

If Ptr is the name of an global pointer defined in source file Psrc and referenced in source file Pref, the SSPreL 283 will at link-time be provided with the bounds information for Ptr; said bounds information might or might not be constant values. However, if the SSBDF 26 for Psrc has not yet been seen when compiling Pref, the SSCG 39 has a choice: An "optimistic" assumption can be made that when the bounds information for Ptr becomes available to the SSPreL 283, that bounds information be constant values that will meet the Requirement(s) being published in the SSBDF 26 for Pref. Alternatively, a "pessimistic" assumption can be made that the bounds information will turn out not to be constant values which satisfy the Requirement(s) for Pref, and that the Code-Generation Choices will embody run-time bounds-checking.

If the "optimistic" assumption turns out wrong when the SSPreL 283 reads the SSBDF 26 for Psrc, a link-time fatal diagnostic is produced by the SSLDG 86 (as described in [iter]). Re-compiling the source file Psrc will resolve the problem, because now the SSC 23 will see the SSBDF 26 for Psrc and produce Code-Generation Choices that are appropriate for the (inadequate) bounds of Ptr.

If the "pessimistic" assumption turns out wrong when the SSPreL 283 reads the SSBDF 26 for Psrc, the SSPreL 283 can produce an advisory warning, or some other hint regarding the future opportunities for optimization. Re-compiling the source file Psrc will produce more optimal code, because now the SSC 23 will see the SSBDF 26 for Psrc and will recognize that the (constant) bounds data for Ptr is adequate for all Requirements in Pref.

An "optimistic" assumption can be employed by the SSC 23 in another situation: if the SSC 23 can infer a Requirement upon a parameter of the current function following some, but not all, logic paths from function entry to the function-call or the fetch-or-store that imposes the Requirement, the SSBDF 26 entry for that function can record the Requirement as an "optimistic" Requirement. If the "optimistic" assumption turns out wrong when the SSPreL 283 reads the SSBDF 26 for each calling function, a link-time fatal diagnostic is produced by the SSLDG 86 (as described in [iter]). The SSPreL 283 can record in the SSBDF 26 for the called function that the "optimistic" assumption was not met. Re-compiling the corresponding source file will resolve the problem, because now the SSC 23 will see the SSBDF 26 for the corresponding source file and produce Code-Generation Choices that are appropriate for providing the needed bounds data to the called function.

Compiler Certification [cc]

In the current art, methods such as "Virtual Private Network" and "Secure Shell" are well-known for creating a secure Channel between the Certifying Authority A and the Compiler Vendor V being certified, such that the risk of eavesdropping, interception, or tampering can be made as small as needed. Therefore, the expenses involved with on-site visits for "witness testing" are now unnecessary.

A challenge for the Certifying Authority A is to determine that the unmodified source files of the test suite(s) are being compiled during the test, and to determine identifying characteristics of the compiler being tested. Checksums can be used for verifying the integrity of the source files. To this method, we add the Dynamic Twiddler 113 which makes modifications to the source files in accordance with instructions delivered over the Channel. For a non-limiting example, the Dynamic Twiddler 13 can be given a series of instructions, each specifying the name of a source file, a line number and position, and instruction to Insert specified characters, Swap specified characters, or Delete a number of characters at that position. After each series of instructions, the checksums of the affected files are re-calculated and one or more portions of the test suite are re-tested. A complete record is preserved of the behavior of the compiler (error messages and/or outputs from execution) in response to the test suite which has been altered by the instructions.

Since the extent of the twiddling is limited only by the size of the source files in the test suite; some extent of twiddling will be sufficient for the prevailing speed of processors and volume of storage to prevent spoofing of results. As shown in FIG. 2, the above operations are repeated as many times as desired by the Certifying Authority.

Some portion of the twiddle-results are combined into two web-readable documents (e.g. in HTML or XML) accompanied by the trademark and/or certification mark of the Certifying Authority A, and digitally signed by vendor V (the compiler company, or company obtaining the compiler certification). One document is the Public Certificate, which is made available to the public on a web site controlled by V as well as on a web site controlled by A. The other document is the Private Certificate which is held confidential by A and by V under terms of a nondisclosure.

These methods create assurance at any desired level of certainty that the compiler being tested actually is the software characterized by the twiddle-results.

Installation Certification [IC]

When program P is compiled by compiler C, and subsequently P is installed on system S, S may verify that P was truly compiled by C. In other words, S may verify the compiler-certificate of P For a basic level of assurance, the installer on S can verify the public certificates of P and V. For greater levels of assurance, the entity that owns or controls S can verify the private certificates of P and V, under standard terms of an NDA drafted by A.

A firewall program can be configured to require that all programs enabled for internet ports are have been certified by compilers which have themselves been certified (for a non-limiting example, such programs might be certified by an SSCC compiler to be free from buffer overflows). Said firewall is a Certified Firewall if (a) it has been successfully compiled as a certified program by a certified compiler, and (b) it has been stress-tested for its ability to verify the certificates of port-service programs and the compilers that compiled them. The Certifying Authority A can designate a specific internet port number through which each system can be interrogated to report whether that system is running a functional Certified Firewall.

Verification with Dynamic Libraries [VDL]

A certifying compiler (such as an "SSCC" compiler) can certify that a fully-linked program has certain specified properties, such as absence of buffer-overflow behavior. However, a program P which will, after installation on System S, make use of one or more dynamic libraries on System S, cannot be fully certified until it is installed on that system. At the time that said program P is first installed on System S, the installation software I can verify that the Requirements (such as those specified in the SSCC method) are satisfied by the Guarantees of the dynamic libraries on System S, and similarly for the Requirements of the dynamic libraries being satisfied by the Guarantees in the program P. One further complication arises in the case of the dynamic library which is not present with a static library: achieving certification at program-install time is not sufficient to ensure the properties of the program each time it is run. Two further steps are required: Any time new dynamic libraries are installed on System S, the installation software I must again verify the matching of Requirements and Guarantees against all programs installed on System S. (Performing this matching at install-time rather than later at program-execution-time permits the user to investigate discrepancies and resolve them immediately.) Further, the installation software I must maintain along with each program a full list of the dynamic libraries (including checksum information sufficient to identify each dynamic library) which the installation software I has previously checked for this program.

All documents referred to above are incorporated herein by reference.

While the technology herein has been described in connection with exemplary illustrative non-limiting implementations, the invention is not to be limited by the disclosure. For example, while techniques are disclosed herein as being used in combination to achieve advantageous results, they can also be used individually, and vice versa. Furthermore, although the particular illustrative non-limiting implementations herein relate to examples using the "C" family of programming languages, the invention is not intended to be so limited unless claims specifically require this. While particular exemplary detailed illustrative non-limiting software structures are disclosed herein as being advantageous, they are presented by way of example only and are not intended to limiting. Rather, the invention is intended to be defined by the claims and to cover all corresponding and equivalent arrangements whether or not specifically disclosed herein. Furthermore, when the present specification uses the words "required", "must", "necessary" or the like, such language is in general being used in a strict technical sense with respect to particular detailed non-limiting illustrative implementations and should not be read as indicating that the scope of legal protection of any claim herein should be so limited.

What is claimed is:

1. A method of certifying compilation of a software program, said method being performed on a certifying computing device, said method comprising:

said certifying computing device remotely and securely instructing a dynamic twiddler at least one specified alteration to a software program, said remotely and securely instructing comprises sending at least one instruction over a secure channel;

said certifying computing device using a compilation process at a vendor computing device to compile the altered software program;

said certifying computing device testing the compiled, altered program; and said certifying computing device certifying the compilation process based at least in part on the testing, wherein said altered software program comprises at least one C or C++ input source file embodying the features defined in full ISO C90 standard and/or full ISO C99 standard and/or the full ISO C++ standard, wherein said compilation process used at the said vendor computing device comprises:

said vendor computing device receiving said at least one C or C++ input source file of said altered software program and storing said at least one C or C++ file in a storage, said input source file including therein one or more symbols, each symbol being an expression, a sub-expression, a declaration, an identifier, a function invocation, or a function definition;

said vendor computing device reading entries from a bounds data file in which requirements and guarantees for the defined and undefined symbols in said input source file and in one or more object files linked with said input file are maintained;

said vendor computing device creating a compilable C or C++ source code including definitions and initializations of a dyna-static table which contains entries of End and Lo addresses of each memory object residing in static storage such that End address of one object is never equal to Lo address of another object; and said vendor computing device compiling said input source file and said compilable C or C++ source code and linking with said linked objects filed into an executable object file, wherein said compiling automatically identifies and/or eliminates substantially all undefined behaviors of said symbols of said input source file by analyzing, prior to generating said executable object file, runtime behaviors of said symbols based on said requirements and guarantees of said each symbol, each requirement and guarantee being an analysis time designation of a runtime state of said symbol, each requirement specifying a required pre-condition of said symbol which when satisfied will not caused said undefined behavior, and each guarantee specifying a resulting post condition upon proper execution of said symbol, wherein an undefined behavior is a runtime behavior of any symbol upon use of any one or more of an erroneous program construct, erroneous data, non-portable program construct, or non-portable data related to a memory object for which said runtime behavior is not specified in the C or C++ standard, and wherein said compiling includes processing an inputs check-list which records checksum information embodying one or more checksum algorithms, at least one of said checksum algorithms replacing each sequence of whitespace by one Space character before checksumming.

2. The method of claim 1 wherein said secure channel comprises and virtual private network.

3. The method of claim 1 wherein said secure channel comprises an encrypted data communications path.

4. The method of claim 1 further including logging results of said testing.

5. The method of claim 1 further including posting results of said testing.

6. The method of claim 5 further including digitally signing said testing results.

7. The method of claim 5 further including posting a trademark with said posted test results.

8. The method of claim 5 further including posting a certification mark with said posted testing results.

9. The method of claim 5 further including establishing a chain of trust for said posted test results.

10. The method of claim 1 further including providing an extent of "twiddling" that is sufficient for the prevailing speed of processors and volume of storage to prevent spoofing of results.

11. The method of claim 1 further including verifying said compiled program dynamically at run time.

12. The method of claim 1, wherein said processing said inputs check-list further comprises checksumming individually any tabs or spaces appearing after a line-feed.

13. A software development method for processing a computer program, said method being performed on a computing device including a processor having associated storage, said method comprising:

said computing device receiving at least one C or C++ input source file embodying the features defined in full ISO C90 standard and/or full ISO C99 standard and/or the full ISO C++ standard and storing said at least one C or C++ file in said storage, said input source file including therein one or more symbols, each symbol being an expression, a sub-expression, a declaration, an identifier, a function invocation, or a function definition;

said computing device reading entries from a bounds data file in which requirements and guarantees for the defined and undefined symbols in said input source file and in one or more object files linked with said input file are maintained;

said computing device creating a compilable C or C++ source code including definitions and initializations of a dyna-static table which contains entries of End and Lo addresses of each memory object residing in static storage such that End address of one object is never equal to Lo address of another object; and said computing device compiling said input source file and said compilable C or C++ source code and linking with said linked objects filed into an executable object file, wherein said compiling automatically identifies and/or eliminates substantially all undefined behaviors of said symbols of said input source file by analyzing, prior to generating said executable object file, runtime behaviors of said symbols based on said requirements and guarantees of said each symbol, each requirement and guarantee being an analysis time designation of a runtime state of said symbol, each requirement specifying a required pre-condition of said symbol which when satisfied will not caused said undefined behavior, and each guarantee specifying a resulting post condition upon proper execution of said symbol, and wherein an undefined behavior is a runtime behavior of any symbol upon use of any one or more of an erroneous program construct, erroneous data, non-portable program construct, or non-portable data related to a memory object for which said runtime behavior is not specified in the C or C++ standard, wherein said compiling includes processing an inputs check-list which records checksum information embodying one or more checksum algorithms, at least one of said checksum algorithms replacing each sequence of whitespace by one Space character before checksumming, except any tabs or spaces appearing after a line-feed are checksummed individually, and wherein checksum information of said object files are also maintained in said bounds data file, but which does not incur the overhead of recording data-types of the defined and undefined symbols, and wherein said compiling includes linking or combining object files and corresponding bounds data files, producing fatal link-time diagnostics or an executable program, wherein storage usage is optimized by elimination of any un-referenced pointer buckets.

14. The method of claim 13, wherein checksum information of said object files are also maintained in said bounds data file, but which does not incur the overhead of recording data-types of the defined and undefined symbols.

15. The method of claim 13, further including developing a bounds data symbol data structure which tabulates the requirements and guarantees for defined and undefined symbols during the linking process, including accepting an input file which provides a list of all objects located at absolute addresses, to accommodate embedded and hardware-dependent applications.

16. The method of claim 13, wherein said processing said inputs check-list further comprises checksumming individually any tabs or spaces appearing after a line-feed.

17. A safe secure software development system for processing a computer program, said system comprising:
  a storage device arranged to store at least one C or C++ input source file embodying the features defined in full ISO C90 standard and/or full ISO C99 standard and/or the full ISO C++ standard and storing said at least one C or C++ file in said storage, said input source file including therein one or more symbols, each symbol being an expression, a sub-expression, a declaration, an identifier, a function invocation, or a function definition; and
  a processor arranged to
    read entries from the bounds data file in which requirements and guarantees for the defined and undefined symbols in said input source file and in one or more object files linked with said input file are maintained in said storage device,
    create a compilable C or C++ source code including definitions and initializations of a dyna-static table which contains entries of End and Lo addresses of each memory object residing in static storage such that End address of one object is never equal to Lo address of another object; and
    compile said input source file and said compilable C or C++ source code and link with said linked objects filed into an executable object file,
  wherein said processor, when compiling, automatically identifies and/or eliminates substantially all undefined behaviors of said symbols of said input source file by analyzing, prior to generating said executable object file, runtime behaviors of said symbols based on said requirements and guarantees of said each symbol, each requirement and guarantee being an analysis time designation of a runtime state of said symbol, each requirement specifying a required pre-condition of said symbol which when satisfied will not cause said undefined behavior, and each guarantee specifying a resulting post condition upon proper execution of said symbol, and wherein an undefined behavior is a runtime behavior of any symbol upon use of any one or more of an erroneous program construct, erroneous data, non-portable program construct, or non-portable data related to a memory object for which said runtime behavior is not specified in the C or C++ standard, and
  wherein said safe secure compilation includes safe secure linking which combines object files and corresponding safe secure bounds data files, producing either fatal link-time diagnostics or a safe secure executable program, wherein storage usage is optimized by elimination of any un-referenced pointer buckets.

18. The system of claim 17, wherein said processor processes a safe secure inputs check-list which records checksum information for the inputs to the execution of said safe secure compilation, embodying two or more checksum algorithms, one of which implements the method described herein whereby each sequence of whitespace is replaced by one Space character before checksumming, except any tabs or spaces appearing after a line-feed are checksummed individually.

19. The system of claim 17, wherein checksum information of said object files are also maintained in said bounds data file, but does not incur the overhead of recording data-types of the defined and undefined symbols.

* * * * *